(12) United States Patent
Ammar et al.

(10) Patent No.: US 6,311,108 B1
(45) Date of Patent: Oct. 30, 2001

(54) AUTONOMOUS LANDING GUIDANCE SYSTEM

(76) Inventors: Danny F. Ammar, 10649- NW. 49th St., Coral Springs, Broward, FL (US) 33076; Randall C. Spires, 1322 SW. Walnut Ter., Boca Raton, Palm Beach, FL (US) 33486; Steven R. Sweet, 1260 NW. 112th Way, Coral Springs, Broward, FL (US) 33071

( * ) Notice: Subject to any disclaimer, the term of this patent is extended or adjusted under 35 U.S.C. 154(b) by 0 days.

(21) Appl. No.: 09/630,156

(22) Filed: Jul. 31, 2000

Related U.S. Application Data

(62) Division of application No. 08/929,820, filed on Sep. 15, 1997, which is a continuation of application No. 08/856,362, filed on May 14, 1997, now Pat. No. 5,945,926.
(60) Provisional application No. 60/017,876, filed on May 14, 1996.

(51) Int. Cl.[7] .............................. G01S 13/42; G01S 13/02
(52) U.S. Cl. ......................... 701/16; 701/213; 701/220; 342/33; 342/26; 244/180
(58) Field of Search .............................. 701/16, 34, 213, 701/220, 120, 17; 244/180, 183; 342/33, 26, 63, 152, 149, 427, 36

(56) References Cited

U.S. PATENT DOCUMENTS

| | | |
|---|---|---|
| 3,710,384 | 1/1973 | Ashcraft ................................. 343/7 A |
| 3,775,766 * | 11/1973 | Gendreu et al. ..................... 343/5 LS |
| 3,795,909 * | 3/1974 | Vehrs, Jr. .............................. 343/7 TA |
| 3,810,175 | 5/1974 | Bell ..................................... 343/7 TA |
| 3,815,132 | 6/1974 | Case, Jr. ............................... 343/7 TA |
| 4,495,580 | 1/1985 | Keearns ................................. 364/450 |
| 4,698,635 | 10/1987 | Hilton et al. ............................ 342/64 |
| 4,792,904 * | 12/1988 | Reinagel et al. ..................... 364/429 |
| 4,890,232 * | 12/1989 | Mundra ................................. 364/439 |
| 4,891,762 | 1/1990 | Chotiros ............................... 364/456 |
| 4,910,674 | 3/1990 | Lerche ................................. 364/443 |
| 4,914,734 | 4/1990 | Love et al. ............................. 342/64 |
| 4,994,810 * | 2/1991 | Sinsky ................................. 342/151 |
| 5,072,224 * | 12/1991 | Verbeke et al. ....................... 342/152 |
| 5,202,690 | 4/1993 | Frederick ............................ 342/26 |
| 5,235,513 * | 8/1993 | Velger et al. ......................... 364/449 |
| 5,289,185 * | 2/1994 | Ramier et al. ....................... 340/971 |
| 5,293,325 | 3/1994 | Roos ................................... 364/571 |
| 5,654,890 * | 8/1997 | Nicosia et al. ........................ 364/428 |
| 5,661,486 | 8/1997 | Faivre et al. ........................... 342/33 |
| 5,716,032 * | 2/1998 | McIngvale ............................ 244/185 |

FOREIGN PATENT DOCUMENTS

| | | | |
|---|---|---|---|
| 40 41 204 A1 | 6/1992 | (DE) | ................................. G01S/7/28 |
| 0 565 399 A1 | 10/1993 | (EP) | ................................. G05D/1/06 |
| 0 678 841 A1 | 10/1995 | (EP) | ................................. G08G/5/02 |
| 2 292 032 A | 2/1996 | (GB) | ................................. G01S/3/32 |
| WO 95/33213 | 12/1995 | (WO) | ................................. G01S/13/00 |

OTHER PUBLICATIONS

McLean, Donald, "Automatic Flight Control Systems", 1990 Prentice Hall International, Chapters 10–11, pp. 317–418.

* cited by examiner

*Primary Examiner*—Tan Nguyen
*Assistant Examiner*—Dalena Tran

(57) ABSTRACT

An aircraft guidance system uses radar imaging to verify airport and runway location and provide navigation updates. The system is applicable to flight operations in low visibility conditions.

17 Claims, 30 Drawing Sheets

Table 130 (132):

| PRI # | 1-16 | 17-32 | 33-48 | 49-64 | 65-80 | 81-96 | 97-112 | 113-128 |
|---|---|---|---|---|---|---|---|---|
| FREQUENCY SUB-BAND | 1 | 2 | 3 | 4 | 1 | 2 | 3 | 4 |
| TRANSMIT PORT | SUM | SUM | SUM | SUM | SUM | SUM | SUM | SUM |
| RECEIVER CHANNEL 1 | SUM | SUM | SUM | SUM | SUM | SUM | SUM | SUM |
| RECEIVER CHANNEL 2 | DEL_EL | DEL_EL | DEL_EL | DEL_EL | DEL_AZ | DEL_AZ | DEL_AZ | DEL_AZ |

| PRI # | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| FREQUENCY # | 1 | 1 | 2 | 2 | 3 | 3 | 4 | 4 | 5 | 5 | 6 | 6 | 7 | 7 | 8 | 8 |
| PC CODE | A | B | A | B | A | B | A | B | A | B | A | B | A | B | A | B |

| FREQUENCY SUB-BAND | 1 | 2 | 3 | 4 |
|---|---|---|---|---|
| FREQUENCY # | 1-8 | 9-16 | 17-24 | 25-32 |

Fig. 4

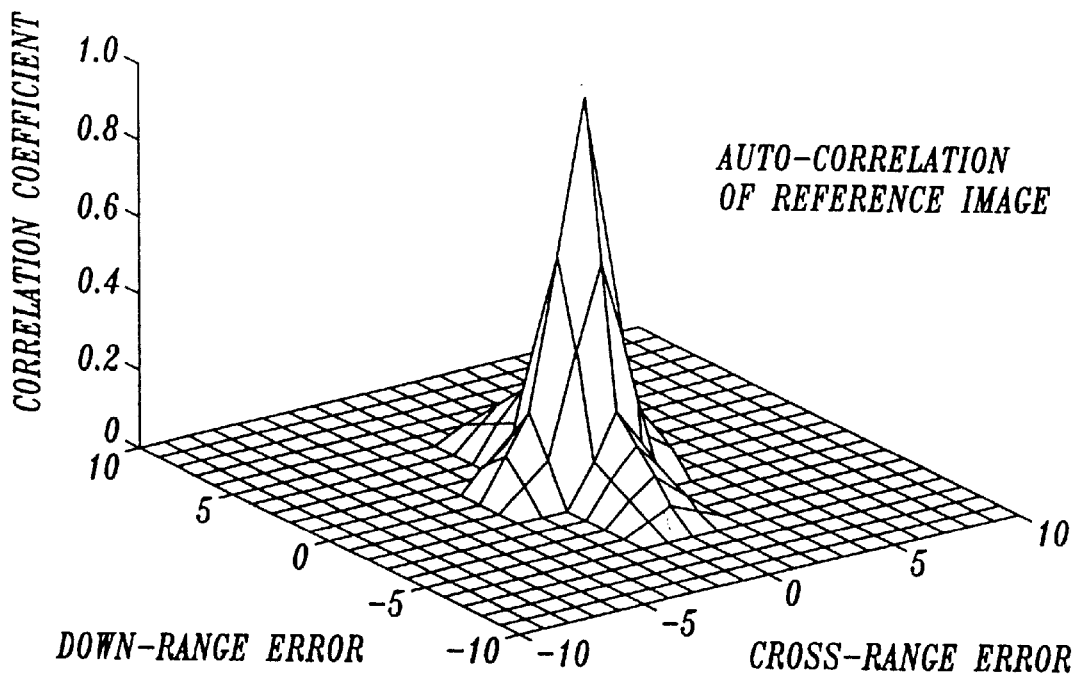
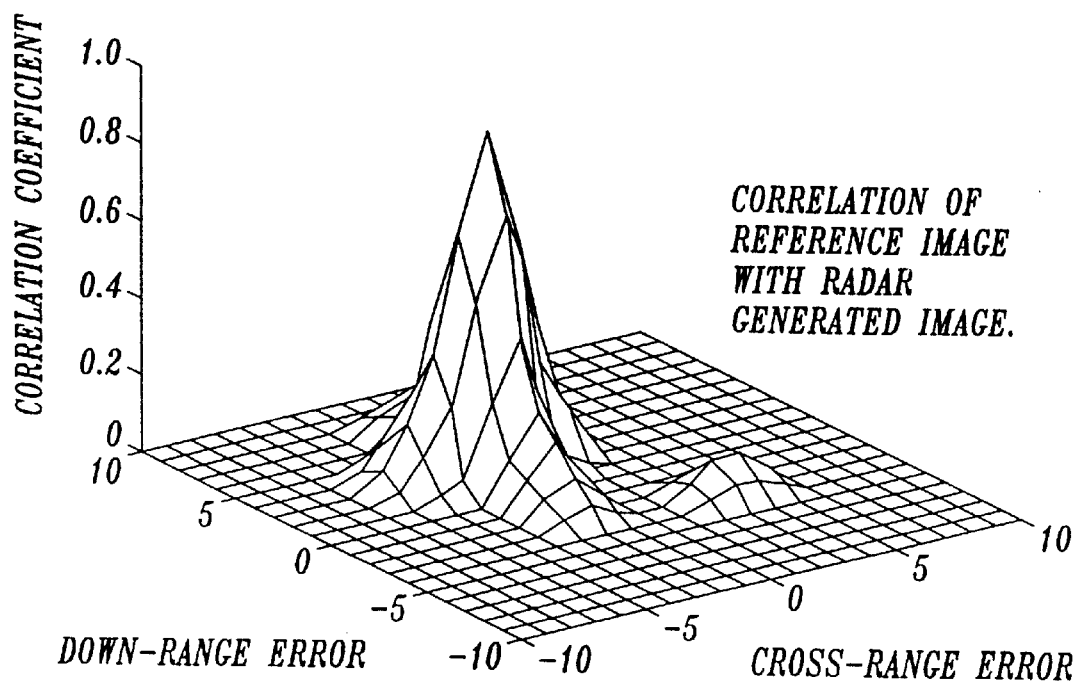
Fig. 10b

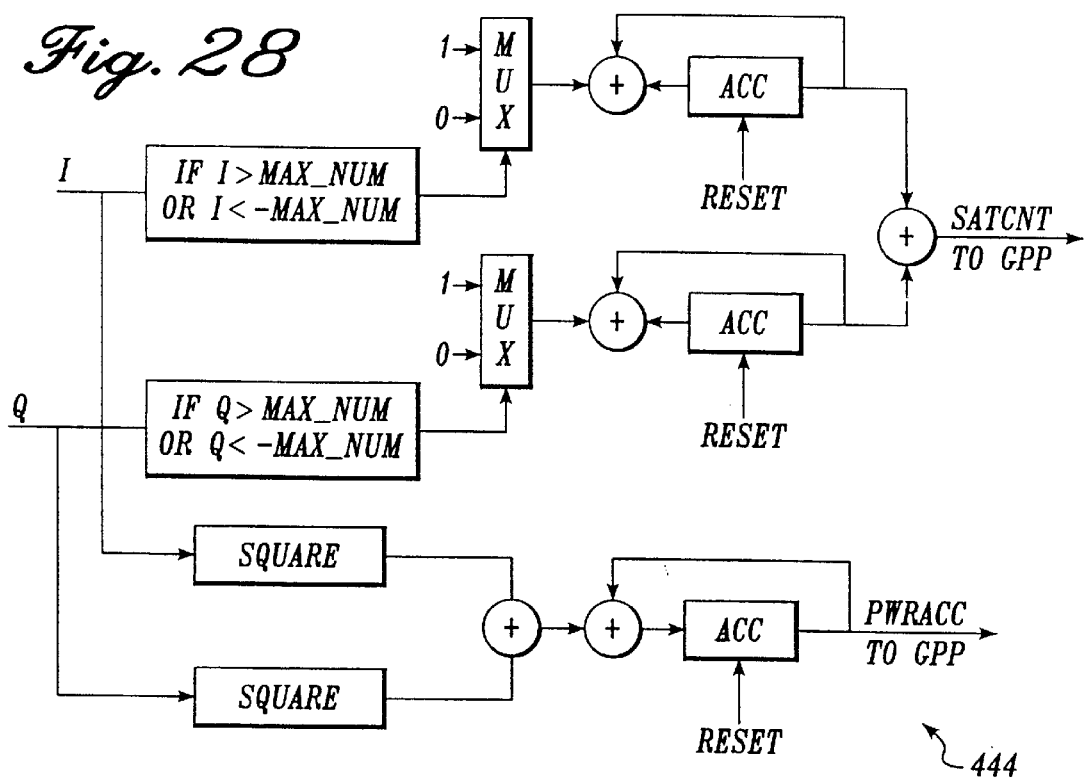
Fig. 28
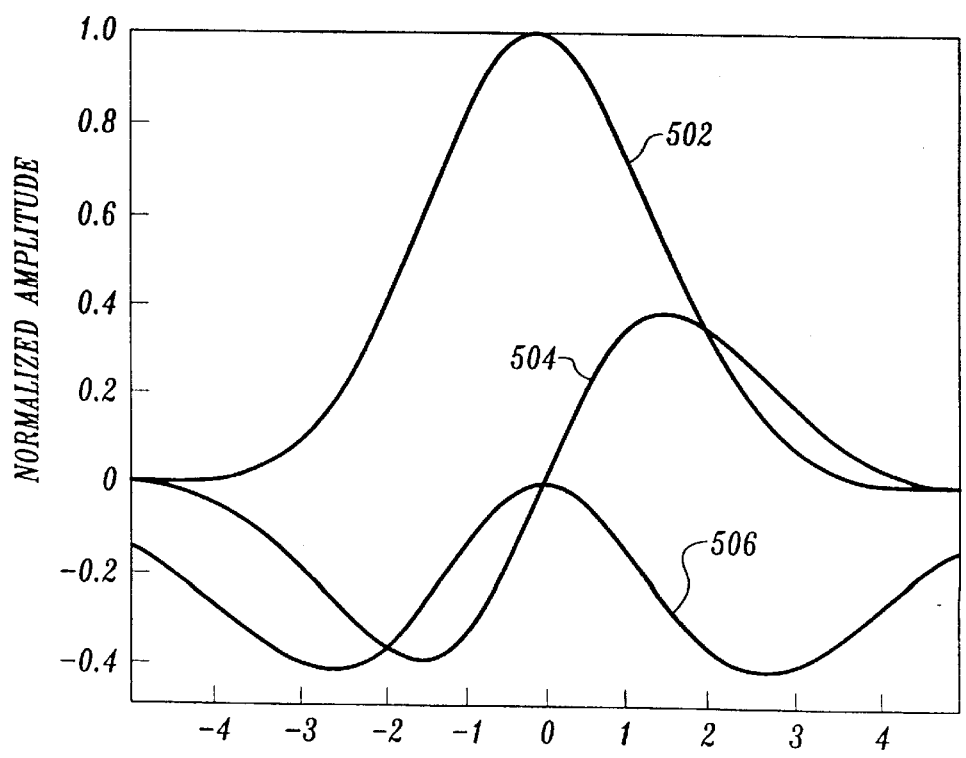
Fig. 29 OFF-BORESIGHT ANGLE IN DEGREES

AUTONOMOUS LANDING GUIDANCE SYSTEM

This application is a divisional patent application U.S. patent application Ser. No. 08/929,820 filed Sep. 15, 1997, which in turn is a continuation of and claims priority from U.S. patent application Ser. No. 08/856,362 filed May 14, 1997, now U.S. Pat. No. 5,945,926 entitled "Radar Based Terrain And Obstacle Alerting Function" issued Aug. 31, 1999, the complete disclosure of which is hereby incorporated by reference and which claims priority from U.S. provisional application Ser. No. 60/017,876 filed May 14, 1996.

BACKGROUND OF THE INVENTION

The present invention relates to monopulse radar and more particularly to the monopulse radar traditionally used for airborne weather detection.

Anticipated increases in air traffic volume, as well as economic pressure to reduce airline operating costs are spurring the development of an air transportation system that operates at maximum capacity under all visibility conditions. Several hazards to the safety of flight, however, present themselves or are exacerbated during reduced visibility operations. These hazards include: impact with the terrain surrounding the airport; failure to acquire the intended runway for landing; and failure to detect obstructions that may be on the runway, taxiway or otherwise in the path of the aircraft. For these reasons, the air traffic control system imposes minimum cloud ceiling and runway visibility requirements at airports that mandate under what conditions the airport can accept landing and departing traffic. These minima are designed to ensure that the flight crew has enough information to acquire the correct runway and avoid collision hazards on departure and approach.

In addition, low visibility operations at airports also require that air traffic control separate landing and departing traffic from each other by a greater distance. The net effect of the increased separations is to reduce the number of aircraft the airport can handle in a given time period.

Relaxation of the given minima at an airport is possible if both the aircraft and the airport have sophisticated precision guidance equipment. The precision guidance equipment (e.g. instrument landing system (ILS) or microwave landing systems) improves the confidence with which the aircraft can acquire and maintain the proper flight path to the correct runway. Airports having this precision guidance equipment can enjoy improved capacity during times of low visibility over airports without this equipment. However, this equipment is expensive to acquire and maintain and many airports do not have equipment of this type. Furthermore, these systems require specialized equipment both on board the aircraft and at the airport. In addition, use of these systems still do not provide the airport with the same capacity present during times of unrestricted visibility as hazards to flight due to the reduced visibilities still exist.

Certain dedicated systems are currently manufactured to warn of these potential hazards. Chief among these systems are those designed to prevent controlled flight into terrain accidents. Controlled flight into terrain accidents currently account for the greatest number of air fatalities, the risk of which is greatly increased by operations in low visibility conditions. Technology for avoiding controlled flight into terrain includes ground proximity warning systems, and terrain awareness and display systems.

Ground proximity warning systems use altitude information from radio altimeters and barometric altimeters, in conjunction with an individual aircraft's speed and climb characteristics, to warn flight crews that the terrain below the aircraft is rising dangerously fast. The ground proximity warning systems can also provide an aircraft flight crew with additional alerts by, for example, warning of aircraft deviation below glideslope or inappropriate aircraft attitude or configuration. Typical examples of ground proximity warning systems are disclosed in U.S. Pat. No. 3,946,358 entitled "Aircraft Ground Proximity Warning Instrument" and U.S. Pat. No. 4,914,436 entitled "Ground Proximity Approach Warning System Without Landing Flap Input," both incorporated herein by reference.

Terrain awareness and display systems combine ground proximity warning system technology with navigation data, a built-in terrain data base and existing cockpit display technology such as color weather radar, electronic flight instrument systems (EFIS) and map displays. Terrain awareness and display systems provide "look ahead" terrain warnings by utilizing present aircraft positions and a terrain data base to predict the aircraft's future position with respect to terrain. A typical example of a terrain awareness system is described in co-pending application Ser. No. 08/509,642, filed Jul. 31, 1995, entitled "Terrain Awareness System" by Muller et al, assigned to the same assignee as the present application.

Although the ground proximity warning systems and terrain awareness and display systems described in the above-mentioned references have greatly reduced the controlled flight into terrain risk for aviation worldwide, both ground proximity warning systems and terrain awareness and display systems have some limitations. Neither of these systems actually "sees" the terrain or other obstructions ahead of the aircraft. Ground proximity warning systems differentiate the aircraft's altitude signals to detect abnormally high closure rates with terrain. Thus, discontinuities in the terrain profiles, such as a cliff, may not generate an alert in sufficient time to prevent an accident. The more sophisticated "look ahead" function of terrain awareness and display systems compares aircraft position data, based on either dead reckoning or a global positioning system, with a stored terrain map to calculate the aircraft's probable position relative to the terrain and determine whether a terrain collision threat exists. However, this system cannot detect collision threats due to obstructions not contained within the database. For example, temporary structures such as construction cranes would not be modeled in the database. In addition, the integrity of the alerting function depends directly upon the integrity of the aircraft position data. Errors in aircraft position could reduce the warning time given the flight crew. In addition, non-fixed terrain features and non-fixed terrain threats such as, for example, aircraft or vehicular traffic on the runway, are also not readily determinable by typical ground proximity warning systems. Thus, these systems are inappropriate as a means for relaxing airport visibility minima and increasing airport capacities.

Radar has the potential to provide the flight crew with real-time terrain information independent of both a calculated position and a computer-stored terrain data base. However, the only radar normally carried aboard non-military aircraft is weather radar. Weather radar has characteristics that make it non optimal for detecting terrain threats specifically. Existing weather radar antennas exhibit a limited elevation sweep angle. The added weight and expense of a radar dedicated to terrain detection in addition to the already required weather radar prohibits use of terrain only radar systems. Yet, additional safety and increases in airport capacity could be realized through the use of this additional radar information.

Utilizing an aircraft radar for detection of these threats, poses unique difficulties. Effective real-time terrain feature identification and terrain threat determination require resolution of closely spaced targets, for example, closely spaced radio towers. The typical monopulse radar antenna transmits through the Sum channel and receives data through Sum and Delta channels. Nearly all current radar applications utilize only these two Sum and Delta channels, which are manipulated to obtain target off-boresight angle information. Radar applications utilizing the Sum and Delta channels exclusively are incapable of resolving closely spaced targets. If multiple targets are present in the beam or if the target is widely distributed, the monopulse measurement becomes confused. Traditional monopulse angle measurement is unable to separate two closely spaced targets; known monopulse sharpening techniques may even degrade the image. Thus, it has been difficult to distinguish multiple targets or widely distributed targets when they are concurrently present in the radar beam. Resolving closely spaced targets is valuable in achieving radar-based autonomous landing guidance.

SUMMARY OF THE INVENTION

The present invention responds to the need for clear weather operational capabilities in low visibility conditions by providing navigation, guidance, and terrain/obstacle collision avoidance information. The navigational and threat avoidance capabilities of the present invention also serve to enhance the safety of flight regardless of the visibility conditions. More particularly, the present invention provides a system that provides landing guidance to an aircraft through use of data collected using the aircraft's onboard radar. Data collected and processed according the invention includes: terrain and obstacle data, runway and airport verification, navigation and position data and runway touchdown and threshold information. In this manner, the present invention can provide the flight crew with an accurate representation of the airport and of any collision threats actually present ahead of the aircraft even in conditions where the crew cannot obtain this information visually for themselves. Thus, the invention enables aircraft landings in ceiling and visibility conditions which would otherwise be below the airport minimums and can be employed to greatly increase airport capacities.

In a preferred embodiment of the invention, the invention utilizes the aircraft's weather radar, thereby avoiding the cost and weight penalties of an additional radar system that heretofore has prevented the use of such guidance systems on civilian aircraft. The present invention is implemented in such a manner as not to compromise the weather and windshear detection functions the weather radar is also required to perform.

According to one aspect of the invention, the invention uses the weather radar, typically in the X-band, to detect terrain and obstacles ahead of the aircraft. Thus, the present invention provides information to the flight crew about the actual obstructions present, rather than the virtual obstructions represented in a terrain data base or inferred through differentiation of radio altitude signals. The present invention can therefore alert the crew to hazardous conditions such as runway vehicular traffic and temporary structures not normally contained in a terrain data base.

In one embodiment of the invention, the present invention utilizes this detection of targets to provide ground proximity warnings to the crew. In another embodiment of the invention, the present invention utilizes the detection of targets to alert the crew to runway incursions on the intended runway for landing or during taxiing operations. The ground proximity warning function of the present invention, can function independently of, or be used in conjunction with, other ground proximity warning devices to enhance the robustness of the terrain alerting system.

According to another aspect of the invention, the features detected by the radar are used for positive identification of the runway and/or airport to which the aircraft is on approach. Features detected by the radar can be compared with a stored data base of features for the given runway and airport to confirm that the aircraft is approaching the desired airport and the desired runway on that airport.

According to still another aspect of the invention, the present invention further employs the airport and runway correlation feature described in the preceding paragraph to detect the aircraft's navigation system errors. Augmenting the aircraft navigation data with the radar information facilitates greater precision in the approach and landing phase of flight. In a preferred embodiment of the invention, this updated position information can optionally be displayed to the crew.

According to yet another aspect of the invention, the invention utilizes monopulse beam sharpening of the radar signals to further enhance the ability of the weather radar to be used as a terrain and obstacle detection radar. The monopulse beam sharpening function of the present invention utilizes a new distributed monopulse channel, Delta_D, thereby improving the resolution of multiple targets in the radar beam. The invention can distinguish multiple or close spaced targets by time multiplexing traditional monopulse channel with the Delta_D channel to provide more accurate angle measurement for targets in each side of the beam. In a preferred embodiment of the invention, the invention utilizes novel monopulse beam sharpening techniques for even greater resolution of targets within the beam. Thus, the present invention overcomes the limitations of using weather radar for terrain, obstacle, and feature extraction.

According to yet another aspect of the invention, the navigation, guidance and/or collision information acquired and/or updated via the weather radar, is displayed on an aircraft cockpit display, such as a head-up display. Other visual displays may also be used. For example, the display may be an overlay of the cockpit weather display or an EFIS display. The display provides a synthetic image of the runway that conforms to the actual runway as viewed from the cockpit. The synthetic runway image can also contain other symbols such as, for example, a flight path indicator, an extended runway centerline, and touch down zone symbols. These symbols may optionally be fused with data generated from other sensors. The display operates to improve the situational awareness of the flight crew to enhance safety and to facilitate landing in low visibility conditions.

The various features of the present invention can be used to reduce the visibility minima at airports without requiring the airport itself to acquire expensive or specialized equipment. The reduced minima can in turn, increase the capacity of the airport during periods of reduced visibility. Thus for example, aircraft equipped with the present invention can land at airports having only Category I visibility minima (Decision Height (DH) 200 feet and Runway Visual Range (RVR) 2,400 feet) when the conditions actually present are Category III (Decision Height (DH) 0 feet and Runway Visual Range (RVR) 700 feet) and the airport would normally be closed.

Similarly, the present invention supplements the Traffic Alert and Collision Avoidance System by providing warnings of potential runway or mid-air collisions, even when the intruding aircraft is not equipped with an Air Traffic Control Radar Beacon System transponder.

According to still another aspect of the present invention, the invention may be incorporated and used in conjunction with other aircraft functions such as existing ground proximity warning devices or to facilitate emergency descents.

Other features and advantages of the present invention are described in greater detail below.

BRIEF DESCRIPTION OF THE DRAWINGS

FIG. 4 shows the transmit/receive waveform utilized in a preferred embodiment of the autonomous landing guidance mode of the present invention;

FIG. 10b illustrates autocorrelation of the reference image and correlation of the reference image with the radar image;

FIG. 28 illustrates a functional diagram of the radar power accumulation and saturation count function according to one embodiment of the invention;

FIG. 29 illustrates the traditional Sum and Delta patterns for a typical 32-inch flat plate antenna array with a 3.2 degree beam width used in weather radar;

DETAILED DESCRIPTION OF THE PREFERRED EMBODIMENTS

Preferred embodiments of the invention are described herein in the context of an Autonomous Landing Guidance System for aircraft useful for explaining the features and operation of the present invention. Those of ordinary skill in the art will recognize that the invention may be adopted for use in other contexts.

1.0 Autonomous Landing Guidance System

Figure 1A:
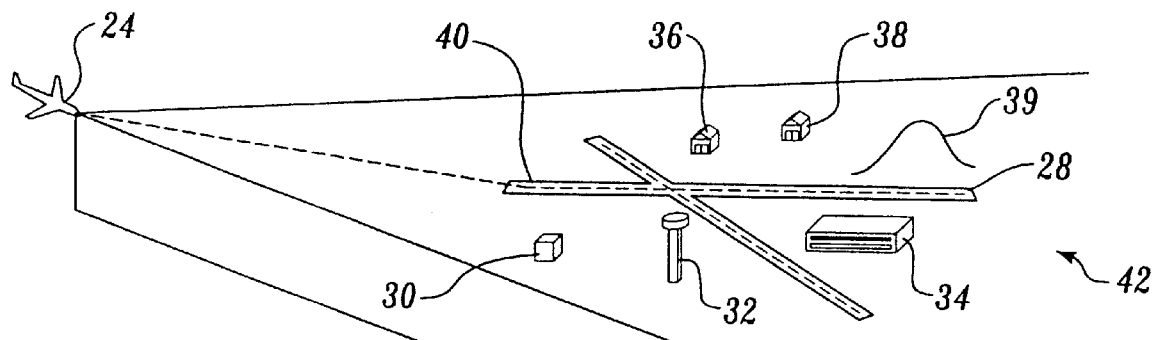
FIG. 1a illustrates the use of the autonomous landing guidance in a typical airport scenario according to one embodiment of the present invention.

FIG. 1a contains an illustration of a typical airport facility useful for explaining use of the autonomous landing guidance invention. When an aircraft 24 is on glide slope 26 to runway 28, the invention employs radar imaging to measure terrain features at or in the vicinity of the airport and creates an image of the radar-detected terrain. For example, terrain features might include: a building 30, a control tower 32, a terminal 34, hangers 36, 38 and hill 39.

The radar-created image is compared with identifying features retrieved from a terrain and airport data base; relevant portions of which are accessed using aircraft position information. Correlating the data base information with the radar image can be used to independently identify the airport and to calculate the aircraft's position relative to runway 28, including the aircraft's orientation relative to runway 28. The correlated radar and aircraft position data is then used to update the aircraft's position relative to the airport and to provide the flight crew with the updated position information via an aircraft display. In a preferred embodiment, this display is a heads-up display but may optionally be the weather radar display or EFIS. Thus, the flight crew know the aircraft's heading relative to the runway touch-down point 40. An intrusion detection function, to be described below, scans for any transient obstacles in the flight path of the aircraft, such as runway intrusions or other aircraft and alerts the flight crew in the event an intrusion is detected.

Figure 1B:
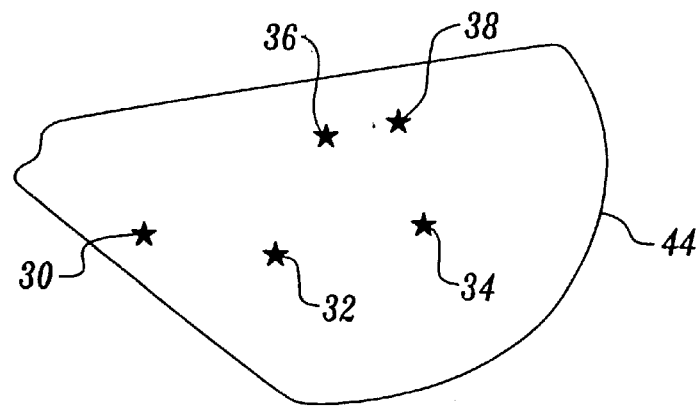
FIG. 1b illustrates the use of the autonomous landing guidance in a typical airport scenario according to one embodiment of the present invention.
Figure 1C:
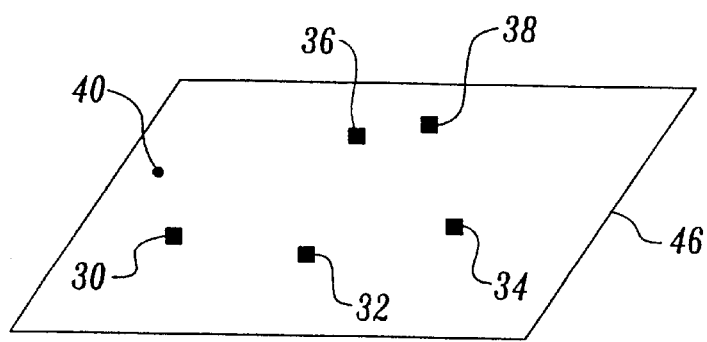
FIG. 1c illustrates the use of the autonomous landing guidance in a typical airport scenario according to one embodiment of the present invention.

FIG. 1a may now be used in conjunction with FIGS. 1b–1c to explain the operation of the landing system in greater detail. In a typical airport scenario, when the aircraft 24 is on the glide slope 26 the invention uses radar in the form of a coherent monopulse beam to measure terrain, for example, building 30 height, control tower 32 height, terminal 34 and hangers 36, 38 at or in the vicinity of the airport 42. In a preferred embodiment, the radar is an X-band radar typically used for airborne weather detection. The invention creates an image of all radar detected objects above a selected clearance plane 44 using terrain obstacle detection measurements and azimuth monopulse beam sharpening to enhance the radar image as will be described in greater detail below.

Figure 2:
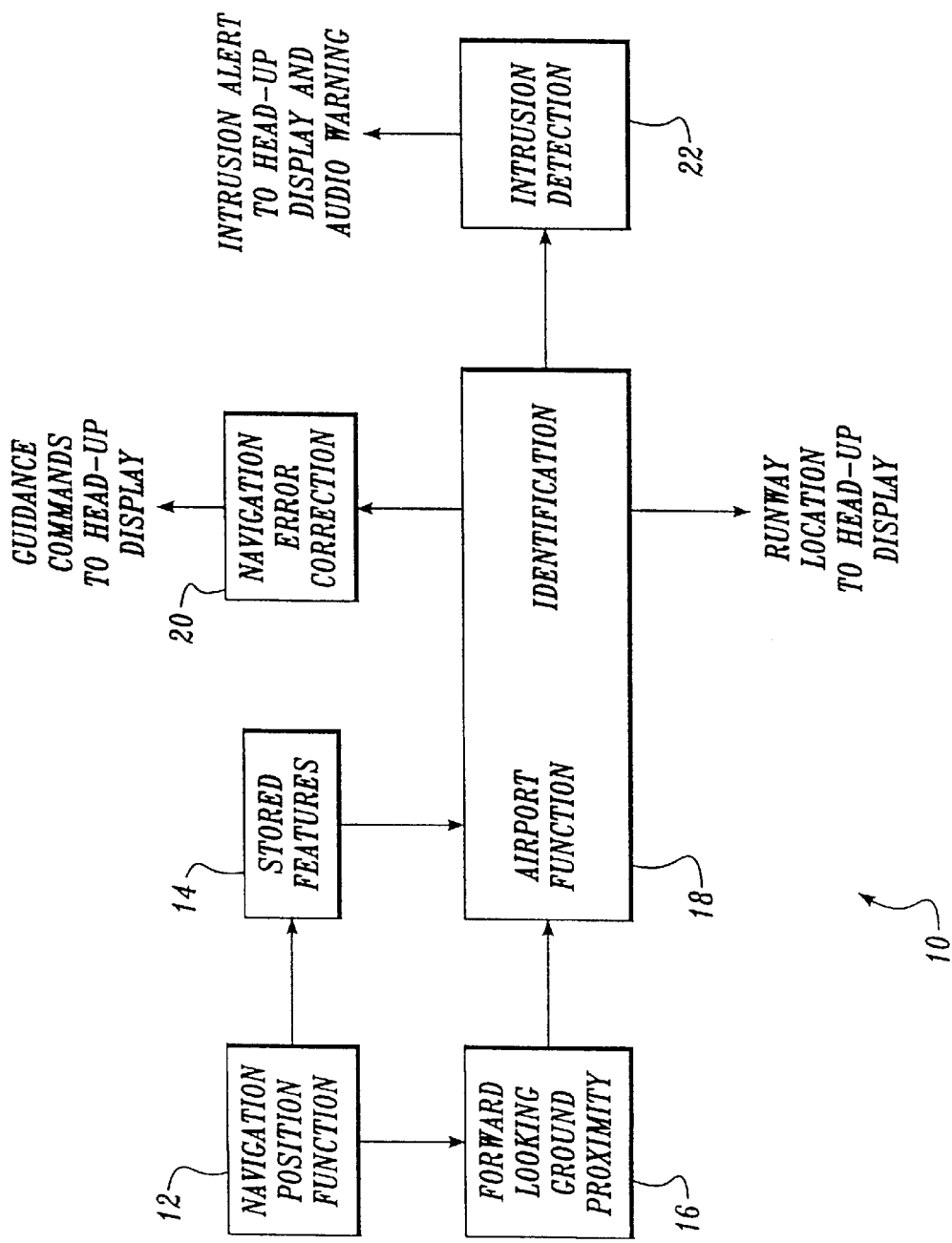
FIG. 2 is a top level system block diagram of an autonomous landing guidance function according to one embodiment of the present invention.

FIG. 2 shows a top level system block diagram of an autonomous landing guidance function 10 according to one embodiment of the present invention. A position reference function 12 provides a calculated aircraft position based on position information developed, for example, by the aircraft's on-board global positioning system receiver and/or inertial measurement unit. Other sources of navigation inputs known to those skilled in the art, may be used to provide navigation data to the position reference function. The aircraft's calculated position is used to access a pre-stored reference profile 46 of airport 42 terrain and obstacle heights in stored data base of airport identifying features 14. Pre-stored reference profile 46 of airport terrain and obstacle heights is then correlated against the radar-created image. The outputs of the correlation function confirm the airport location and provide azimuth, elevation, and range error corrections to update the aircraft position. The invention also identifies the runway area 28, runway orientation, and runway centerline from the pre-stored map. Position errors or guidance commands are displayed on the HUD relative to the glide slope and runway touch down point. The intrusion detection feature also functions to detect transient obstacles in the aircraft flight path using high range resolution processing and monopulse discrimination.

1.1 Autonomous Landing Guidance Function System Definition

Figure 3:
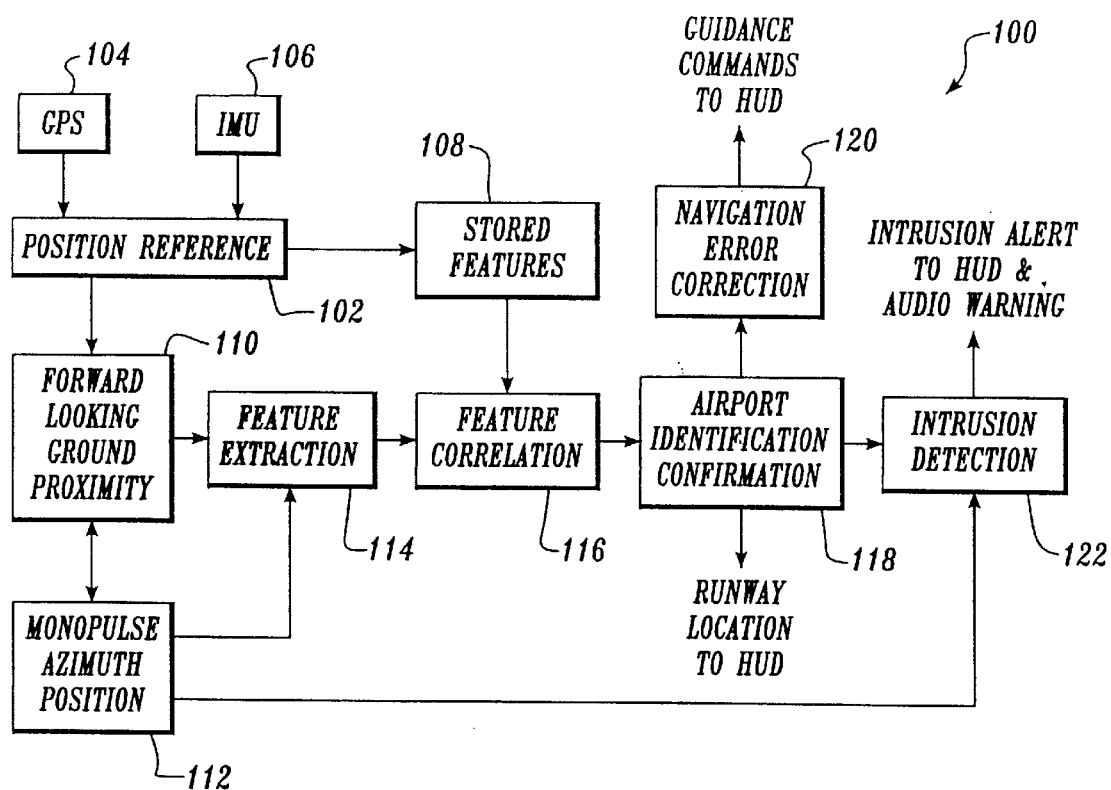
FIG. 3 is a system block diagram of an autonomous landing guidance function according to one embodiment of the present invention.

FIG. 3 is a system block diagram of an autonomous landing guidance function 100 according to one embodiment of the present invention. A position reference function 102 uses input from an on-board global positioning system, for example, a GPS receiver 104, and/or an inertial measurement unit (IMU) 106 to compute range to touch-down, line-of-sight velocity, and acceleration. Other sources of navigation inputs known to those skilled in the art may be used to provide navigation data to position reference 102. Position reference function 102 is also used to access a stored features map 108. Stored feature map 108 references are obtained from surveys or map data showing elevation extended landmarks at or in the vicinity of airports, for example, towers, tall buildings, and hangers. The landmark locations relative to each runway touch-down point are stored in feature map 108 for each airport.

A terrain and obstacle detection function 110 includes a monopulse radar system to be described in greater detail later. Terrain and obstacle detection function 110 accesses aircraft position information stored in position reference 102. Monopulse azimuth position function 112 provides enhanced azimuth position information to terrain and obstacle detection function 110. A feature extraction function 114 extracts terrain features and terrain obstacles at and in the vicinity of the airport from the monopulse enhanced radar image of the terrain and obstacle detection function 110.

Features are extracted based on their height above an elevation clearance plane which is adjusted to yield the desired number of terrain features. The invention utilizes approximately three to six landmarks to characterize any airport and perform the feature correlation function 116. Selection of a clearance plane limits the terrain features considered by feature correlation function 116 to those landmarks whose height causes them to extend above the chosen clearance plane and eliminates from consideration any terrain feature not tall enough to extend above the clearance plane. Limiting the number of terrain features considered in feature correlation function 116 by use of the clearance plane reduces to a minimum the number of features which will allow successful airport identification.

Feature correlation function 116 correlates the radar extracted features against pre-stored features for the destination airport. If at least a 90% strong correlation between extracted and pre-stored features exists, an airport identification confirmation function 118 independently confirms the airport identification and precisely identifies the runway location at the airport. Once the runway area is identified, airport identification confirmation function 118 communicates runway location to the aircraft's Head-up Display and to a navigation error measurement or error correction function 120.

Navigation error measurement function 120 updates the position reference information and communicates updated guidance commands or position errors to the Head-up Display to facilitate adjustment of the aircraft's position relative to the glide slope and runway touch down point.

An intrusion detection function 122 searches for any intruding targets, for example, aircraft or other vehicular traffic on the runway. Intrusion detection function 122 processes the same data used by the terrain and obstacle detection function 110 and provides intrusion alert information to the Head-up Display and to an intrusion warning device, for example, an audio warning system.

The present autonomous landing guidance system invention uses a 6 kHz pulse repetition frequency (PRF) to provide a 6.7 nautical mile unambiguous range which is considered adequate for terrain feature extraction for purposes of the autonomous landing guidance function. The number of range bins is selected to cover a minimum of 8 kilometers. The optimum waveform has a 6 kHz pulse repetition frequency and the number of range bins is selected to cover a minimum unambiguous range of 8 kilometers. Table 1 defines radar parameter values according to a preferred embodiment of the invention.

FIG. 4 shows the transmit/receive waveform 130 utilized in a preferred embodiment of the autonomous landing guidance mode of the invention. The transmit/receive waveform dwell includes 128 pulses, collected over 4 frequency sub-bands 132, each having 8 different frequencies. The 32 frequencies are pulse-to-pulse multiplexed to eliminate the effects of second time around echoes (STAE) and interference from other aircraft radar signals.

1.2 Reference Image

Figure 5:
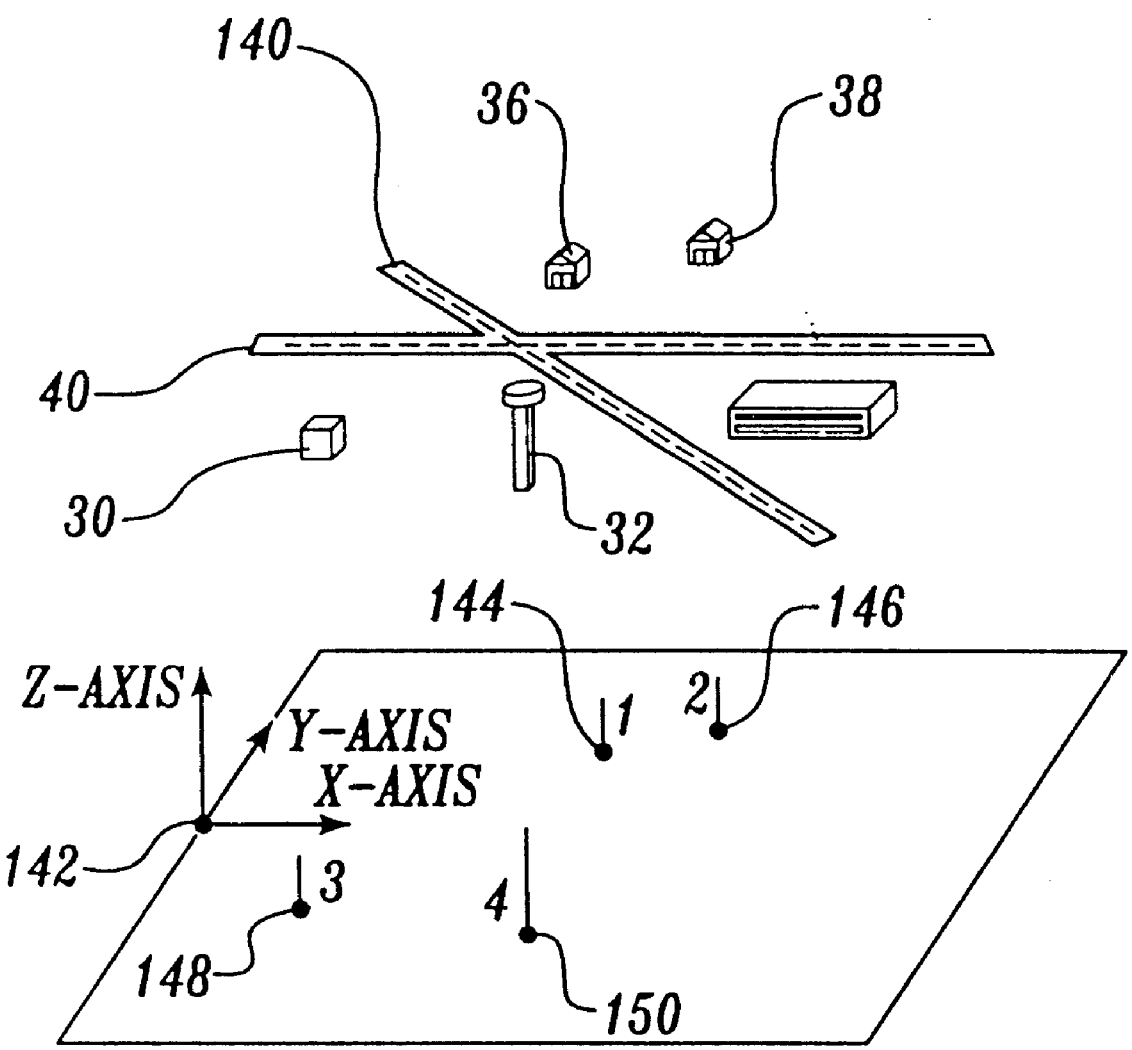
FIG. 5 illustrates an example of a stored features data base according to one embodiment of the present invention.

Feature extraction function 114 extracts terrain features from the radar image to characterize an airport and perform feature correlation function 116. An example of airport characterization function according to the invention is shown in FIG. 4. Stored features data base 108 includes a terrain reference image generated by surveys of elevation extended landmarks including, for example, tall building 30, control tower 32, and hangers 36, 38 in the vicinity of airport 42 and each landmark's location relative to each runway touchdown point 40, 140. Stored features data base 108 includes similar terrain reference images of elevation extended landmarks which characterize individual airports throughout the world. In particular, FIG. 5 illustrates an example of a stored features data base including terrain reference images generated by surveys of elevation extended landmarks including, hangers 36, 38, building 30, and control tower 32, in the vicinity of a specific airport and each landmark's location relative to each runway touchdown point 40, 140.

Landmark locations are stored in 3-dimensional coordinates according to any technique known to those of skill in the art. In the example of FIG. 5, the location 142 of a first touchdown point 40 corresponds to (x,y,z) coordinates (0,0,0). The location of a second touchdown point 140 corresponds to (x,y,z) coordinates (tpx, tpy, tpz). The locations 144, 146 of hanger landmarks 36, 38 correspond to (x,y,z) coordinates (lx1, ly1, lz1) and (lx2, ly2, lz2), respectively. The location 148 of building landmark 30 corresponds to (x,y,z) coordinates (lx3, ly3, lz3). The location 150 of control tower landmark 32 corresponds to (x,y,z) coordinates (lx4, ly4, lz4).

The invention utilizes approximately three to six landmarks to characterize any airport and perform the feature correlation function with a 99.9% probability of correctly confirming the airport identification while limiting the probability of false confirmation to 1 in 1 million. The probability of the invention being unable to either correctly or falsely confirm the airport identification is 1 in 1,000.

Position reference function 102 uses input from global positioning system receiver 104 and/or inertial measurement unit 106 to compute an absolute global position, range to touchdown, line-of-sight velocity, and acceleration. The absolute global position is used to access the landmark reference data stored in stored features data base 108. Position reference function 102 then calculates the aircraft's position relative to stored landmark locations and uses the results to update position, range to touchdown, line-of-sight velocity, and acceleration information. The absolute and relative position data are calculated and up-dated at an update rate of 47 Hz.

1.3 Feature Extraction

Feature extraction function 114 is used to identify landmarks that are above a selected elevation clearance plane 44. The height of elevation clearance plane 44 is selected to yield the desired number of features. As noted above, approximately 6 to 10 features are selected for correlation with reference data stored in stored features function 108. The peak height for each valid range gate of each dwell is applied to threshold and acceptance logic function 182 which thresholds the peak height to determine whether the range bin is above the selected clearance plane 44. The invention codes the thresholded data into three categories: below buffer zone, above buffer zone, and unknown. The thresholded data is also used by intrusion detection function 122 to issue ground collision avoidance warnings.

1.4 Feature Correlation, Airport Confirmation and Runway Orientation

Feature correlation function 116 correlates the terrain features extracted from the radar image against pre-stored features for the destination airport. The correlation function compares the prestored reference image with the radar generated image to determine translation errors. Rotation and scaling errors are assumed to be small.

Translation errors occur in both range and cross-range. FIG. 10a shows an example of translation errors between a reference image 117a and a radar derived image 117b. FIG. 10b shows the auto-correlation of the reference image, which has no translation error, and the correlation of the reference image with the radar image, which shows translation errors in range and cross range. Note that the unmatched radar data and reference data themselves have little or no impact on the correlation outcome. Furthermore, the correlation limit is ±10 positions in range and cross range.

Figure 11:
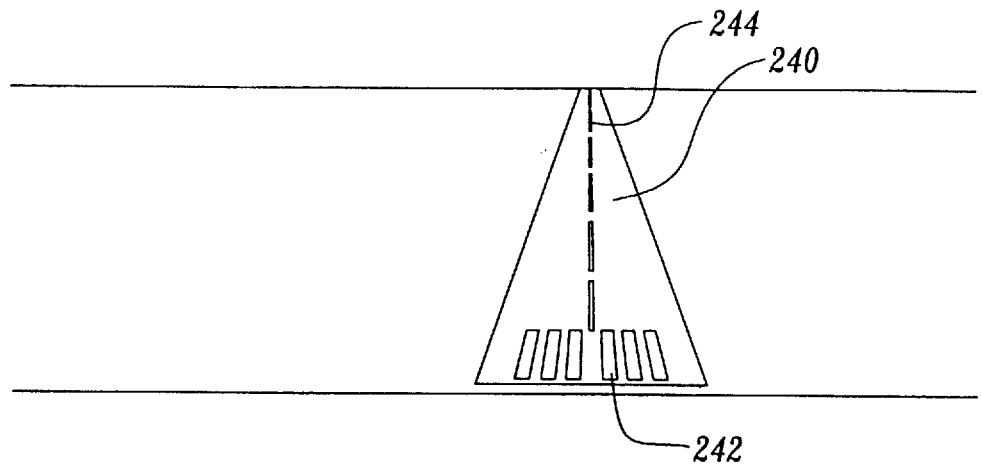
FIG. 11 shows an example of autonomous landing guidance mode data as displayed on a Heads-up Display according to one embodiment of the present invention.

Airport identification function 118 evaluates output of feature correlation function 114 to determine whether a sufficiently strong match exists between the radar profile and the stored airport reference. A correlation index is computed based on the degree of correlation, scan-to-scan variation and residual errors. When the correlation index is above a preselected level, for example, 90%, the invention uses the runway orientation, width, and other characteristics stored in the data base to generate a display template in the Head-up Display format as shown in FIG. 11. The Head-up Display format shows the runway 240, the runway touchdown point 242, and the runway centerline 244. The display template is transmitted for display on the aircraft's Head-up Display. Optimally, the invention also transmits the computed correlation index to the aircraft's sensor fusion processor. The sensor fusion processor may be used to integrate the synthetic image generated by the Head-up Display format display template with the aircraft's other sensor images on multifunction displays.

1.5 Navigation Error Computation

Following completion of airport identification function 118, position data generated by position reference function 102 of FIG. 3 calculates the aircraft's position relative to the stored landmark location. The results are transmitted to navigation error measurement function 120 which computes navigation errors relative to runway touch down point 142. The navigation errors computed include: range, azimuth angle, elevation angle, and velocity. In a preferred embodiment of the invention, these navigation errors and any other computed navigation errors are transmitted to the aircraft's sensor fusion processor to facilitate display of position and runway alignment information to the pilot. The pilot can then use this visual display of alignment data to maintain or correct the aircraft flight path. Optimally, the navigation errors may be provided as input to an autoland or other flight control system as of the type known to those of skill in the art. Examples of the design of such systems are described in "Aircraft Control and Simulation" by Brian Stevens and published by John Wiley and Sons and "Automatic Control of Aircraft and Missiles" by John H. Blakelock also published by John Wiley and Sons.

1.6 Terrain and Obstacle Detection Function

Terrain and obstacle detection function 110 of the present invention provides real-time situational awareness by providing a terrain radar image which defines the terrain ahead of the aircraft, including mapped and unmapped obstacles. The terrain and obstacle detection function uses the weather radar to image both natural terrain and man-made terrain and provide obstacle warnings. The radar-imaged terrain includes natural terrain, including unmapped new terrain created by earth movements, and man-made terrain, for example, radio towers, hangers, control towers, or other buildings, and vehicular traffic. The radar-imaged terrain can be used for runway and airport identification as described above and/or for terrain and obstacle avoidance.

Because the aircraft is moving relative to the terrain, terrain and obstacle detection function 110 must account for Doppler shift. The Doppler shift in pulsed radar is manifested in the phase of target echo signals from hit to hit. In order to recover the Doppler shift, the system measures and records the phase of each received echo. Samples of the target's position and amplitude may be gathered in by direct sampling or I/Q sampling. Although radar target echo signals may be sampled by direct sampling, the sense of the Doppler shift, the information as to whether the target was closing or moving away, is lost. Thus, most radar recover the Doppler shift using I/Q sampling to gather the target's position and amplitude information, where "I" stands for in-phase and is the cosine or real component of the signal and "Q" stands for quadrature and is the sine or imaginary component of the signal. The method of I/Q recovery is well known to those of skill in the art.

Figure 6:
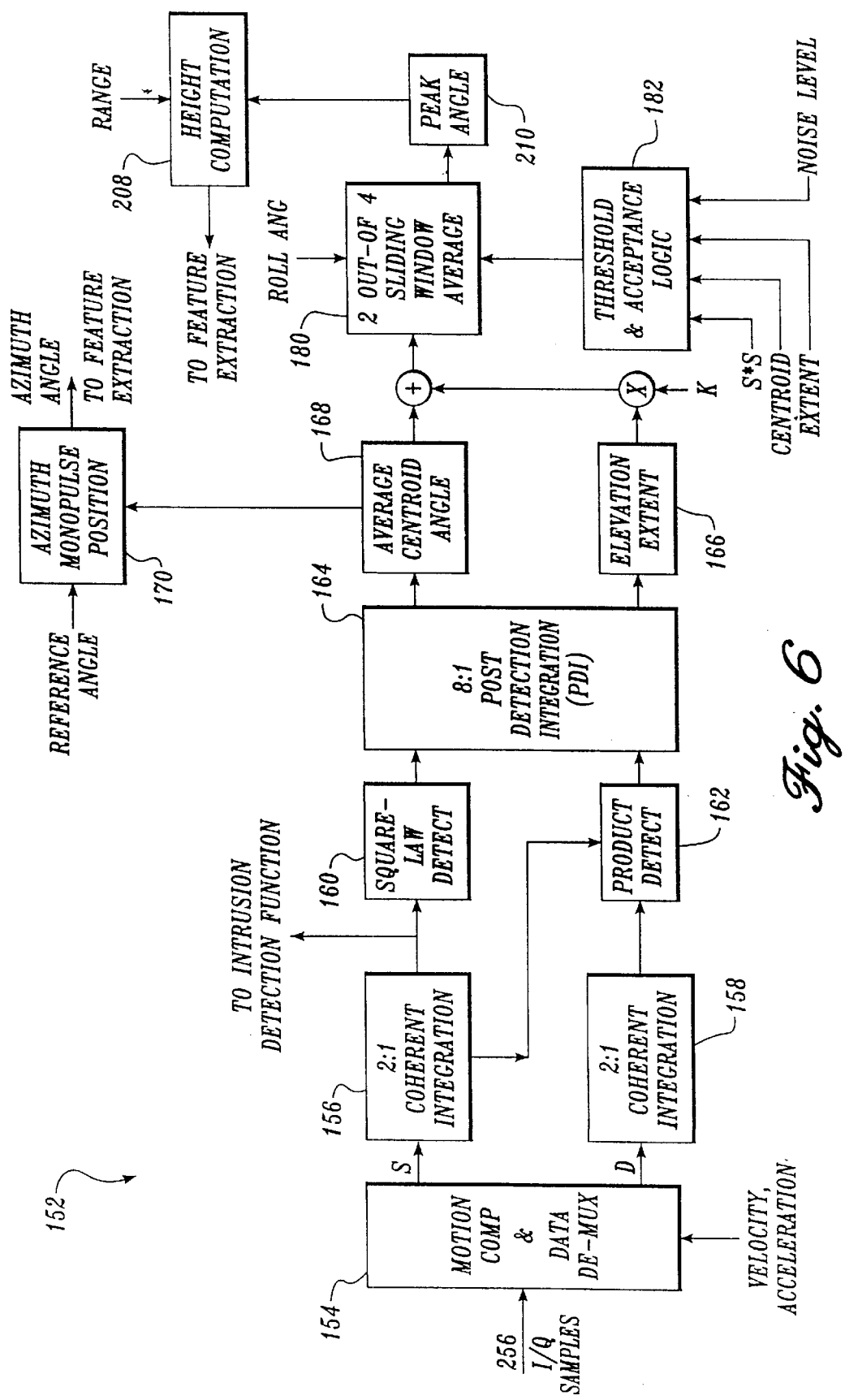
FIG. 6 illustrates a signal processing algorithm for terrain and obstacle detection function and azimuth position sharpening function according to one embodiment of the present invention.

FIG. 6 shows a signal processing algorithm 152 for terrain and obstacle detection function 110 and azimuth position sharpening function 112 according to one embodiment of the present invention. Additional embodiments of the terrain and obstacle detection mode are discussed in detail later. Signal processing algorithm 152 includes multiple ports for receiving I/Q samples from a I/Q demodulator and aircraft velocity data and aircraft acceleration data from appropriate navigation sensors and applies the various data to a motion compensator/data de-multiplexor 154. The motion compensation phase of motion compensator/data de-multiplexor 154 removes the Doppler shift caused by aircraft motion. The data de-multiplexor phase demodulates the radar signals for local oscillator, LO, phase coding. The phase shift caused by aircraft motion at each pulse repetition interval is given by:

$$\Phi_i = \frac{4\pi}{c} F_i \Delta R_i \qquad \text{Eq (1)}$$

where:

c=speed of light;

F=radio frequency in Hz;

i=pulse repetition interval number=1, 2, . . . 128; and

ΔR=change in range since the beginning of the dwell.

$$\Delta R = V_{los} * \Delta T \times i + 0.5 (A_{los} * \Delta T \times l)^2 \qquad \text{Eq (2)}$$

ΔT=1/pulse repetition frequency;

$V_{los}$=line-of-sight velocity; and $A_{los}$=line-of-sight acceleration.

The input data is motion compensated and phase demodulated according to:

$$CX_i = X_i \times e^{i(+)}{}_{ic} \qquad \text{Eq (3)}$$

where:

$X_i$=complex radar data;

$\Phi_c$=local oscillator phase modulation code O, Π, . . . ; and $CX_i$=corrected complex data.

The complex data is then de-multiplexed to form Sum and Delta channels according to:

S (n,f) and D(n,f)

where:

n=coherent pulse repetition interval number 1, 2, ..., 16;
f=frequency number 1, 2, ..., 8;
S=SUM channel data; and
D=Delta channel data.

Motion compensator/data de-multiplexor 154 includes a Sum channel output and a Delta channel output. The Sum channel data is applied to a first 2:1 Sum channel coherent integrator 156 where the complex data for each frequency and each range gate are coherently integrated over 16 pulse repetition intervals according to:

$$S(f) = \sum_{n=1}^{16} (S(n, f))$$ Eq (4)

The Delta channel data is applied to a second 2:1 Delta channel coherent integrator 158 where the complex data for each frequency and each range gate are coherently integrated over 16 pulse repetition intervals according to:

$$D(f) = \sum_{n=1}^{16} (D(n, f))$$ Eq (5)

The coherent integration is used for gain over noise and cancellation of complementary code sidelobes. The output of the Sum channel coherent integrator 156 is applied to a square law detector 160 which uses the Sum channel coherent integrator 156 data to compute SS* and DD* for use in the monopulse angle calculation according to:

$$SS^* = (S_I + jS_Q) \times (S_I - jS_Q) = S_I^2 + S_Q^2; \text{ and}$$ Eq (6)

$$DD^* = (D_I + jD_Q) \times (D_I - jD_Q) = D_I^2 + D_Q^2.$$ Eq (7)

The Sum channel coherent integrator 156 includes a second output which is applied to intrusion detection function 122. Signal processing algorithm 152 includes a product detector 162. The outputs of both Delta channel coherent integrator 158 and Sum channel coherent integrator 156 are applied to the product detector 162 which combines the signals to calculate Real[DS*] and Imaginary[DS*] used in angle measurement according to:

$$Re[DS^*] = S_I \times D_I + S_Q \times D_Q; \text{ and}$$ Eq (8)

$$Im[DS^*] = S_I \times D_Q - S_Q \times D_I.$$ Eq (9)

Square law detector 160 output, SS* and DD*, and the product detector 162 output data, Real [DS*] and Im[DS*], is applied to a 8:1 post detection integrator 164. Post detection integrator 164 provides non-coherent integration of SS* and DD* and Real[DS*] and Im[DS*] over the eight frequencies of the four frequency subbands of the mode waveform.

$$\overline{SS} = \sum_{nf} SS^*; \quad \overline{DD} = \sum_{nf} DD^*;$$ Eq (10)

$$\overline{Re[DS]} = \sum_{nf} Re[DS^*]; \quad \overline{Im[DS]} = \sum_{nf} Im[DS^*].$$ Eq (11)

Post detection integrator 164 data is manipulated by an elevation extent function 166 to calculate an elevation extent where the elevation extent or height above terrain of vertically extended targets, for example, a tower, is estimated from the standard deviation of the monopulse measurement over the multiple frequencies. The weighted extent is computed according to:

$$\sigma = kext * \sqrt{\left((\overline{DD})^2 - (\overline{Re[DS]})^2 - (\overline{Im[DS]})^2\right)/(\overline{SS})^2}$$ Eq (12)

where:
σ=target extent; and
kext=extent factor nominal value=1.7.

An average centroid angle function 168 calculates an average centroid angle using the output of post detection integration 164. The centroid angle and a reference angle are input to an azimuth monopulse position function 170 to determine an azimuth monopulse position. The resulting azimuth angle is provided to feature extraction function 114. The target's off-boresight angle, μ, is directly proportional to the ratio Re[DS*]/SS* and is calculated according to:

$$\mu = kslope \times \frac{\overline{Re[DS]}}{\overline{SS}}$$ Eq (13)

where:
kslope=an empiracally determined antenna slope factor.

1.6.1 Radio Frequency Bandwidth

The bandwidth of the transmitted signal determines the range resolution performance and frequency agility capabilities of the radar. Range resolution is the ability to separately detect multiple targets appearing simultaneously in the beam. Range resolution is a function of the radar radio frequency signal bandwidth. Generally, wide bandwidths allow resolution of more closely spaced targets. Range resolution requires the targets to be separated by a larger range when the pulse width is long. Range resolution of multiple targets requires that the individual targets be separated by at least the range equivalent of the width of the processed echo pulse. Although range resolution may be enhanced using pulse compression, which eliminates the trade-off of wide pulses for the high energy needed for target detection against narrow pulses for range resolution, range resolution can be generally defined by signal bandwidth according to the relationship:

$$\Delta R \approx c/(2B),$$ Eq (14)

where:
ΔR=the range resolution in meters;
c=the velocity of propagation in meters per second; and
B=the echo waveform's matched bandwidth in Hertz.

Transmit/receive waveform dwell 130 shown in FIG. 4 includes 128 pulses, collected over 4 frequency sub-bands each having 8 different frequencies. The number of frequencies and the spacing between them are selected to satisfy three criteria: having a minimum number of samples or frequencies such that angle averaging results in true spatial averaging; maximizing non-coherent gain from frequency agility to produce smooth averaging; and having a statistically high number of samples of frequencies such that the estimate of elevation extent or height above terrain is accurate.

The autonomous landing guidance invention uses frequency agility to reduce amplitude scintillation of backscattering from distributed targets. Thus, if N observations of randomly distributed targets are made at N different frequencies separated by a minimum delta frequency, ΔF, then the average of the N measurements is statistically equivalent to the average of N spatially independent observations of the distributed target. In other words, frequency agility is used to reduce glint and the fading variance just as spatial averaging would. Wehner, Donald R., *High Resolution Radar*, Artech House, Inc., Norwood, Mass. 1987, incorporated herein by reference, shows that the greatest gain from frequency agility is obtained from the first 6 to 10 independent samples. Therefore, the present invention uses 8 frequencies in a preferred embodiment. The minimum frequency spacing ΔF is given by:

$$\Delta F = c/2\Delta R, \qquad \text{Eq (15)}$$

where:

c=speed of light; and

ΔR=range depth of the narrowest target of interest.

For example, if monopulse measurements are desired on very narrow, for example, ≦20 feet, but high radio towers, then the minimum frequency spacing is 20 MHz according to the relationship of range resolution to signal bandwidth shown above.

A radio tower is made visible to radar imaging by scatterers placed at various points amid its structure, each of which acts as a target to reflect the radar signal. A narrow beamwidth is unable to resolve the closely packed scatterers into individual targets. The result is an averaging of the echoes from the several individual tower scatterers which appear simultaneously in the beam. Thus, a narrow beamwidth can measure the average height of, for example, a very narrow but high radio tower, but cannot accurately measure the radio tower's elevation extent or height above terrain.

Figure 7A:
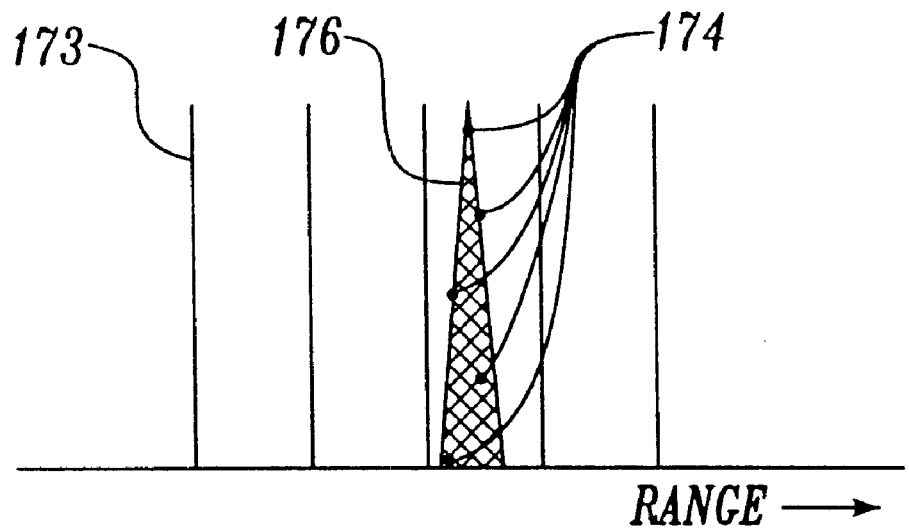
FIG. 7a illustrates narrow bandwidth radar resolution of dominant radio tower scatterers.
Figure 7B:
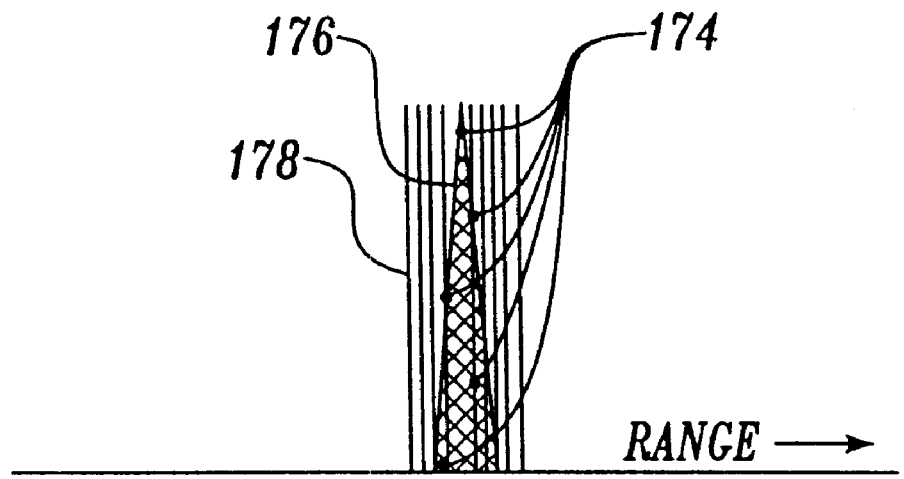
FIG. 7b illustrates radar resolution of dominant radio tower scatterers using wide bandwidth radar according to one embodiment of the present invention.

FIG. 7a illustrates that a narrow bandwidth 173 radar cannot resolve dominant radio tower scatterers 174 of a tall, very narrow target 176 equipped with radar scatterers. Narrow beamwidth radar 173 measures average height but cannot measure elevation extent or height above terrain which limits effective resolution. FIG. 7b illustrates that, conversely, a wide bandwidth radar 178, constructed according to the invention, effectively resolves radio tower 176 into individual dominant radio tower scatterers 174 and accurately measures the average centroid angle and elevation extent or height above terrain of radio tower 176 to a 3-foot effective resolution. The total frequency agile bandwidth selected for detecting and measuring the radio tower is then approximately 160 MHz. This bandwidth effectively samples the tower scatterers to approximately 1 meter range resolution which enables the radar to detect the top of high narrow radio towers.

1.6.2 Top of Terrain Estimate

A top-of-target angle calculation is performed by signal processing algorithm 152 of FIG. 6. The top-of-target angle is equal to the average centroid angle plus the elevation extent or height above terrain. The top-of-target angle is added to the horizontal referenced elevation angle, which is computed based on the antenna elevation angle and the tilt angle, to compute the target elevation angle below horizontal. In addition, the off-boresight angle is roll compensated according to:

$$\beta_{top} = \phi_{ref} + (\mu + \sigma) \times \cos(\rho) \qquad \text{Eq (16)}$$

where:

$\phi_{ref}$=horizontal referenced antenna elevation pointing angle, provided at a minimum rate of 100 Hz; and ρ=roll angle.

The top-of-target angle is then applied to a sliding window averager 180 which is also an M-of-N detector. A target angle measurement is valid according to the M-of-N detector of the invention if the target angle measurement is detected in at least 2 of 4 frequency sub-bands where each dwell covers approximately 1 degree of antenna scan. Therefore, the typical aircraft weather radar antenna with a 3-degree beam width will scan past a target in three dwells. The M-of-N sliding window averager 180 is used to improve probability of detection and reduce false alarm rate.

Figure 8A:
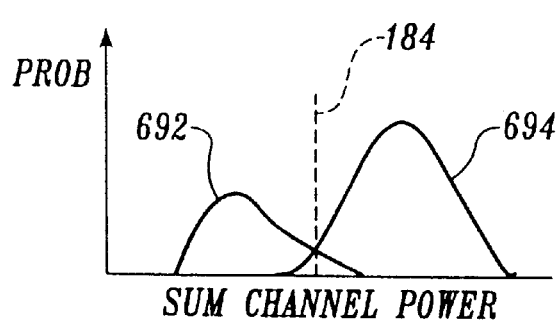
FIG. 8a illustrates a valid range gate having a signal-to-noise ratio which exceeds a preselected threshold setting according to one embodiment of the present invention.
Figure 8B:
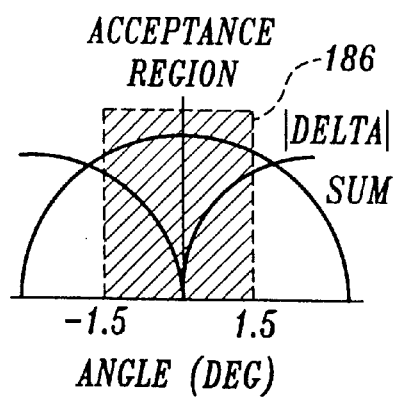
FIG. 8b illustrates the angle of arrival of a valid range gate according to one embodiment of the present invention.

The SS*, power data, centroid, extent and noise level data are applied to a thresholding and acceptance logic function 182 which validates each range gate of each dwell. A valid range gate satisfies three separate criteria: (1) a signal-to-noise ratio which exceeds a preselected threshold setting 184 as illustrated in FIG. 8a; (2) an angle of arrival within the antenna linear monopulse region 186 of FIG. 8b; and (3) Both the elevation extent or height above terrain and range extent are consistent with a valid target as illustrated in FIG. 8c.

Figure 8C:
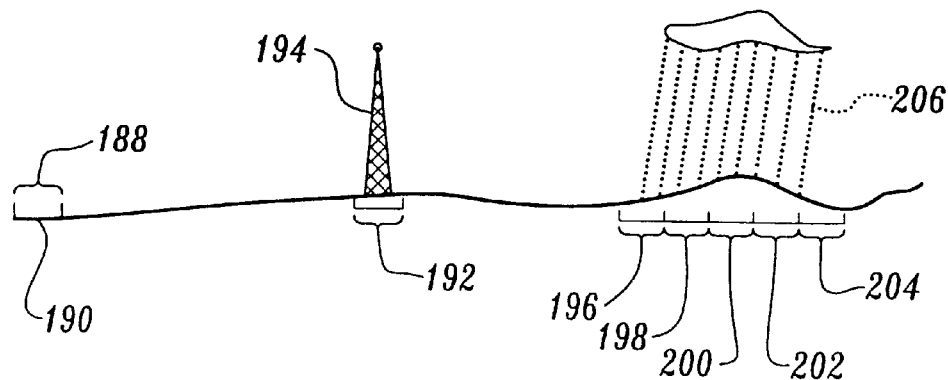
FIG. 8c illustrates both the elevation extent or height above terrain and range extent for a valid range gate according to one embodiment of the present invention.

Several examples showing application of the latter criterion are illustrated in FIG. 8c. In a first example, a range bin 188 including terrain 190 is accepted because terrain 190 exhibits a very low elevation extent. In a second example, a range bin 192 including a radio tower 194 is accepted because tower 194 exhibits a high elevation extent or height above terrain and a low range extent. In another example, range bins 196, 198, 200, 202, 204 including heavy rain 206 will be rejected by thresholding and acceptance logic function 182 because heavy rain 206 exhibits a combination of high elevation extent and large range extent considered inconsistent with a valid target.

A height computation function 208 estimates the highest point in each range gate, peak angle, $\beta_{peak}$, by peak detecting over two dwells the data computed by the sliding window averager 180 according to:

$$\beta_{peak} = \max[\beta_{top}(n)] \qquad \text{Eq (17)}$$

where:

n=dwell number 1, 2 . . . .

Height computation function 208 then converts the peak angle calculated by a peak angle computation function 210 into target height by multiplying the peak angle by the range. The results of height computation function 208 are output to feature extraction function 114.

1.6.3 Azimuth Monopulse Sharpening

Figure 9:
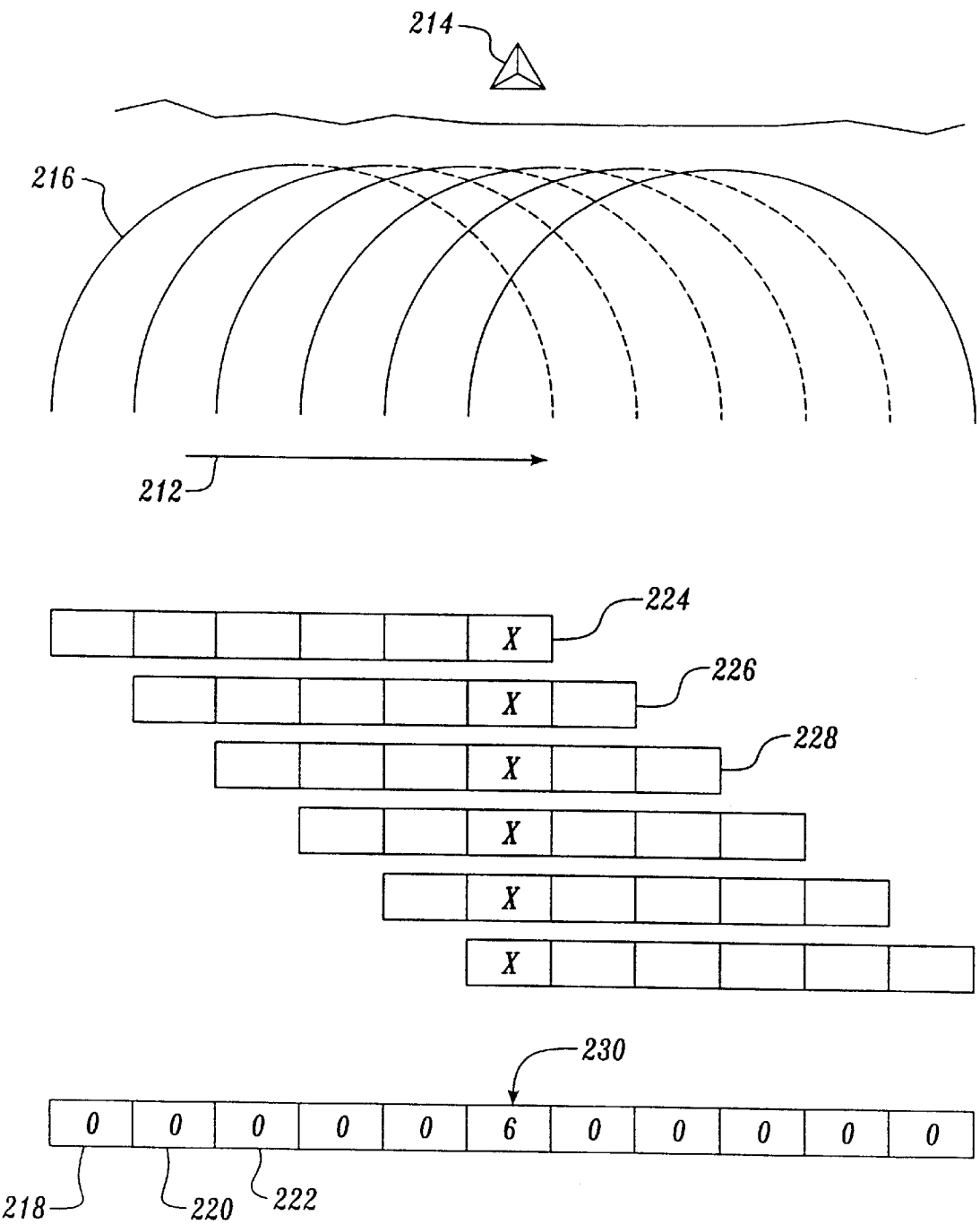
FIG. 9 illustrates the azimuth beam sharpening concept according to one embodiment of the present invention.

Monopulse sharpening techniques improve target azimuth position accuracy over the real-beam imaging techniques described above. FIG. 9 illustrates the azimuth beam sharpening concept of the present invention. In FIG. 9 beam scan direction 212 is indicated by the arrow. Azimuth monopulse angle measurements are used to accurately determine the azimuth position of significant radar reflectors such as the point target 214. The Sum beam scan 216 of the scanned space is divided into small angular bins 218, 220, 222, . . . of 0.3 degrees or less, then target monopulse angles 224, 226, 228, . . . are weighted based on the intensity at that specific scan direction and a statistical probability of target extent is calculated based on the number of measurements 230 appearing in angular bins 218, 220, 222, . . . .

The azimuth off-boresight angle of a target is given by:

$$\mu_{az} = kslope \times \frac{\text{Re}[DS]_{az}}{SS_{az}} \qquad \text{Eq (18)}$$

The azimuth off-boresight angle is then added to the reference antenna azimuth angle and quantized to determine the appropriate azimuth angular bin according to:

$$\alpha = \phi_{ref} + \mu_{ac} \times \cos(\rho) \quad \text{Eq (19)}$$

$$i = \text{nint}(/d) \quad \text{Eq (20)}$$

where:
 d=azimuth bin size=0.3 degrees;
 i=quantized azimuth angle; and
 nint=nearest integer value.

The peak elevation angle for the coherent processing interval (CPI) is weighted by the average power and then positioned in the appropriate azimuth bin:

$$\hat{\beta}(i) = \hat{\beta}(i) + \beta_{peak} \times \overline{SS}_{ac} \quad \text{Eq (21)}$$

The total power in each azimuth angular bin is accumulated according to:

$$\hat{P}(i) = \hat{P}(i) + \overline{SS}_{ac} \quad \text{Eq (22)}$$

The average peak angle is computed according to:

$$\overline{\beta}(i) = \hat{\beta}((i)/\hat{P}(i)) \quad \text{Eq (23)}$$

Figure 10:
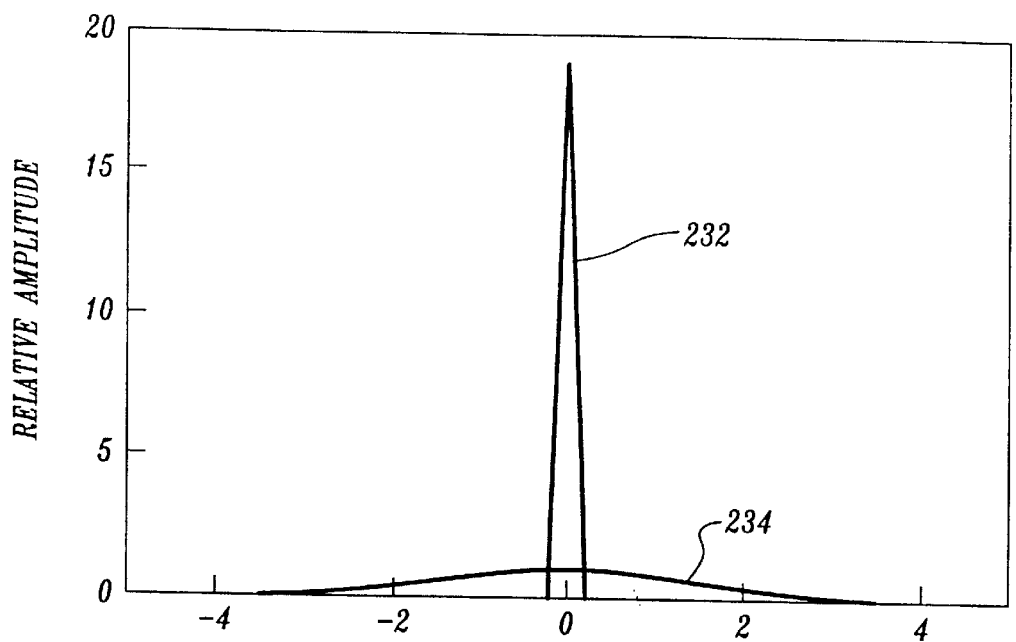
FIG. 10 illustrates antenna scan angle in degrees versus relative amplitude for both a real-beam image and a monopulse sharpened image according to one embodiment of the present invention.
Figure 10A:
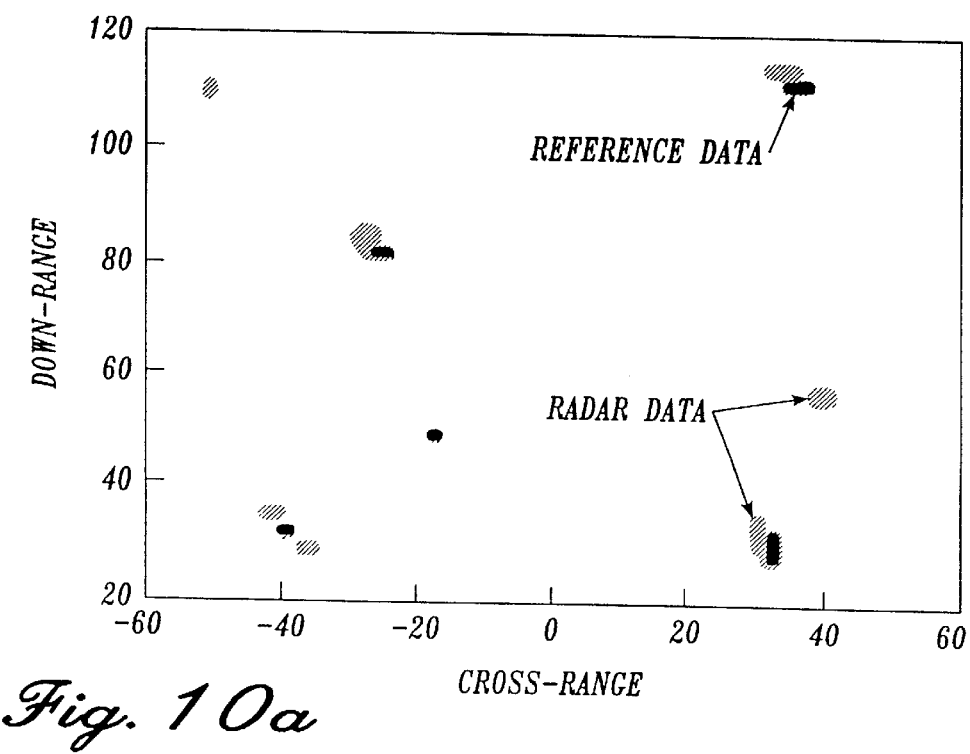
FIG. 10a illustrates translation errors in between a reference image and a radar derived image according to an embodiment of the present invention.

FIG. 10, discussed in greater detail later, illustrates antenna scan angle in degrees versus relative amplitude for both a monopulse sharpened image 232 and a real-beam image 234. FIG. 10 illustrates the improvement resulting from monopulse beam sharpening, according to the invention, over real-beam image 234.

Optionally, other techniques for nonpulse beam sharpening known to those of skill in the art may be used. An alternative monopulse beam sharpening technique according to another embodiment of the invention is described later in this specification.

1.6.4 Clutter-to-Noise Ratio

Figure 12:
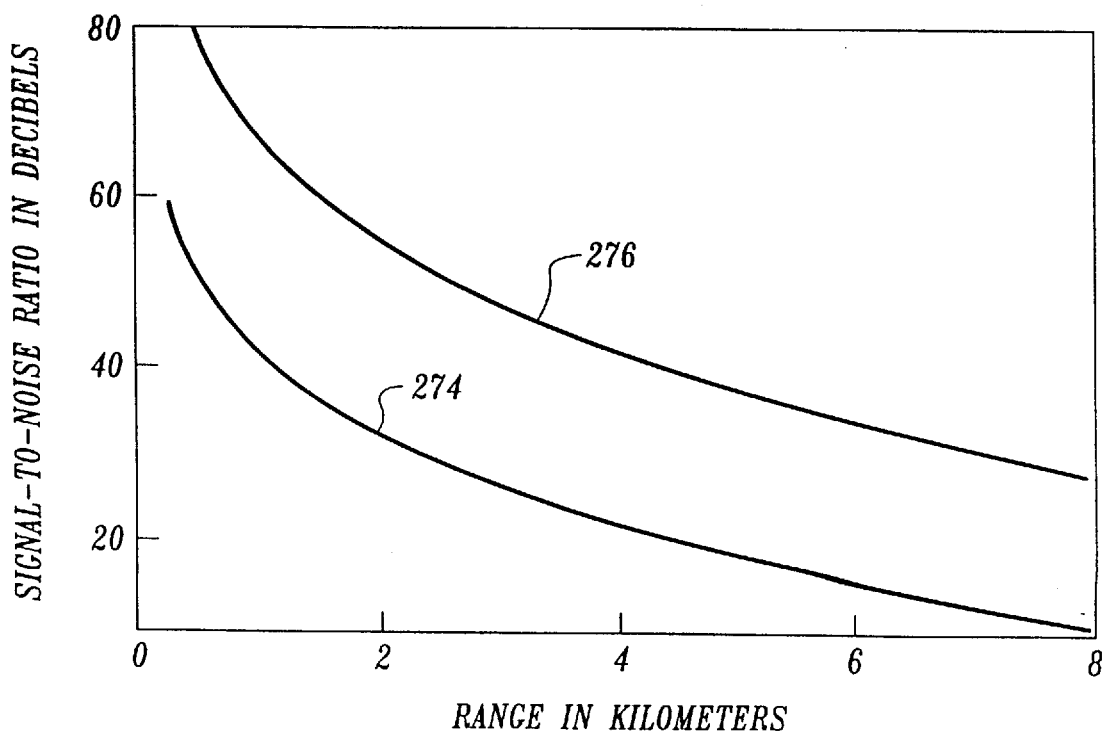
FIG. 12 illustrates the terrain and obstacle detection mode signal-to-noise ratio for terrain and landmarks with intervening rain according to one embodiment of the present invention.
Figure 13:
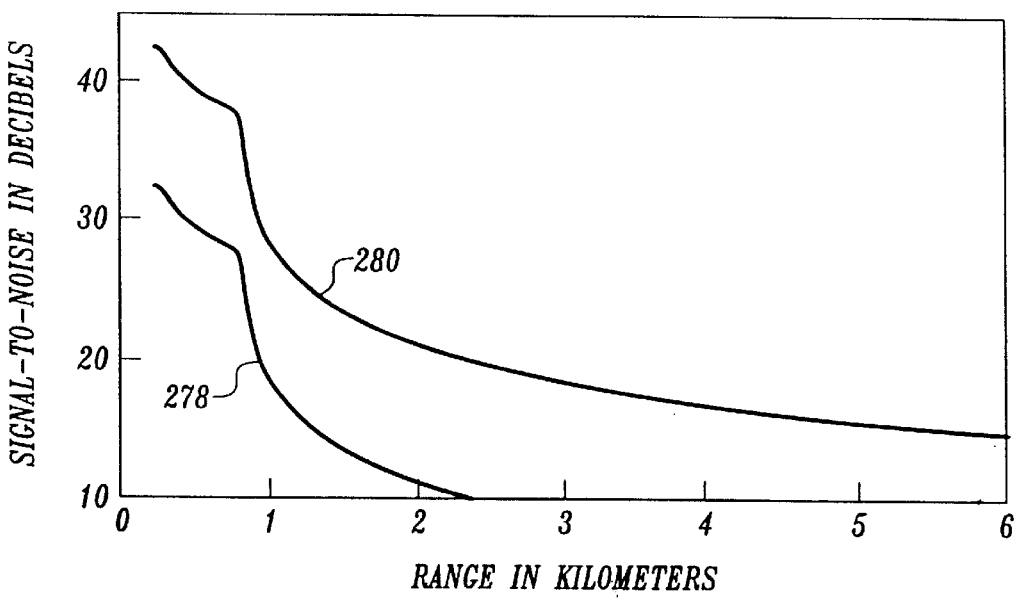
FIG. 13 illustrates the signal-to-clutter ratios for various runway intrusion targets according to one embodiment of the present invention.

FIG. 12 shows the terrain and obstacle detection mode clutter-to-noise ratio for −35 dB square meter per square meter terrain 274 and 100 square meter landmarks 276 with a 12 millimeter per hour intervening rain when using an autonomous landing guidance radar system conforming to the expanded system parameters of Table 2. The radar cross-section of most landmarks of interest, buildings, hangars and towers, are expected to be much larger than 100 square meters. FIG. 13 illustrates the signal-to-clutter (S/C) ratios for 1 square meter runway intrusion target 278 and a 10 square meter runway intrusion target 280. Assuming a Swirling type 1 target with runway backscatter of −50 dB square meter per square meter and grass backscatter of −50 dB square meter per square meter, the signal-to-clutter ratio for a 90% single look probability of detection ($Pd_1$) is 15 dB. The probability of detection using look-to-look correlation is given by:

$$Pd_2 32\ 1-(1-Pd_1)^2. \quad \text{Eq (24)}$$

Look-to-look correlation is used to provide a high probability of detection while minimizing the probability of a false alarm.

1.6.5 Measurement Accuracy

When absolute height measurements are required, for example, in a ground collision avoidance situation, the radar measurement errors are considered in addition to all other alignment errors in order to predict the overall system performance. The ground collision avoidance situation is discussed later. When the terrain and obstacle detection function is used to extract high elevation landmarks, only the relative height measurement is generally utilized for collision avoidance. All common errors, for example, static and low frequency dynamic errors, can generally be ignored since such errors only bias height measurements up or down. The process of adaptive elevation cuts, discussed above at feature extraction function 114, allows selection of as many features as required to perform the correlation with the stored reference. The height measurement accuracy provides correlation even on features that are not highly extended, for example, features extending as little as 10 meters above the surrounding terrain.

Figure 14:
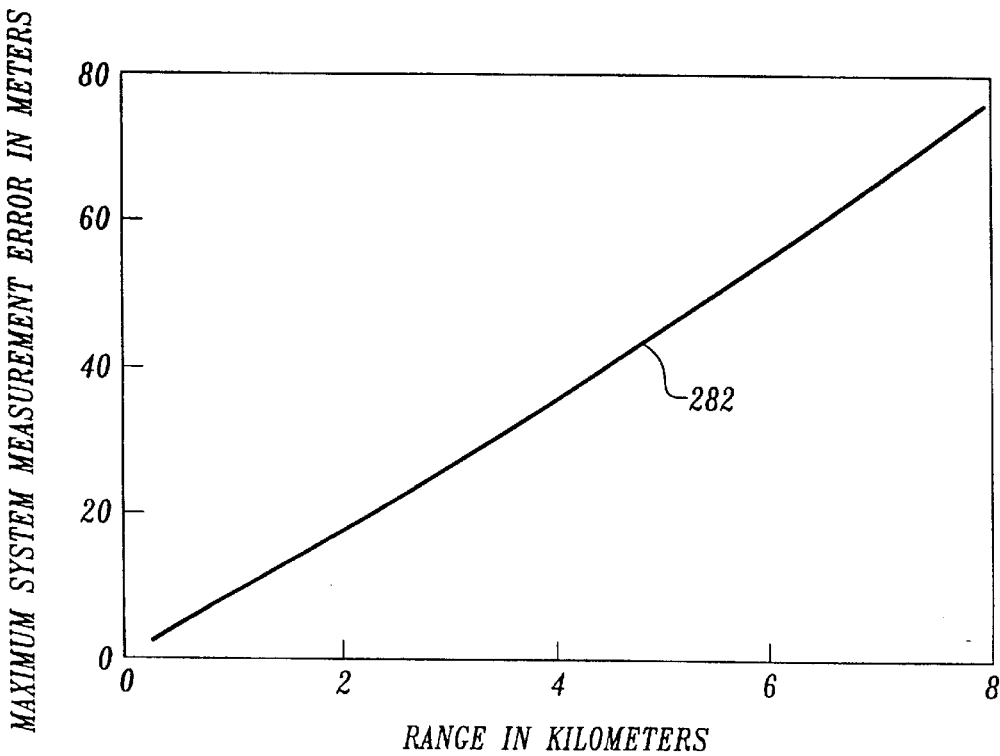
FIG. 14 shows the autonomous landing guidance system height measurement performance curve in a typical airline airframe for terrain with an intervening rain versus range according to one embodiment of the present invention.

FIG. 14 shows the autonomous landing guidance system height measurement performance curve 282 in a typical airline airframe for −35 dB square meter per square meter terrain with a 12 millimeter per hour intervening rain versus range in kilometers when using a system conforming to the system parameters of Table 2. In most radar applications nearly all height error is due to mechanical misalignment errors rather than radar monopulse angle measurement errors. Therefore, more accurate height measurement performance may be obtained for a specific application by performing more accurate boresight corrections on the radar after it is mounted.

1.6.6 Intrusion Detection

Intrusion detection function 122 of FIG. 3 provides the flight crew with real-time situational awareness by providing warnings of obstacles in the aircraft's path. The runway area is normally clear of targets or obstructions. If intrusion detection function 122 detects an image above the threshold, an alert is generated.

Figure 15:
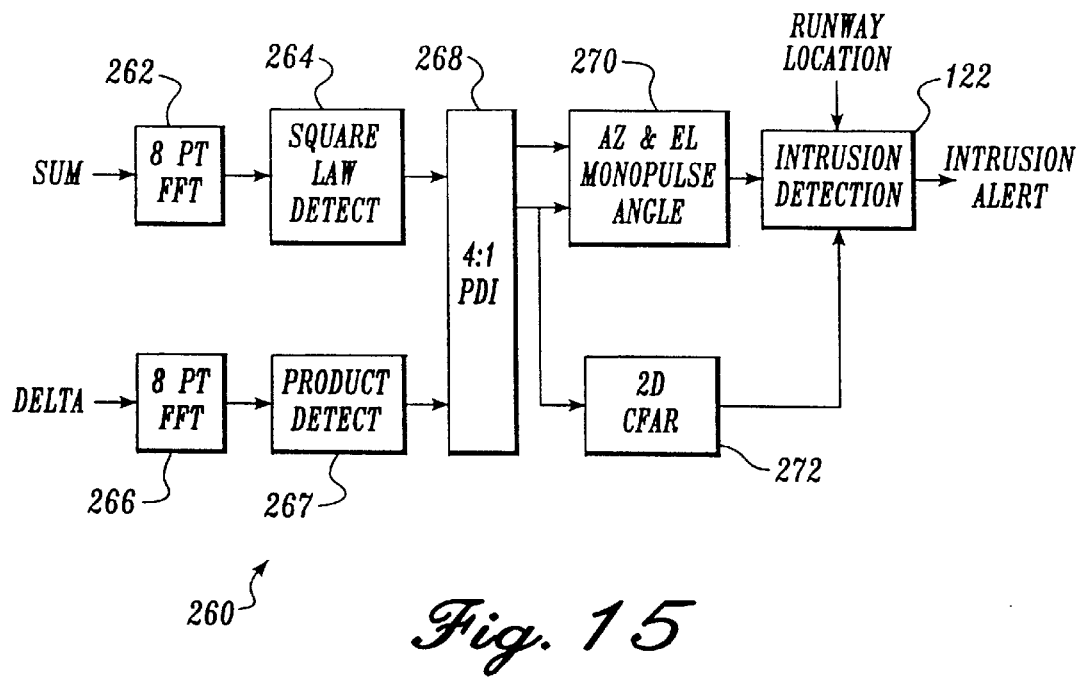
FIG. 15 shows a signal processing algorithm for a runway intrusion detection function according to one embodiment of the present invention.

FIG. 15 shows a signal processing algorithm 260 for runway intrusion detection function 122. Intrusion detection function 122 receives as input the same data used by terrain and obstacle detection function 110. Terrain and obstacle detection function 110 is executed when the radar antenna is in the vicinity of the runway. Range resolution may be enhanced using pulse compression, which eliminates the trade-off of wide pulses for the high energy needed for target detection against narrow pulses for range resolution. Pulse compression is done on waveforms which contain modulation, commonly frequency modulation (FM), within the pulses. The modulation is a frequency sweep across the pulse, called "chirp." Thus, improved range resolution is obtained by processing the frequency chirp data.

Specifically, the radar Sum channel output is applied to an 8 point (8-PT) fast Fourier transform (FFT) function 262 coupled to a downstream square law detector 264, while the Delta channel output is applied to a second 8-PT fast Fourier transform function 266 coupled to a downstream product detector 267. The output of both square law detector 264 and product detector 267 are processed by a 4:1 post detection integrator 268. An azimuth and elevation monopulse angle function 270 computes azimuth and elevation monopulse angles and a two-dimensional constant false-alarm rate (CFAR) 272 is generated. Constant false-alarm rate function 272 sets and applies the detection threshold, according to:

$$CFAR = P_{FA} * R_{DT}, \quad \text{Eq (25)}$$

where:
 $P_{FA}$=the probability of false alarm is the probability that interference alone will cross the threshold for a look or compound test; and
 $R_{DT}$=the rate at which detection tests occur, 1/s is equal to the bandwidth at the point of the test and may be the same as the range bin rate.

Constant false alarm-rate function 152 decides whether or not a target is present. The azimuth and elevation angles, two-dimensional constant false-alarm rate 272, and runway location developed by airport identification and confirmation function 118 are output or provided to intrusion detector 122. Intrusion detector 122 compares the signals against a preselected threshold and generates an intrusion alert signal if appropriate.

1.6.7 Probability of Detection and False Alarm

Figure 16:
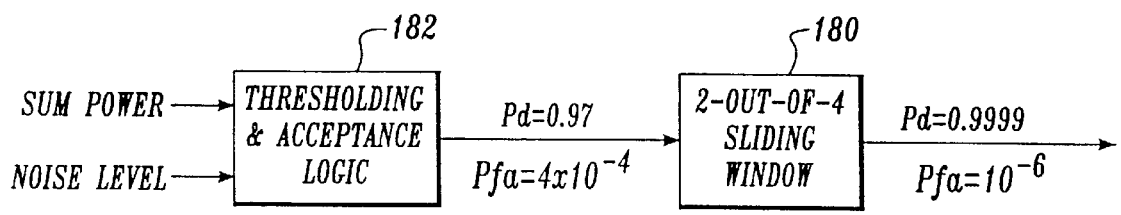
FIG. 16 illustrates the thresholding and acceptance logic function of the terrain and obstacle detection function according to one embodiment of the terrain and obstacle detection function of the present invention.

According to one preferred embodiment, the invention uses look-to-look correlation to provide a probability of detection of an intruding target of 99.99% and a probability of false alarm of $1 \times 10^{-6}$ at the output of terrain and obstacle detection warning function 110. The signal-to-noise ratio satisfying these levels of detection probability and false alarm probability is obtained by determining the desired level of probability of detection and probability of false alarm at the thresholding as shown in FIG. 16. The M of N sliding window effect on probability of detection and probability of false alarm is given by:

$$Po = \sum_{j=m}^{n} \left( \frac{n!}{j!(n-j)!} \right) P^j (1-P)^{n-j} \qquad \text{Eq (26)}$$

where:

P=input probability;

Po=output probability;

n=size of the window; and m=minimum number of hits out of n.

As indicated in FIG. 16, thresholding and acceptance logic function 182 has a probability of detection equal to 0.97 and a probability of false alarm equal to $4 \times 10^{-4}$ based on Sum power and noise level inputs. An output probability of 99.99% results from an input probability of 99%. A false alarm probability of $1 \times 10^{-6}$ at the output of the M of N detector results from an probability of false alarm of $6 \times 10^{-4}$ at the input.

In a situation where terrain clutter behaves as a Swerling case 2 target, and a number of independently fluctuation reflectors of about equal size, a clutter-to-noise ratio of approximately 8.0 dB satisfies a probability of detection and probability of false alarm at the output of the terrain and obstacle detection warning function 48 of 99.99% and $1 \times 10^{-6}$, respectively, when using a system conforming to the system parameters of Table 2 and look-to-look correlation. FIG. 12 shows that a clutter-to-noise ratio of approximately 8.0 dB may be obtained with a 12 millimeter per hour intervening rain at a range of 8 kilometers when using a radar system conforming to the system parameters recited in Table 2.

1.7 Mode of Operation

There are various ways of implementing the autonomous landing guidance mode of the present invention. According to one preferred embodiment of the invention, the present invention uses an X-band radar traditionally used for weather detection and avoidance. When the present invention is implemented using weather radar, compliance must be maintained with current Federal Aviation Administration regulations requiring a weather and windshear detection capability. The windshear detection function is typically enabled below 1,200 feet altitude, in the vicinity of an airport during take off and landing. In addition, the integrity of the radar in weather gathering function should be maintained. The autonomous landing guidance information, according to the present invention, may be interleaved with both the weather information and the windshear information. Various methods of interleaving autonomous landing guidance information with weather and windshear information are possible. The interleaving of autonomous landing guidance information with weather information and windshear information according to one embodiment of the invention is explained below.

Figure 17A:
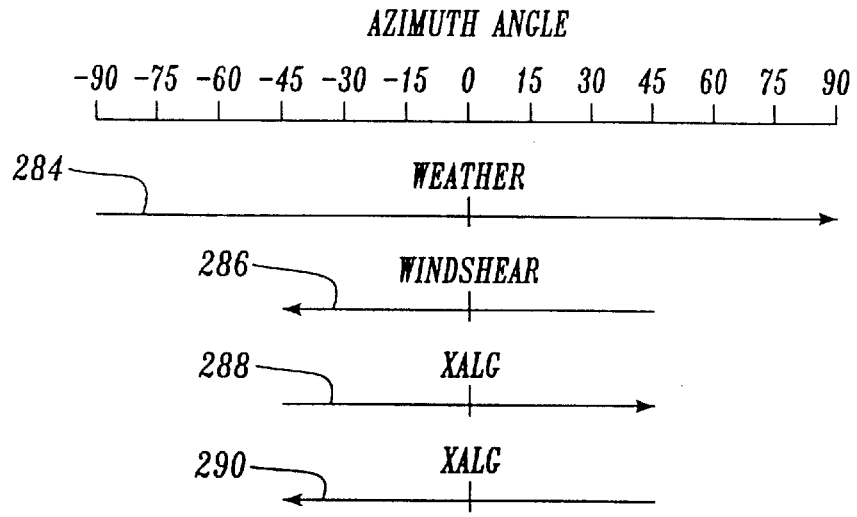
FIG. 17a illustrates the interleaving of weather, windshear, and autonomous landing guidance mode data in a condition where windshear is not present according to one embodiment of the present invention.

FIG. 17a illustrates the interleaving of weather, windshear, and autonomous landing guidance mode data in a condition where windshear is not present. As shown in FIG. 17a, during the first scan 284 of the radar system, weather data is collected and during the second scan 286 windshear data is collected. In a condition where no windshear is detected, the invention uses a third scan 288 and fourth scan 290 to collect autonomous landing guidance mode terrain data.

Figure 17B:
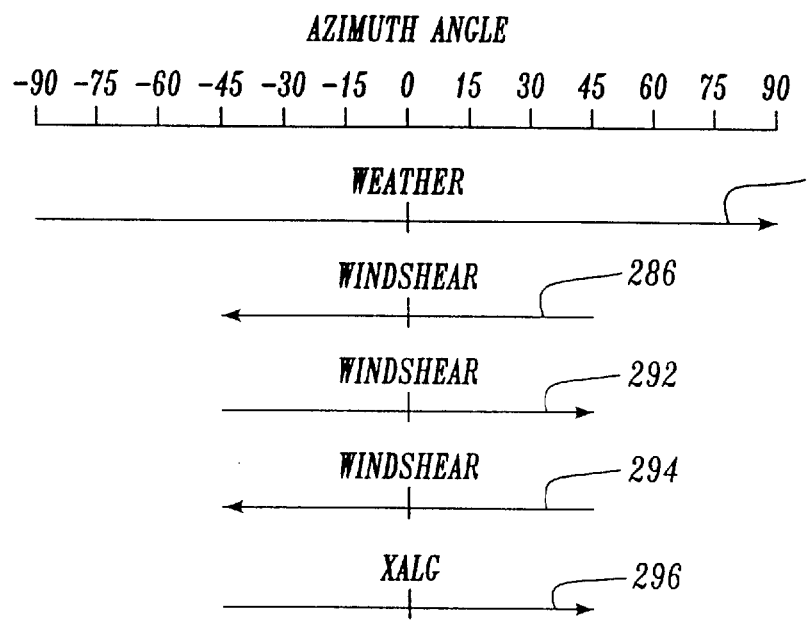
FIG. 17b illustrates the interleaving of weather, windshear, and autonomous landing guidance mode data in a condition where windshear is present according to one embodiment of the present invention.

FIG. 17b illustrates radar operation in the presence of windshear. In FIG. 17b weather data is collected during the first scan 284 of the radar system and windshear data is collected during the second scan 286. When windshear is detected during second scan 286, the invention collects windshear data during a third scan 292 and fourth scan 294 followed by a fifth scan 296 during which autonomous landing guidance mode terrain data is collected. In one preferred embodiment, the autonomous landing guidance mode data collection and processing is accomplished over approximately 2 seconds. During the autonomous landing guidance mode azimuth scan the antenna elevation position is computed based on the aircraft's attitude. The antenna scans a selected azimuth sector centered on the aircraft velocity vector while collecting azimuth and elevation monopulse data at a selected scan rate, for example, the antenna scans a 90 degree azimuth scan sector at 45 degrees per second such that each dwell is collected over approximately 1 degree scan coverage. If intruding targets are detected, the invention displays the intruding targets as previously described.

1.8 Hardware Implementation of Autonomous Landing Guidance System

Table 2 recites the autonomous landing guidance radar system parameters for one preferred embodiment of the present invention. According to one embodiment of the present invention, the radar sensor transmits and receives at frequencies in the general range of 9.32 GHz to 9.48 GHz using a solid state transmitter having on the order of 160 watts peak power. The radar sensor directivity gain is on the order of 35 dB. The radar sensor minimum radio frequency bandwidth is 160 MHz with 32 equally spaced frequency steps. The radar sensor pulse width is from 100 nanoseconds to 512 microseconds. The radar sensor duty cycle is in the general range of 0.06% to 15%. The radar sensor noise figure is 5 dB or less. The radar sensor minimum range resolution capability is 15 m. The radar sensor azimuth angular resolution is on the order of 3 degrees and the elevation angular resolution is on the order of 4 degrees. The radar sensor is capable of performing analog-to-digital conversion of radar data.

1.8.1 Autonomous Landing Guidance Mode Radar Functional Block Diagram

Figure 18:
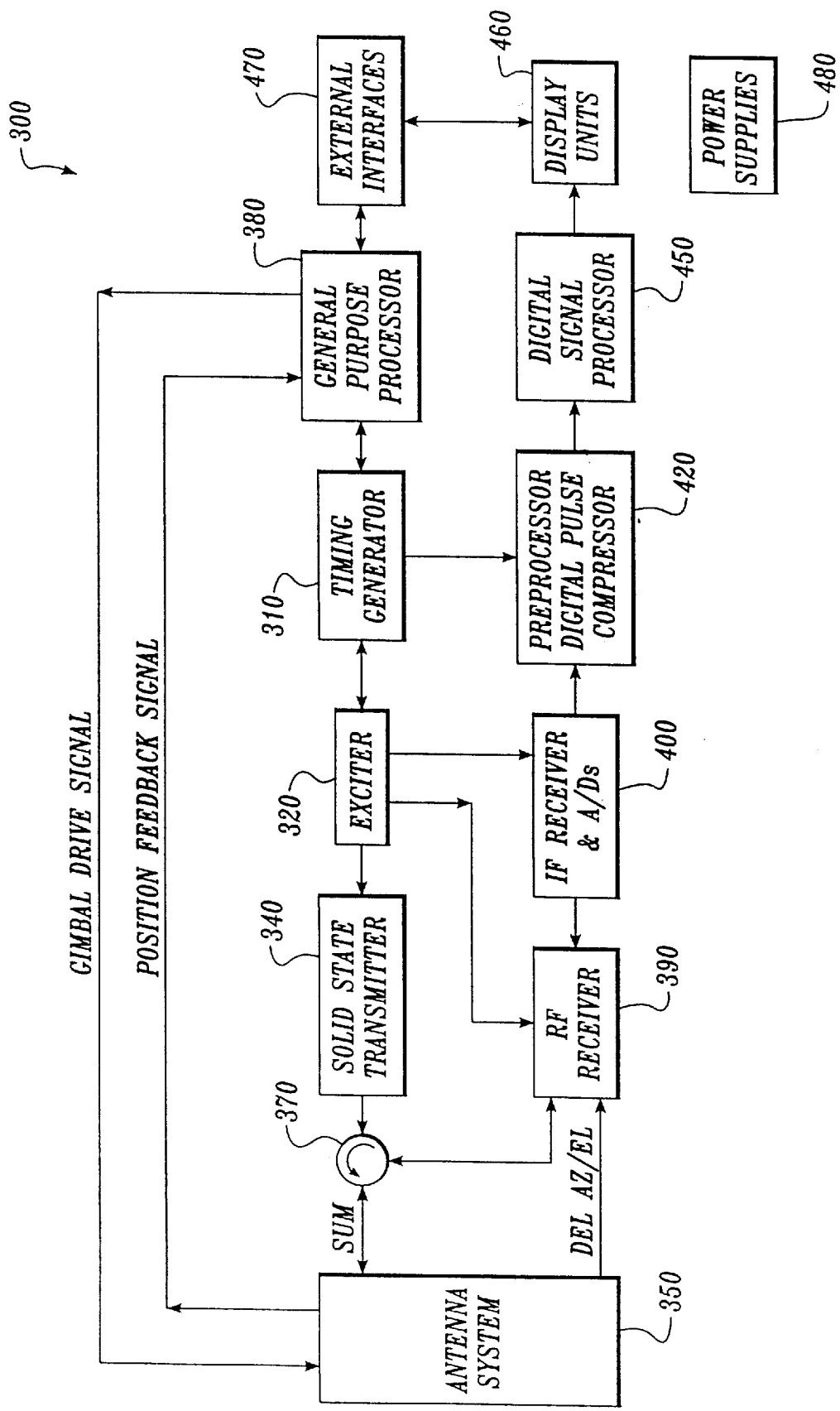
FIG. 18 is a functional block diagram for the autonomous landing guidance radar function according to one embodiment of the present invention.

FIG. 18 is a functional block diagram for the autonomous landing guidance radar function 300 according to one embodiment of the present invention. In FIG. 18, autonomous landing guidance radar function 300 includes a modified conventional monopulse-type single-antenna transmitter/receiver weather radar of a type well known in the art operating at a predetermined pulse repetition frequency (PRF). Autonomous landing guidance radar function 300 includes a conventional pulse repetition frequency timing generator 310, an exciter 320, a solid state transmitter 340, antenna 350, a circulator/duplexer 370, a general purpose processor 380, a monopulse radio frequency receiver 390, an intermediate frequency receiver 400, a preprocessor/digital pulse compressor 420, a digital signal processor 450, display units 460, and external interfaces 470. Autonomous landing guidance radar function 300 is powered by external power supplies 480.

Timing generator 310 generates the frequencies and synchronization signals used by the radar system which determines when transmitter 340 fires. Exciter 320 activates transmitter 340 to initiate the emission of the radar pulses which are fed through to the radar antenna 350. At the same time that timing generator 310 pulses exciter 320 to initiate the emission of radar pulse, timing generator 310 also produces output pulses for simultaneous application to preprocessor/digital pulse compressor 420 and to general purpose processor 380 to determine how the other radar system functions relate to the time of transmission.

Exciter 320, which is explained later in greater detail, translates the waveform to the radar's illumination frequency and amplifies the waveform to a level usable by the final power amplifier portion of transmitter 340. Exciter 320 supplies a transmitter drive signal to transmitter 340; a second output to radio frequency receiver 390, a calibration signal to the microwave integrated circuit (MIC) located behind antenna 350; and multiple local oscillator output signals to intermediate frequency receiver 400.

Transmitter 340 produces a short radar frequency pulse through circulator/duplexer 370 to antenna 350 at a pulse repetition frequency determined by a synchronous pulse generator. The pulsing of transmitter 340 causes a radar carrier signal pulse to be transmitted from radar antenna 350. Transmitter 340 employs frequency agility or multiple frequency transmission, whereby the carrier frequency is changed from pulse to pulse.

Antenna 350 is a standard 30-inch flat plate antenna array with a 3.2 degree beam width typically used in weather radar operating in the X-band and receiving pulse echoes for transmission through the Sum and Delta channels of the monopulse receiver. Antenna 350 includes both azimuth and elevation sector scan capability. The electromagnetic energy radiated from antenna 350 travels through space until striking the terrain or other obstacle. Reflected radar pulses are received by antenna 350 and sent via the isolating device to the receiver. Antenna 350 is energized via a signal from solid state transmitter 340 under the control of timing generator 310 via exciter 320 to radiate pulses in a suitable frequency band.

Circulator/duplexer 370 functions as an isolating device which alternately connects antenna 350 of the monopulse single-antenna system to transmitter 340 and radio frequency receiver 390 and isolates antenna 350 from the non-connected function. Circulator/duplexer 370 also protects radio frequency receiver 390 from transmitted power. Circulator/duplexer 370 includes three ports: transmitter 340, antenna 350, and radio frequency receiver 390. Optionally, circulator/duplexer 370 may have a fourth port between transmitter 340 and receiver 390. The fourth port is terminated which increases the path loss. Circulator/duplexer 370 also functions in conjunction with a local oscillator (not shown) to translate the signal and interference to the intermediate frequency which is the difference between the signal frequency and that of the local oscillator. The resulting intermediate frequency is fed to the radio frequency receiver 390. The outputs of antenna 350 Delta azimuth channel and Delta elevation channel are also fed to radio frequency receiver 390 and through to intermediate frequency receiver 400. Analog-to-digital converters 402 associated with intermediate frequency receiver 400 transform the analog I and Q signals to digital words for use by digital signal processor 450.

General purpose processor 380 controls the attitude of antenna 350 through manipulation of servo motors via a gimbal drive mechanism and a position feedback mechanism. Both the gimbal control mechanism and the position feedback mechanism are responsive to drive and error signals from general purpose processor 380. Antenna 350 horizontal scan position information and vertical scan position information, azimuth and elevation signals respectively, are supplied to general purpose processor 380 from the position feedback mechanism. The position feedback mechanism includes azimuth and elevation angular rate sensors and synchronous read-outs such as is well known to those of skill in the art, for example, see U.S. Pat. No. 3,369,231. The position feedback mechanism may include one or more accelerometers for sensing longitudinal and transversal antenna acceleration if antenna 350 phase center stability requirement cannot be otherwise achieved. According to the invention, the gimbal drive motors and the position feedback mechanism also rotate the antenna array 352 between a first attitude and a second attitude perpendicular to said first attitude. The gimbal drive motors and the position feedback mechanism cause the antenna to scan in azimuth and elevation and may also provide space stabilization of antenna array 352, as is well understood by those skilled in the art. General purpose processor 380 is coupled to the vertical and horizontal indicators of the display units 460 through external interfaces 470. General purpose processor 380 converts the azimuth and elevation signals, indicative of horizontal and vertical position, respectively, for use by display units 460.

Monopulse radio frequency receiver 390 is coupled to the multiple feeds of antenna 350 and provides a monopulse Sum and Difference, video signal output. Radio frequency receiver 390 Sum channel receives the input from circulator/duplexer 370 in the form of additively combined energy from the two lobes of the radiation pattern of antenna 350 symmetrical about antenna 350 center line and mutually angulated in elevation. The elevation Difference channel, or Delta channel, of radio frequency receiver 390 receives an input in the form of differentially combined pulse echoes which is received in the two lobes of the radiation pattern of antenna 350 symmetrical about antenna 350 center line and mutually angulated in azimuth. Radio frequency receiver 390, which is explained in greater detail later, includes a power limiting section 392, a low noise amplification section 394 an image rejection filtering section 396 and a down-conversion section 398 coupled to receive one output, LO1, of exciter 320. The output of radio frequency receiver 390 is an frequency signal which is transmitted to intermediate frequency receiver 400.

Intermediate frequency receiver 400, which is explained in greater detail later, includes an intermediate frequency blanking section 404 coupled to a first down-conversion and gain control section 406 coupled in turn to a second down-conversion and gain control section 408 coupled to matched filters 410 which are coupled to a coherent detector 412. Coherent detector 412 is coupled to associated analog-to-digital converters 402. The output of intermediate frequency receiver 400 is transmitted to preprocessor/digital pulse compressor 420.

Preprocessor/digital pulse compressor 420 performs digital pulse compression on the range gate samples to provide enhanced range resolution as is well known in the art. See Byron Edde, *Radar: Principles, Technology, Applications*, Prentice Hall PTR, 1993, Chapter 13; pages 23–4, which is incorporated by reference. Preprocessor/digital pulse compressor 420, which is explained in greater detail later, includes a pulse compression section 422 where a matched filter function correlates the echo wave with a delayed copy of the transmitted signal; a prefilter section 424 which generates the desired matched filter bandwidth; and a data storage section 426 which performs a data storage function which provides a place to keep digitized signals temporarily while all the signals for a particular process are gathered. Digital pulse compressor 420 is explained in greater detail in a later section.

A digital signal processor 450, as is well known in the art, processes target echoes and interfering signals to increase target echo signal level and suppress interference, thereby increasing signal-to-interference ratio. Digital signal processor 450 also performs the detection function, making the decision as to whether or not a target is present, and recovers information about targets, for example, position, range, and Doppler shift. Digital signal processor 450 is used in the invention to synthesize matched filters for the various radar applications. Digital signal processor 450 is explained later in greater detail.

Display units 460 having a video output are coupled to preprocessor/digital pulse compressor 420 through digital signal processor 450 and to external interfaces 470. Preprocessor/digital pulse compressor 420 also receives the output of timing generator 310. Digital signal processor 450 controls the information on display units 460 as a function of (range from the aircraft to the object. When an object is detected, the color corresponding to a range bracket to that object will be generated on the display by means well known to those of skill in the art. See, for example, U.S. Pat. No. 3,369,231, which is incorporated by reference.

1.8.2 Antenna System

Figure 19:
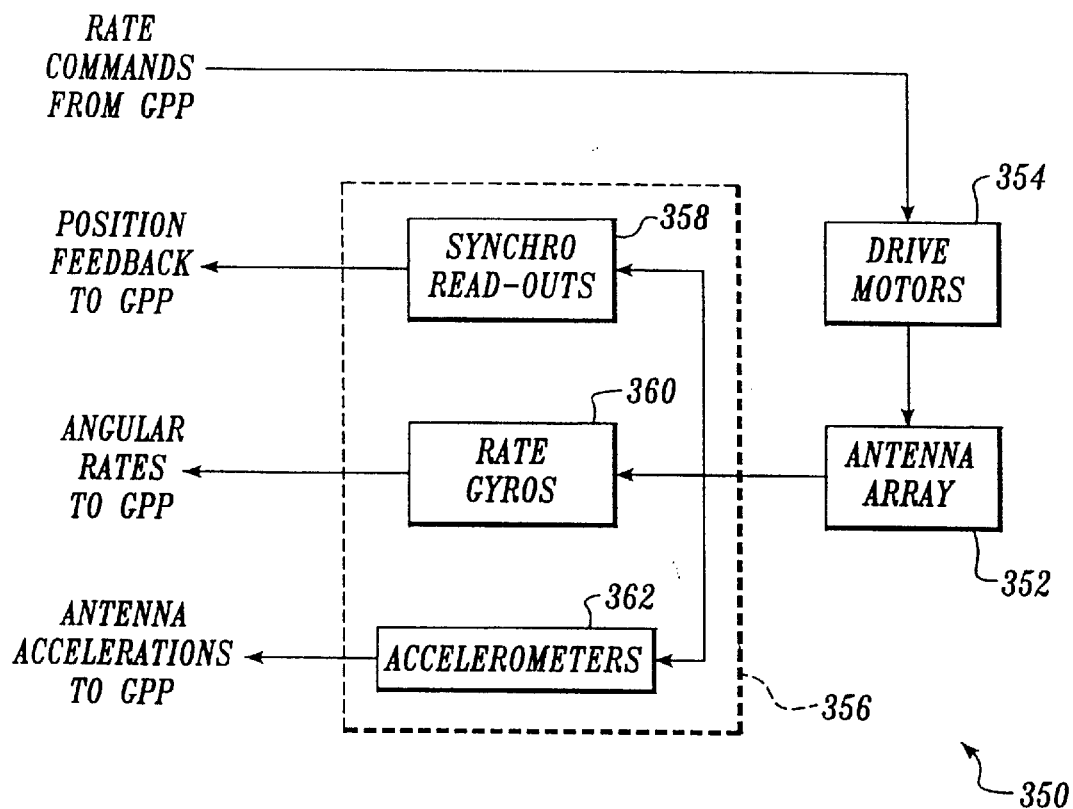
FIG. 19 illustrates one embodiment of radar antenna system according to one embodiment of the present invention.

FIG. 19 illustrates one embodiment of radar antenna system 350 according to the present invention. Radar antenna system 350 includes an antenna array 352, drive motors 354 and position feedback mechanism 356. Position feedback mechanism 356 includes synchronous read-outs 358 and both azimuth and elevation angular rate gyroscopes 360. Antenna acceleration sensors 362 may be employed to monitor both longitudinal and transversal antenna acceleration when antenna phase center stability cannot otherwise be satisfactorily achieved. Drive motors 354 receive azimuth angle and elevation angle rate commands from general purpose processor 380 and mechanically drive antenna array 352. Synchronous read-outs 358 feedback antenna array 352 azimuth and elevation position data to general purpose processor 380. Azimuth and elevation angular rate gyroscopes 360 feedback antenna 350 azimuth and elevation angular rate data to general purpose processor 380. If present, antenna acceleration sensors 362 feedback both antenna longitudinal acceleration and antenna transversal acceleration Lo general purpose processor 380. General purpose processor 380 utilizes the position, angular rate and acceleration data to control antenna array 352 position according to traditional control methods. The preferred antenna positioner is two-axes stabilized with a minimum scan coverage of +/−90 degrees in azimuth and +50 to −65 degrees in elevation. The antenna positioner includes a azimuth sector scan which is selectable from 0 to +/−90 degrees and an elevation sector scan which is selectable from 0 to 115 degrees. The antenna positioner scan rate in both azimuth and elevation is variable on the order of 0 to 60 degrees per second with minimum gimbal acceleration and deceleration on the order of 600 degrees per second per second. A preferred embodiment of the antenna positioner conforms to the performance parameters of Table 3. Antenna 350 includes an antenna array which conforms to the performance parameters of Table 4.

1.8.3 Transmitter Functional Diagram

Figure 20:
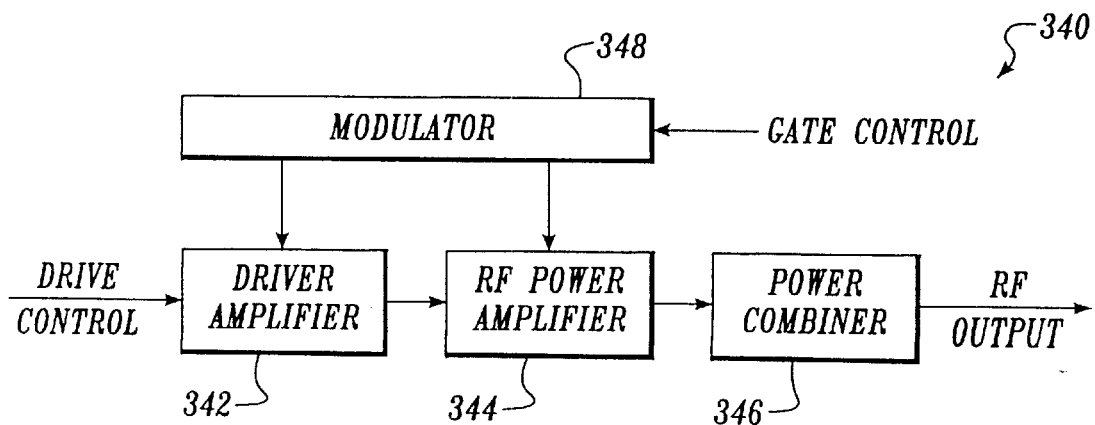
FIG. 20 illustrates the functional diagram of the radar solid state transmitter according to one embodiment of the present invention.

FIG. 20 illustrates the functional diagram of solid state transmitter 340 according to one embodiment of the present invention. Transmitter 340 receives a transmitter drive control signal from exciter 320. The transmitter drive control signal has a 9400 MHz center frequency within a +/−80 MHz band at +12 dBm, nominal. Transmitter 340 receives a transmitter gate control signal from timing generator 310. Transmitter 340 transmits the radio frequency power to antenna 350 at 52.2 dBm.

Transmitter 340 includes a driver amplifier section 342, a radio frequency power amplifier section 344, a power combiner section 346, and a modulator section 348. Driver amplifier section 342 receives and amplifies the transmitter drive control signal from exciter 320. The circuit of transmitter 340 achieves parallelism by dividing the drive power among multiple amplifying modules and combining the resulting power onto a single transmission line as a radio frequency output at the output of power combiner section 346 for application to circulator/duplexer 370. Preferred transmitter 340 conforms to the performance parameters of Table 5.

Modulator 348 controls the transmitter circuit. Modulator 348 is preferably of a type known in the art as a low-level modulator. Modulator 348 responds to an 120 volt RMS input signal at 400 Hz, nominal. An output gate of modulator 348 provides isolated terminals to turn outputs on/off by asserting a logic signal. Modulator 348 supplies 1152 watts total power at 144 amperes and 8 volts. Modulator 348 distributes the power into eight individual 16-ampere outputs and two individual 8-ampere outputs. Modulator 348 supplies a gate voltage at -2 volts and 1 ampere, total, distributed to ten individual outputs. Modulator 348 includes built-in-test (BIT) capability and reports built-in-test status by asserting a logic signal.

Modulator 348 supports pulse widths from 100 nanoseconds to 512 microseconds and exhibits a maximum voltage drop across a 512 microsecond pulse width of 0.5 volts. Modulator 348 includes a switching capacitor for each power module in order to support graceful degradation. The maximum output random noise of modulator 348 is 4 millivolts RMS measured at a 25 MHz bandwidth. maximum output amplitude ripple of modulator 348 is 20 millivolts peak-to-peak. The input-to-output isolation voltage of modulator 348 is on the order of 700 volts direct current, the input-to-case isolation voltage is on the order of 500 volts direct current, and the output-to-case isolation voltage is on the order of 300 volts direct current. Modulator 348 provides normal output with standard 180 volts alternating current for a minimum of 0.1 seconds and the output voltage returns to normal limits within 100 microseconds after a 50% change in load current. Modulator 348 has a maximum load transient over/under shoot of 0.5 volts from a nominal voltage set point. Each output of modulator 348 is independently protected against a short circuit of any duration and automatically restores to normal when an overload is removed. The maximum temperature coefficient of modulator 348 is 0.03% per degree centigrade.

1.8.4 Exciter Functional Diagram

Figure 21:
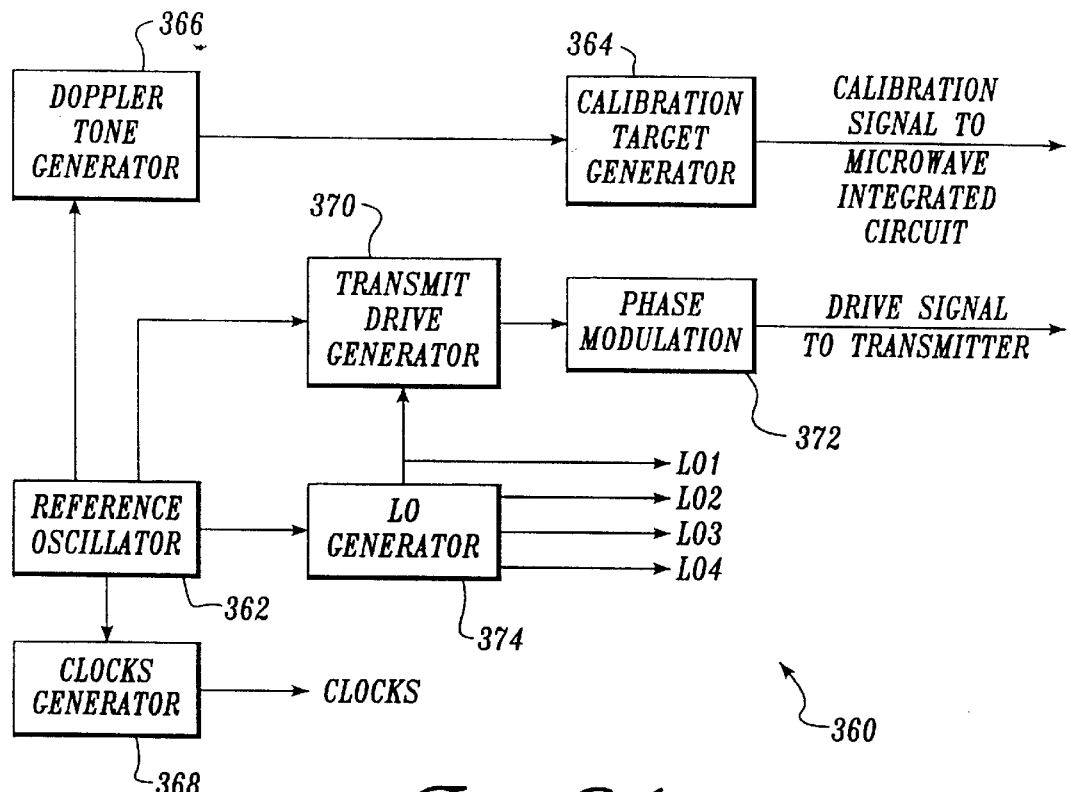
FIG. 21 illustrates a functional diagram of the radar exciter according to one embodiment of the present invention.

Exciter 320 translates the waveform to the radar's illumination frequency and amplifies the waveform to a level usable by transmitter 340. Exciter 320 activates transmitter 340 to initiate the emission of the radar pulses which are fed through to radar antenna 350. Exciter 320 also supplies clock signals and local oscillator signals to other portions of the radar system. FIG. 21 illustrates a functional diagram of exciter 320 according to the present invention. Exciter 320 includes a reference oscillator 362 coupled to a calibration target generator 364 through a Doppler tone generator 366, a 40 MHz clocks generator 368; and to a transmit drive generator 370. Transmit drive generator 370 is coupled to a phase modulation section 372 and to a local oscillator generator 374.

Phase modulation section 372 of exciter 320 outputs a transmitter drive signal to transmitter 340. Exciter 320 outputs a transmitter drive signal with a 9400 MHz center frequency within a +/−80 MHz band which is transmitted to transmitter 340 at +12 dBm, nominal. Calibration target generator 364 of exciter 320 outputs a 9400+/−80 MHz calibration signal to the microwave integrated circuit (not shown) behind antenna 350 at −50 dBm +/−30 dBm, nominal. Local oscillator generator 374 outputs a signal to transmit drive generator 370 and four local oscillator outputs. The local oscillator signals are output to radio frequency receiver 390 and intermediate frequency receiver 400 as shown in Table 6.

40 MHz clocks generator 368 supplies a differential output signal to timing generator 310 and to general purpose processor 380. Timing generator 310 transmits a first differential input signal to control phase modulator 372 and a second differential input signal to control pulse repetition interval phase section (not shown) of phase modulator 372. A third differential input signal from timing generator 310 to exciter 320 enables a wide transmit drive gate and a fourth differential input signal from timing generator 310 to exciter 320 enables a narrow transmit drive gate. Another differential input signal from timing generator 310 to exciter 320 enables a calibration signal switch (not shown). The frequency control word is an 8-bit parallel word from general purpose processor 380. General purpose processor 380 outputs an 8-bit parallel Doppler tone control word to Doppler tone generator 366. The calibration signal attenuation word is also an 8-bit parallel word from general purpose processor 380. The present invention may be practiced using any form of logic, including, for example but not limited to, transistor-transitor logic, CMOS logic or BiCMOS logic. According to one embodiment, the present invention utilizes transitor-transitor logic (TTL). In a preferred embodiment of the present invention, exciter 320 conforms to the performance parameters of Table 7.

1.8.5 Receiver Functional Diagram

The receiver of the preferred embodiment is a multiple-conversion superhetrodyne receiver. Other receiver designs, known to those of skill in the art, may be used. According to one embodiment of the invention, the receiver chain includes dual channel radio frequency receiver 390 and intermediate frequency receiver 400 where the signal and interference are amplified, attenuated, and filtered at the signal frequency. The receiver chain filters unwanted signals, especially at the image frequency, and amplifies the signal-plus-noise to a level where the noise generated in later stages does not materially contribute to the signal-to-noise ratio. The radio frequency band is centered around the transmit frequency, offset by the Doppler shift.

Figure 22:
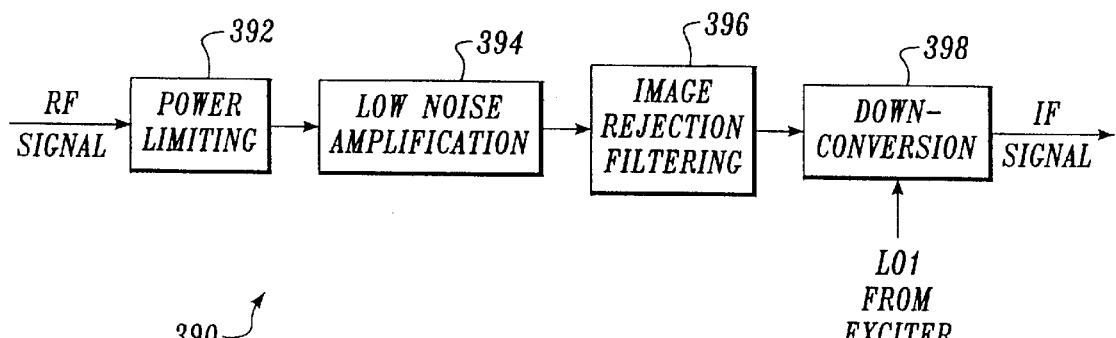
FIG. 22 illustrates a functional diagram of the radar radio frequency receiver according to one embodiment of the present invention.

FIG. 22 is a functional diagram of radio frequency receiver 390 according to one embodiment of the present invention. Radio frequency receiver 390 includes a power limiting section 392, a low noise amplification section 394, an image rejection filtering section 396, and a down-conversion section 398. Power limiting section 392 may be inserted in the path from circulator/duplexer 370 to receiver 390 to protect receiver 390 from transmitter 340.

In a preferred implementation, power limiting section 392 comprises a solid state diode limiter In a solid state diode limiter, signals entering power limiting section 392 at a first port of an input hybrid section are divided in the input hybrid section into two equal parts, phased 90 degrees apart, and placed on two transmission lines. If the peak-to-peak signal is less than 1.4 volt peak-to-peak, for silicon diodes, the diodes are open circuits and do not interfere with the transmission. The signals combine at an output hybrid section. Signal components greater than 1.4 volt peak-to-peak cause the diodes to short circuit, reflecting these components with a phase shift of 180 degrees. The reflected components are directed to a second port of the input hybrid, which is terminated.

The output of power limiting section 392 is fed to low noise amplification section 394, also known in the art as radio frequency amplifier section, which amplifies the signal and interference while introducing minimal noise. Low noise 30 amplification section 394 has a gain which effectively swamps the noise from the rest of receiver 390. The amplified signal is fed to image rejection filtering section 396 which suppresses the unused or image response. Down-conversion section 398 shifts the echo to an intermediate frequency by mixing incoming frequencies with local oscillator output, LO1, frequency from exciter 320 and low-pass filtering the product. Inputs to radio frequency receiver 390 are listed at Table 8. A preferred radio frequency receiver 390 according to the invention conforms to the performance parameters of Table 9.

1.8.6 Intermediate Frequency Receiver Functional Diagram

The majority of the signal amplification and filtering takes place in intermediate frequency receiver 400. Intermediate frequency receiver 400 includes analog-to-digital (A/D) converter section 402. The inputs to intermediate frequency receiver 400 are listed in Table 10.

Figure 23:
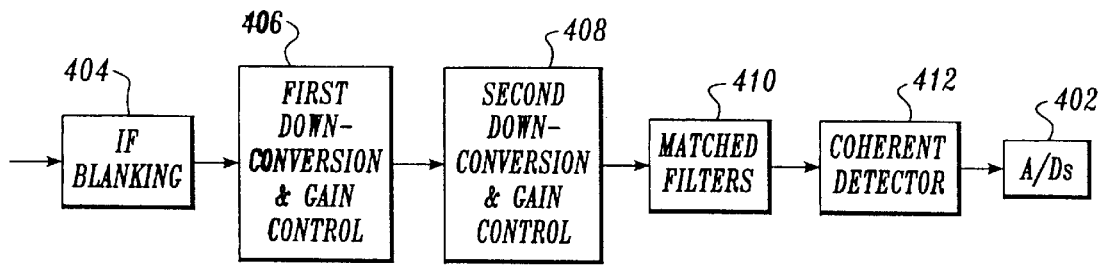
FIG. 23 illustrates a functional diagram of the radar intermediate frequency receiver according to one embodiment of the present invention.

As mentioned above and illustrated in FIG. 23, intermediate frequency receiver 400 includes intermediate frequency blanking section 404 coupled to a first down-conversion and gain control section 406 coupled in turn to a second down-conversion and gain control section 408 coupled to matched filter section 410 which is coupled to a coherent detector 412 which is coupled to associated analog-to-digital converter section 402. Down-conversion and gain control sections 406, 408 attenuate the still strong incoming signals to prevent saturating later parts of the receiver and shift the signal to an intermediate frequency by mixing incoming frequencies with local oscillator frequencies and low-pass filtering the product. Matched filter section 410 shapes the signals and interference to optimize signal-to-interference ratio by admitting the maximum signal with minimum noise. The fraction of the signal power passed through matched filter section 410 is a function of filter bandwidth, the bandpass characteristic, and the spectrum of the received echo. Matched filter response is made variable if diverse waveforms, for example, switchable pulse widths, are used. Coherent detector 412 states whether a target is present by comparing the signal-plus-interference to a threshold. If the signal-plus-interference, or interference alone, crosses the threshold, a detection is declared. The preferred intermediate frequency receiver 400 conforms to the performance parameters outlined in Table 11. The preferred analog-to-digital converter section 402 of intermediate frequency receiver 400 conforms to the performance parameters outlined in Table 12.

The frequency of intermediate frequency receiver 400 is selected for convenience in building matched filter section 410 and to minimize the contribution of the intermediate frequency stages to the overall noise level. The frequency of intermediate frequency receiver 400 is the difference between signal frequency and local oscillator frequency. The signal is I/Q demodulated thereby translating the signal and interference from the intermediate frequency to its information, or base band, frequencies. I/Q demodulation recovers both the real and imaginary signal components. The I/Q demodulated signal is a bipolar video signal which represents the magnitude and phase of the signal compared to the transmit wave. Filtering is done on the composite signal in matched filter section 410 to optimize the signal-to-noise ratio and the resulting signal is digitized in analog-to-digital converter section 402. Intermediate frequency receiver 400 outputs Sum channel digitized I and Q signals as a 24-bit parallel word to preprocessor 420 and outputs Delta channel digitized I and Q signals as a 24-bit parallel word to preprocessor 420.

1.8.7 Timing Generator Functional Diagram

Figure 24:
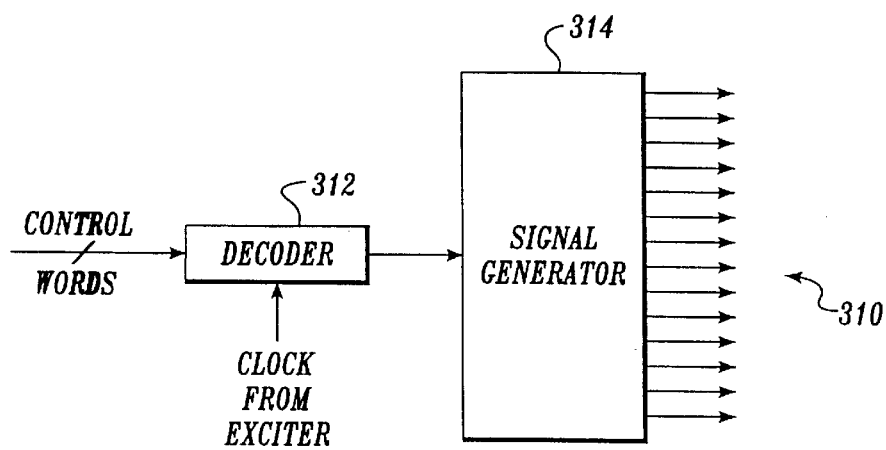
FIG. 24 illustrates a functional diagram of the radar timing generator according to one embodiment of the present invention.

FIG. 24 illustrates the functional diagram of timing generator 310 according to the present invention. Timing generator 310 includes a decoder section 312 and a signal generator 314. As noted above, timing generator 310 generates the clocks and synchronization signals used by the radar system which determines when transmitter 340 fires. Exciter 320 supplies a differential 40 MHz clocks signal to decoder section 312. General purpose processor 380 outputs a 32-bit control word to decoder section 312. Timing generator 310 outputs five differential signals to exciter 320. The differential signals to exciter 320 control the phase modulator pulse repetition interval phase, enable a wide transmit drive gate, enable a narrow transmit drive gate, and enable a calibration signal switch. Timing generator 310 outputs a differential signal to transmitter 340 to control the transmit pulse. Timing generator 310 includes a 1 MHz or 10 MHz analog-to-digital sample clock which outputs a differential signal to intermediate frequency receiver 400. Timing generator 310 outputs a differential intermediate frequency blanking switch control signal to intermediate frequency receiver 400. Timing generator 310 outputs a differential matched filter select switch control signal to intermediate frequency receiver 400. Timing generator 310 outputs a differential pulse repetition frequency (PRF) signal to preprocessor 420, to digital signal processor 420, and general purpose processor 380. Timing generator 310 outputs a differential dwell synchronization signal to preprocessor 420, to digital signal processor 420, and to general purpose processor 380.

1.8.8 Data Acquisition/Preprocessing Function

Signal processing in radar improves the signal-to-interference ratio and the detection of targets in clutter, and extracts target characteristics and behavior. Signal processing performs processes which enhance the echoes from targets and suppress interference from the receiver. Signal processing may include, but is not limited to, signal integration, filtering and spectrum analysis, correlation, windowing, and convolution. Signal integration sums the composite signals within the same range bins for several hits. Filtering and spectrum analysis is a frequency domain process in which composites of target echoes and interference are separated into their frequency, or Doppler, components. Correlation compares the signal-plus-interference to a function simulating a target signal. The degree of match in the correlation process determines whether the composite signal-plus-interference signal contains a target echo. Windowing may be used in the correlation process and the spectrum analysis process to reduce spectral leakage errors which may result when processing errors spread from one bin to other bins. Convolution provides flexibility in some signal processes because convolving in either the frequency domain or the time domain has the same effect as multiplication in the other domain.

Figure 25:
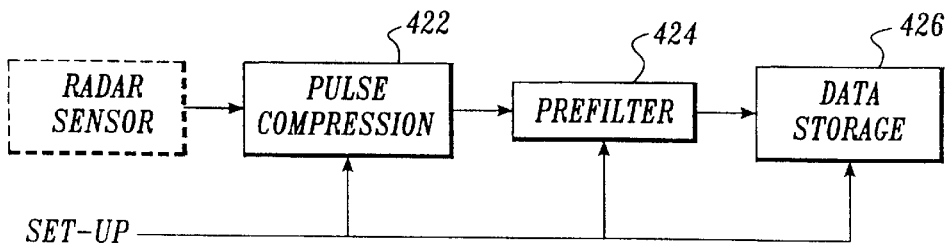
FIG. 25 illustrates a functional diagram of the radar preprocessor/digital pulse compressor according to one embodiment of the present invention.

FIG. 25 is a functional diagram of preprocessor/digital pulse compressor 420 according to the present invention. Pulse compression section 422 includes a matched filter function which correlates the echo wave with a delayed copy of the transmitted signal. Prefilter section 424 generates the desired matched filter bandwidth. Data storage section 426 performs a data storage function which provides a place to keep digitized signals temporarily while all the signals for a particular process are gathered. Pulse compression section 422 performs pulse compression from 1:1 to 512:1 ratio. Prefilter section 424 performs digital prefiltering from 1:1 to 16:1 ratio. Data storage section 426 provides a storage buffer for the digital radar I/Q data supplied by intermediate frequency receiver 400.

As noted above, generally, range resolution of multiple targets requires that the individual targets be separated by at least the range equivalent of the width of the processed echo pulse. Range resolution may be enhanced using pulse compression, which eliminates the trade-off of wide pulses for the high energy needed for target detection against narrow pulses for range resolution. Preprocessor/digital pulse compressor 420 performs digital pulse compression on the range gate samples to provide enhanced range resolution. Pulse compression section 422 includes matched filters to perform pulse compression on the range gate samples by correlating the echo wave with a delayed copy of the transmitted signal.

According to one embodiment of the present invention, the autonomous landing guidance system includes a large number of range gates and long pulse compression codes. Performing pulse compression in the frequency domain is more practical than in the time domain. The discrete Fourier transform (DFT) computes the spectrum of any function which is discrete, or sampled, in time. The discrete Fourier transform changes time to frequency for sampled functions and the inverse discrete Fourier transform changes frequency to time. Whether or not the function is periodic, the function's spectrum is discrete and periodic and the spectrum of a periodic time function. Mathematical analysis shows that multiplying the discrete Fourier transform of two finite duration sequences and then inverse transforming the product is equivalent to circularly convolving the equivalent periodic sequences.

Figure 26:
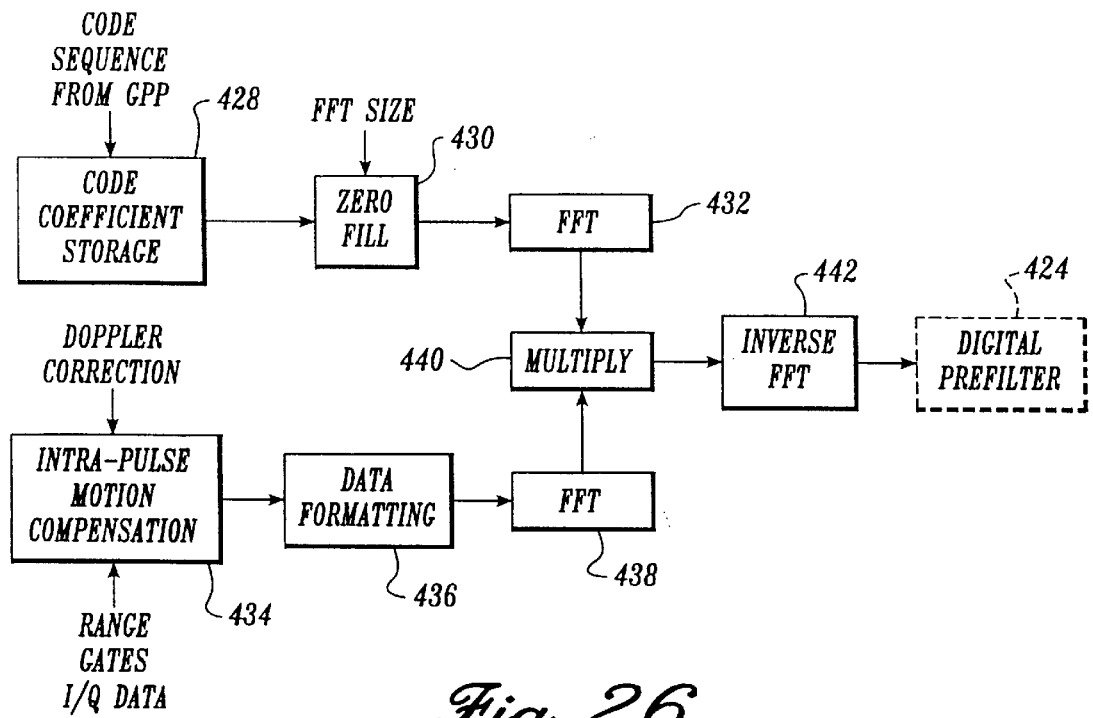
FIG. 26 is a functional diagram of the processing function that performs frequency domain pulse compression according to one embodiment of the invention.

FIG. 26 is a functional diagram of the processing that performs frequency domain pulse compression according to one embodiment of the invention. Pulse compression section 422 includes code coefficient storage section 428 coupled to zero fill function 430 and a first fast Fourier transform function 432. Pulse compression section 422 also includes intra-pulse motion compensation function 434 coupled to a data formatting function 436 and a second fast Fourier transform function 438. Both first and second fast Fourier transform function 432, 438 are coupled to a multiplier function 440. The output of multiplier function 440 is fed to an inverse fast Fourier transform function 442 before being input to digital prefilter section 424.

According to one embodiment of the present invention, digital pulse compression function 422 has dual channel capability, Sum and Delta, with a maximum data rate of 10 MHz. The maximum number of range samples is 4096 per channel. Each range sample is a complex word with a 16-bit real component and a 16-bit imaginary component. The code length is variable from 1 to 512 complex words. When complementary code pulse compression is used, digital pulse compression function 422 alternates between two codes, code A and code B, at the pulse repetition interval, for example, code A, code B, code A, code B. Digital pulse compressor 422 has the capability to store two codes at the same time which eliminates the need to download a code each pulse repetition interval. The code coefficients are complex words, 16-bit real and 16-bit imaginary, output by general purpose processor 380 and updated at very low rate, for example, once every few minutes, to compensate for amplitude and phase error changes as a function of temperature. Zero filling function 430 extends the corrected code sequence to the fast Fourier transform size by zero filling. The size of fast Fourier transform function 432 is variable from 64 to 4096. Fast Fourier transform function 432 then performs a fast Fourier transform on the padded, or extended, code sequence. General purpose processor 380 also provides the necessary information needed to perform intra-pulse phase correction on the radar data. After motion compensation, data formatting function 436 formats the radar data. The data is then zero filled and segmented to the proper size in order to perform fast Fourier transform function 438. Multiplication function 440 then cell-by-cell multiplies the code fast Fourier transform and the range sample fast Fourier transform. An inverse fast Fourier transform of the product is then taken to generate the pulse-compressed time sequence.

Figure 27:
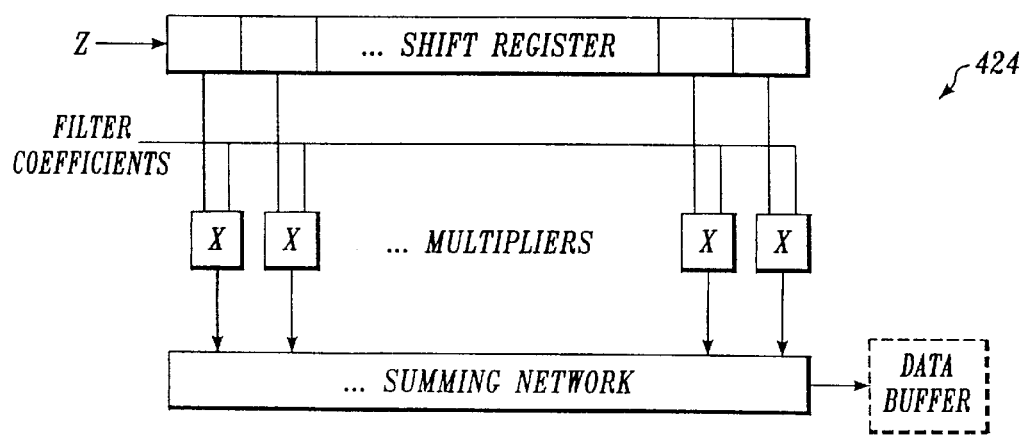
FIG. 27 illustrates a functional diagram of the radar digital prefilter according to one embodiment of the invention.

Digital prefilter 424 synthesizes matched filters for the various radar applications. FIG. 27 is a functional diagram of digital prefilter 424 according to the present invention. Digital prefilter 424 has a dual channel capability, Sum and Delta, with a maximum data rate of 10 MHz. The maximum number range samples is 4096 per channel. Digital prefilter 424 receives filter coefficients from the general purpose processor. The filter coefficients are floating point words down-loaded from general purpose processor 380. The maximum number of filter coefficients, the down-sampling ratio, is sixteen. Digital prefilter 424 performs selectable range gate data down-sampling from 1:1 to 16:1 and stores the data into a data buffer.

FIG. 28 is a functional diagram of power accumulation and saturation count function 444 according to the invention. Power accumulation and saturation count function 444 generates data which is used by the automatic gain control algorithm to prevent excessive numbers of saturations and to set the received signal at an optimum level. Power accumulation and saturation count function 444 accumulates the total power from all range gates and counts the number of saturations during each radar dwell, The resultant saturation count data and power accumulation data are output to general purpose processor 380.

2.0 Optional Additional Features and Embodiments

Additional features and functions may be optionally added to or used in conjunction with the automonous landing guidance system of the present invention to enhance the performance or provide additional capabilities to the system. However, the additional features described herein need not be limited to use with such a system and may be used in connection with other radar systems to enhance performance and provide additional capalitites.

2.1 Monopulse Beam Sharpening

As discussed in Section 1.6.3 above, monopulse beam sharpening may be used to increase the resoluting radar targets with the beam. According to one embodiment of the invention, the autonomous landing guidence system utilizes the monopulse beam sharpening technique described below.

Improved target resolution is useful not only for resolving targets in conjunction with the autonomous landing guidance system, however, but is useful in all radar applications. Such applications may include but are not limited to on boresight mapping, target detection and classification, and radar real beam image sharpening. The monopulse beam sharpening function of the present invention creates a new distributed monopulse channel, Delta_D, which improves resolution of multiple targets in the beam. According to one aspect of the invention, the invention distinguishes closely spaced targets by time multiplexing traditional monopulse channels with the new Delta_D channel to provide more accurate angle measurement for targets in each side of the beam. The amount of improvement is a function of the signal-to-noise ratio.

Figure 30:
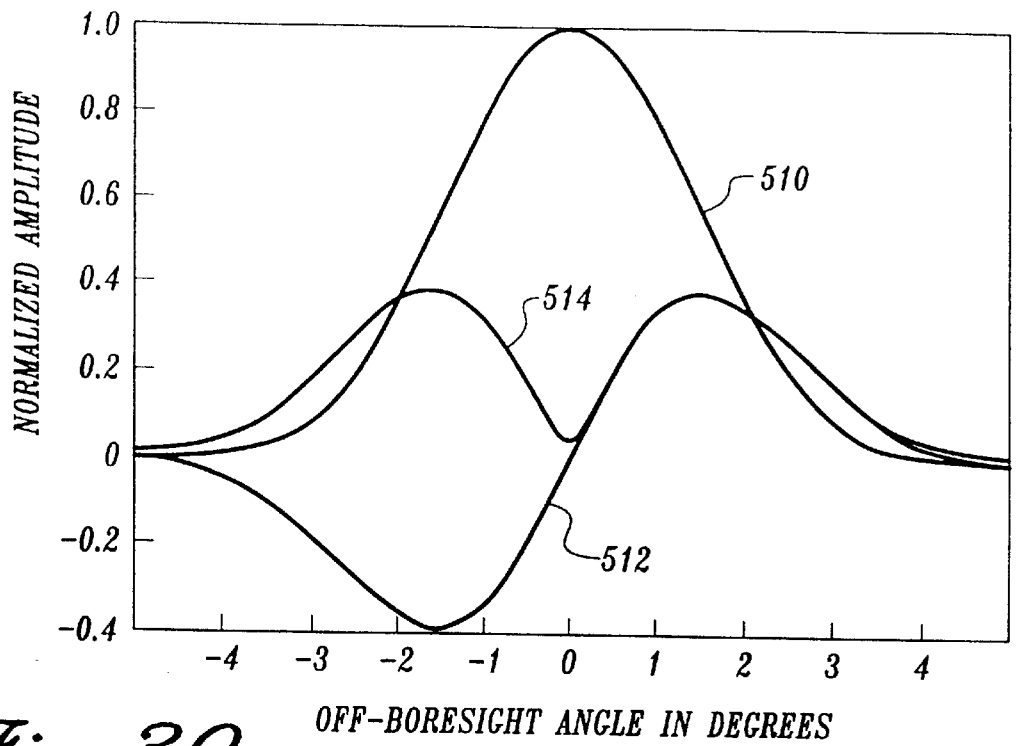
FIG. 30 is an illustrative analysis of a point target response in order to illustrate the basic relationships of the Sum and Delta channels.

FIG. 29 illustrates the traditional Sum and Delta patterns for a typical 30-inch flat plate antenna array with a 3.2 degree beam width used in weather radar. Nearly all current radar applications utilize a Sum channel 502 and a Delta channel 504 exclusively. Sum channel (SS) 502 is obtained by transmitting and receiving through the Sum port:

$$SS=SUM_t{}^*SUM_r \qquad \text{Eq (27)}$$

where:
  $SUM_t$=transmission through the Sum port; and
  $SUM_r$=receiving through the Sum port.
The Delta channel (SD) 504 is obtained by transmitting through the Sum port and receiving through the Delta port:

$$SD=SUM_t{}^*DELTA_r \qquad \text{Eq (28)}$$

where:
  $SUM_t$=transmission through the Sum port; and
  $DELTA_r$=receiving through the Delta port.
FIG. 29 also illustrates the $Delta^2$ or DD pattern 506, which is obtained by transmitting and receiving through the Delta port:

$$DD=DELTA_t{}^*DELTA_r \qquad \text{Eq (29)}$$

where:
  $DELTA_t$=transmission through the Delta port; and
  $DELTA_r$=receiving through the Delta port.
In the new distributed monopulse channel according to the present invention, Delta_D and the Sum and Delta channel interelationships, are illustrated in FIG. 29. The new Delta_D channel 514 is obtained by manipulation of the traditional Sum channel 510 and Delta channel 512. Delta_D 514 is the square root of the absolute value of the product of the Sum squared channel and the Delta squared channel:

$$Delta\_D=|S_tS_r \times D_tD_r|^{1/2} \qquad \text{Eq (30)}$$

where:
  $S_t$=transmission through the Sum port;
  $S_r$=receiving through the Sum port;
  $D_t$=transmission through the Delta port; and
  $D_r$=receiving through the Delta port.
As illustrated in FIG. 30, Delta_D channel 514 and the absolute value of Delta channel for a point target having a high signal-to-interference ratio are nearly identical, except for the null depth 515. Delta_D channel 514 null depth is more sensitive to signal-to-interference than the Delta channel 512. The effect of this greater sensitivity is discussed later in this specification.

In practice, the Delta_D data collection is time multiplexed with the traditional Sum and Delta channels. It is known to those of skill in the art that time multiplexing of radar channels results in only minor degradation provided the sampling rate is small, the pulse-repetition-frequency is high, such that very little decorrelation can occur.

Figure 31:
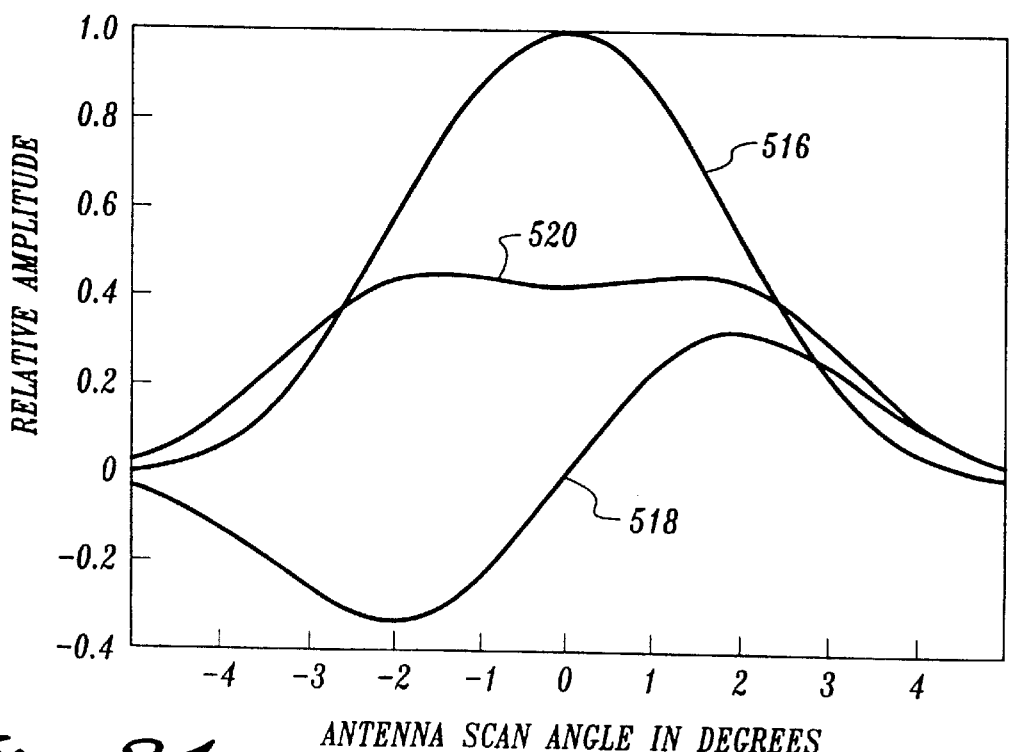
FIG. 31 illustrates the distributed monopulse channel when two targets appear simultaneously in the beam.

FIG. 31 illustrates the usefulness of the distributed monopulse channel, Delta_D, when two targets appear simultaneously in the beam. FIG. 31 shows the Sum channel 516, the absolute value of the Delta channel 518, and the Delta_D channel 520 for two identical in-phase point targets separated by 2 degrees. Sum channel 516 and absolute value of Delta channel 518 show typical characteristics for two point targets. Sum channel 516 shows some broadening but no distinction between the two targets. Absolute value of Delta channel 518 shows some broadening, a null at the mid point between the two targets, but shows no separation between the two targets. Rather, both Sum channel 516 and absolute value of Delta channel 520 show patterns for two targets which are very similar to the patterns for a single point target, as illustrated in FIG. 31. In comparing FIG. 30 and FIG. 31, Delta_D distributed monopulse channel pattern 520 for two point targets is visibly different from Delta_D distributed monopulse pattern 514 for a single point target. The present invention exploits this difference to distinguish between a point target and a complex distributed target.

Figure 32:
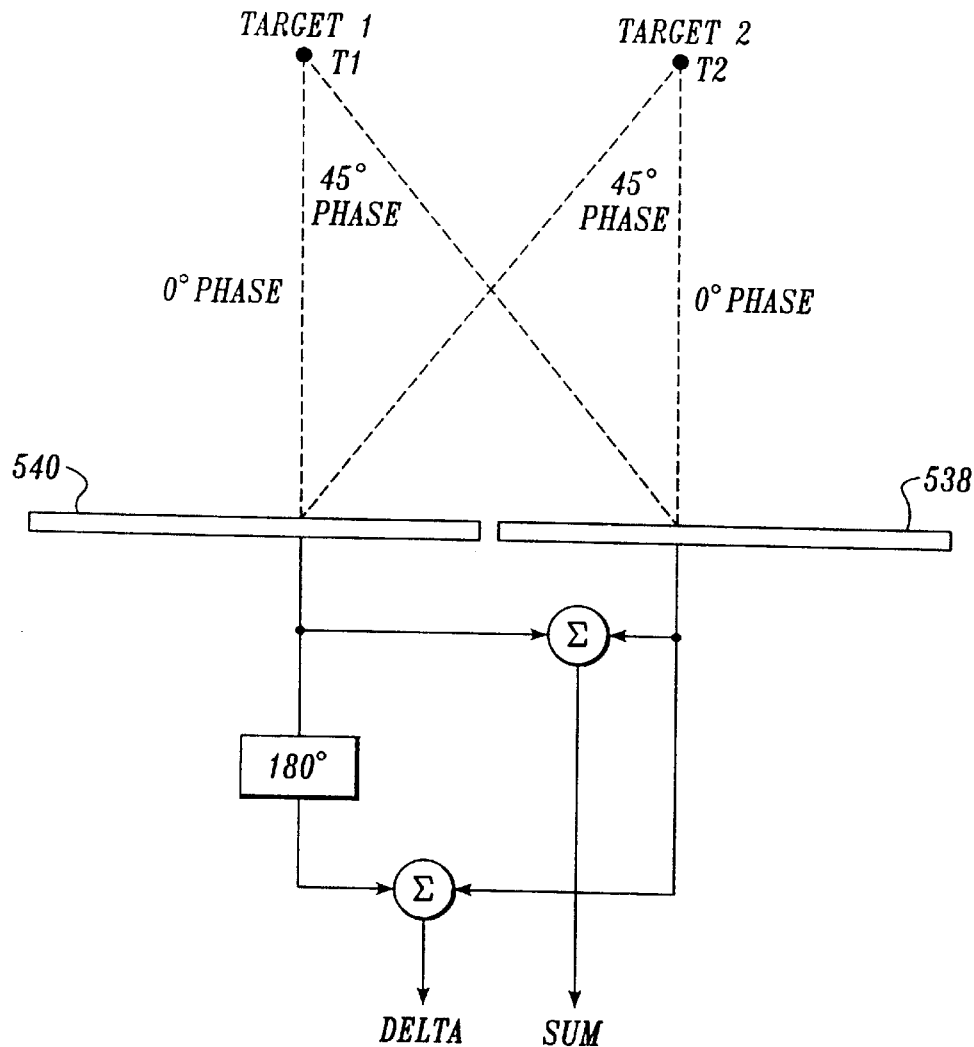
FIG. 32 is a vector representation of the two-point target case.

FIG. 32 is a vector representation of the two-point target case. As illustrated, transmitting and receiving on the Sum channel 522 results in a vector equal to $3.41*(T_1+T_2)$; transmitting on the Sum channel and receiving on the Delta channel 524 results in a vector equal to $1.41*(T_2-T_1)$; and transmitting and receiving on the Delta channel 526 results in a vector equal to $0.58*(T_1+T_2)$.

Figure 33:
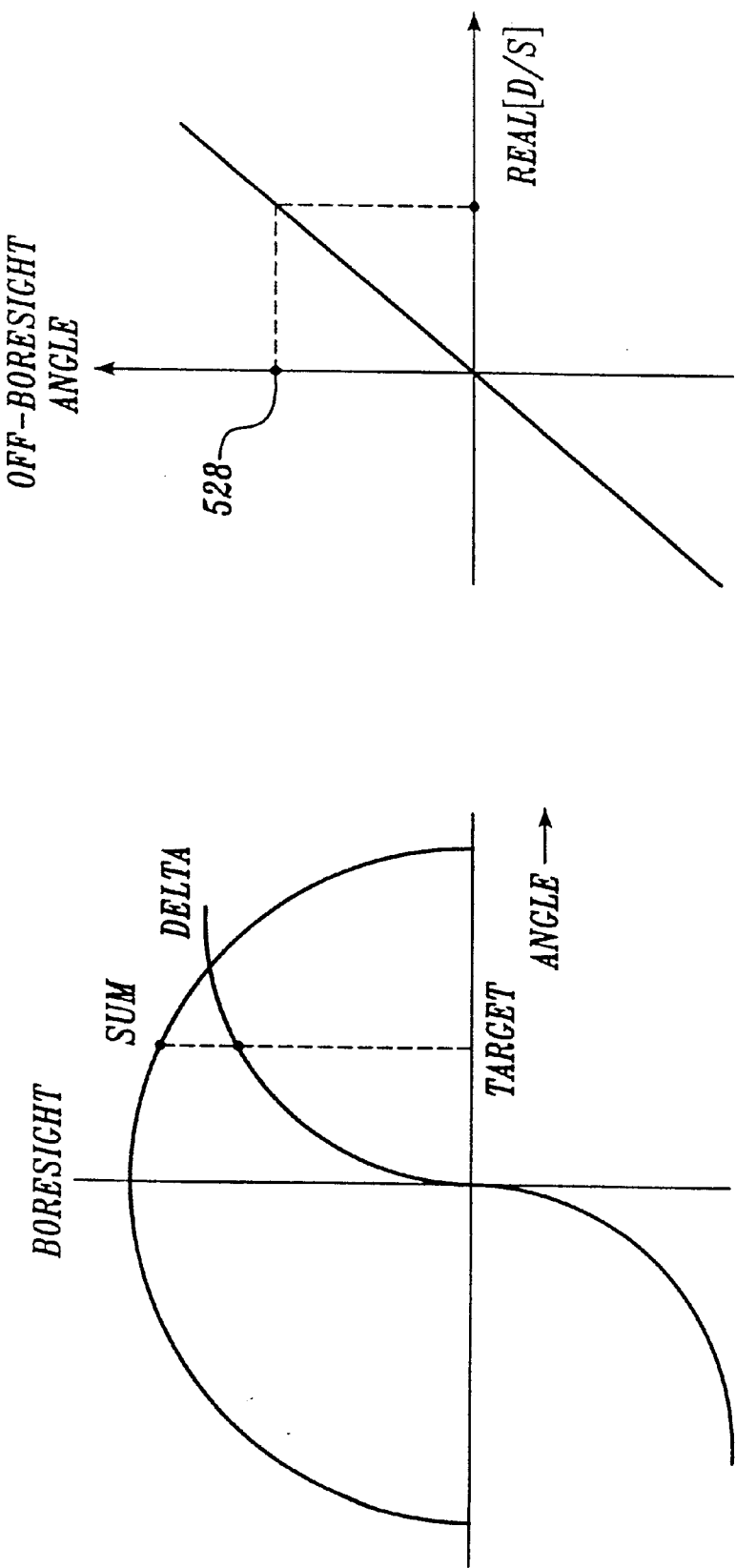
FIG. 33 illustrates monopulse angle measurement techniques according to one embodiment of the invention.

In FIG. 33, monopulse angle measurement techniques demonstrate the use of the Delta_D channel information. The off-boresight angle 528 of a target is directly proportional to the ratio: [DS*]/SS* as given by Eq (13).

An off-boresight angle utilizing the Delta_D, or distributed monopulse, channel information is computed according to:

$$\theta = Kslope \times \sqrt{\frac{SS^* \times DD^*}{SS^*} - \mu^2} \quad \text{Eq (31)}$$

where:

θ=distributed off-boresight angle.

Figure 34:
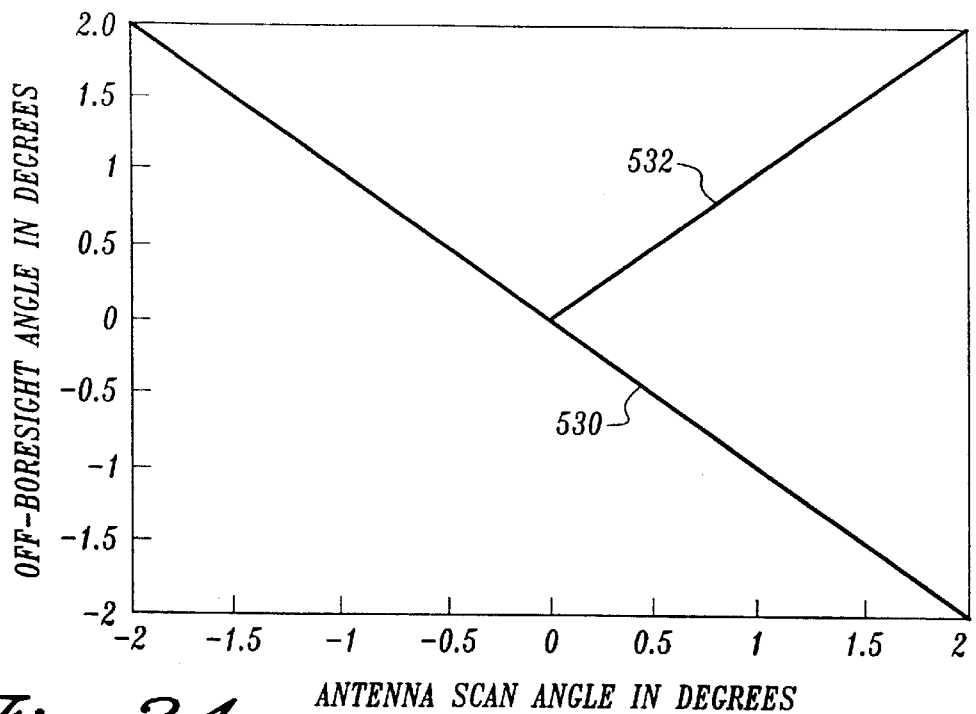
FIG. 34 is an illustrative example comparing two off-boresight angles, the traditional monopulse and the distributed monopulse, for a single point target.

FIG. 34 illustrates that the magnitude of the two off-boresight angles, the traditional monopulse 530 and the distributed monopulse 532 are identical for a single point target.

Figure 35:
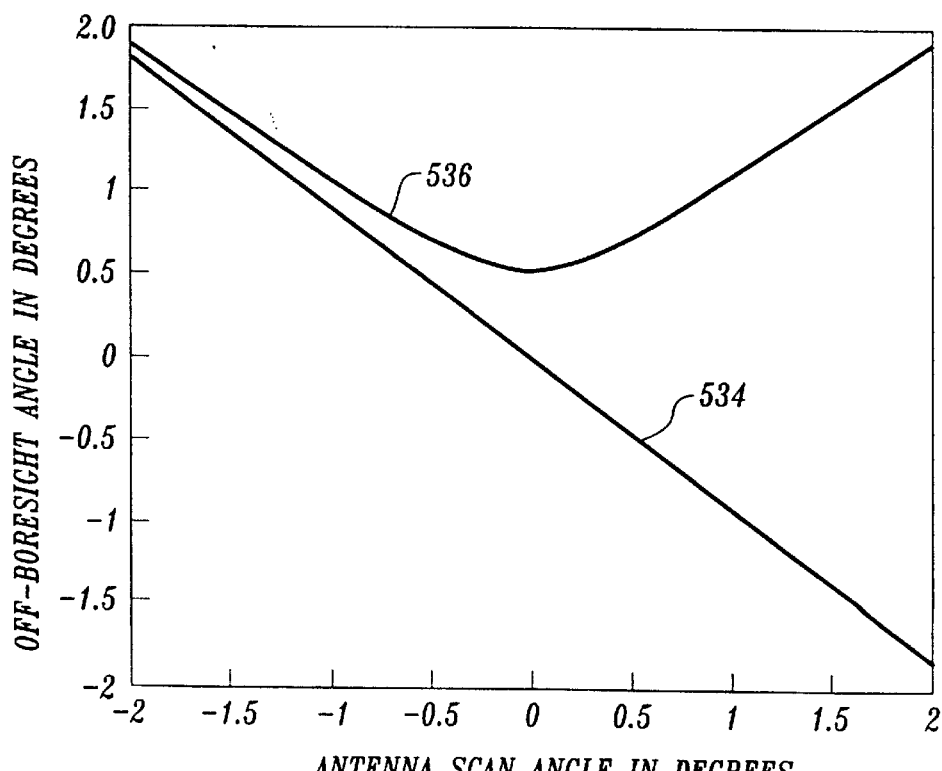
FIG. 35 is an illustrative example comparing two off-boresight angles, the traditional monopulse and the distributed monopulse, for the case of two identical in-phase targets that are separated by 1 degree.

FIG. 35 illustrates the two off-boresight angles, the traditional monopulse 534 and the distributed monopulse 536, for the case of two identical in-phase targets that are separated by 1 degree. The difference between the two curves 534, 536 is directly proportional to the separation between targets that are on the antenna right side 538 and the antenna left side 540. At zero boresight, off-boresight angle utilizing traditional monopulse channel 534 is zero, while off-boresight angle utilizing the Delta_D, or distributed monopulse, channel 536 shows the actual angle from the center point to each target. In the example shown in FIG. 35 the actual angle from the center point to each target is 0.5 degrees. A composite off-boresight angle α is derived from the two off-boresight angles according to:

$$\alpha = 2 \times \mu - \theta * \text{sign}\mu \quad \text{Eq (32)}$$

where:

μ=off-boresight angle utilizing traditional monopulse channel;

θ=off-boresight angle utilizing the Delta_D channel; and sign μ=sign of μ, as in "+" or "−."

Note that the sign of the angle is transferred from μ to θ. This composite off-boresight angle is used for image sharpening.

According to the prior art, various monopulse sharpening techniques have been used to improve radar image quality. However, no previous techniques have actually improved resolution capability. The monopulse beam sharpening technique practiced according to one embodiment of the present invention uses monopulse angle measurements to synthetically enhance the image by emphasizing strong targets and highlighting transition points. FIG. 7, discussed in detail above, illustrates the monopulse beam sharpening technique according to one embodiment of the present invention. The monopulse beam sharpening invention divides the scanned space into small angular bins 218, 220, 222, . . . on the order of 0.3 degrees or less. Target intensity is then increased in the appropriate bin based on the number of monopulse angle measurements made. The number of times each target is detected in a particular angular bin, for example angular bin 230, is used to boost that target's intensity level.

As noted above, FIG. 10 is an illustrative example comparing real-beam image 232 with traditional monopulse sharpened image 234 for a single point target. The sharpening capability is directly proportional to the monopulse angle measurement accuracy, which is a function of signal-to-interference ratio. A 15 dB signal-to-interference ratio is used in the illustrative example of FIG. 10. Simulation analysis shows that a 15 dB signal-to-interference ratio provides approximately a 10:1 sharpening improvement over real-beam for a point target.

Figure 36:
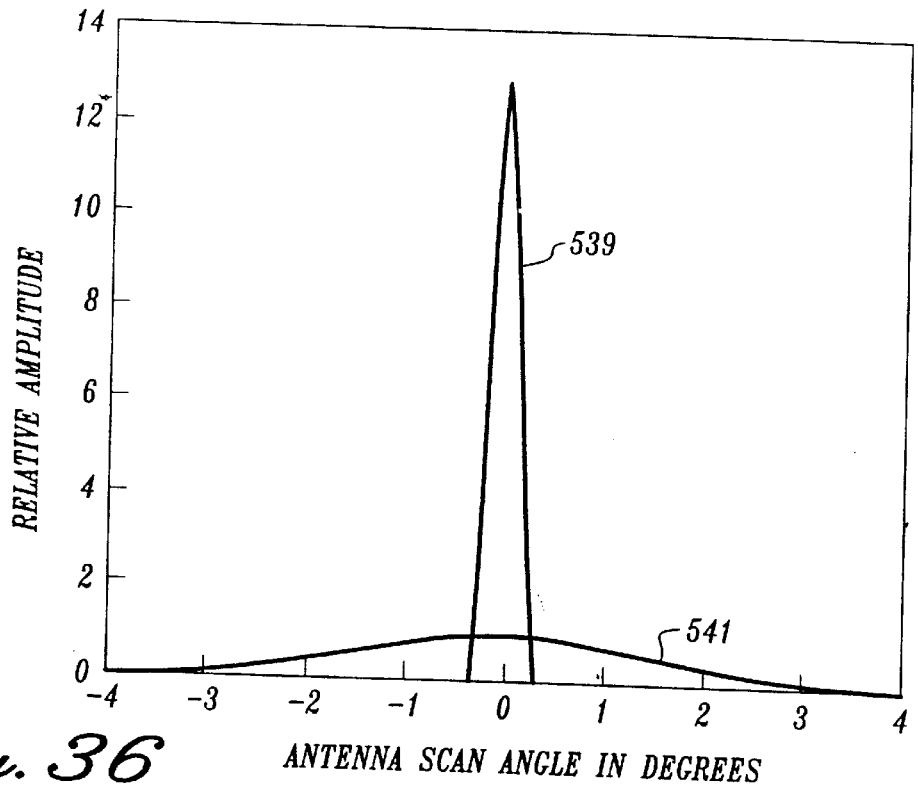
FIG. 36 is an illustrative example comparing a real-beam image with a traditional monopulse sharpened image for the case of two equal size in-phase targets spaced apart by 1 degree.

FIG. 36 is an illustrative example comparing a real-beam image 539 with a traditional monopulse sharpened image 541 for the case of two equal size in-phase targets spaced apart by 1 degree. As illustrated, the traditional monopulse angle measurement is unable to separate the two targets and may actually distort the true image. Thus, the traditional monopulse alone has limited capability in resolving closely spaced targets.

Figure 37:
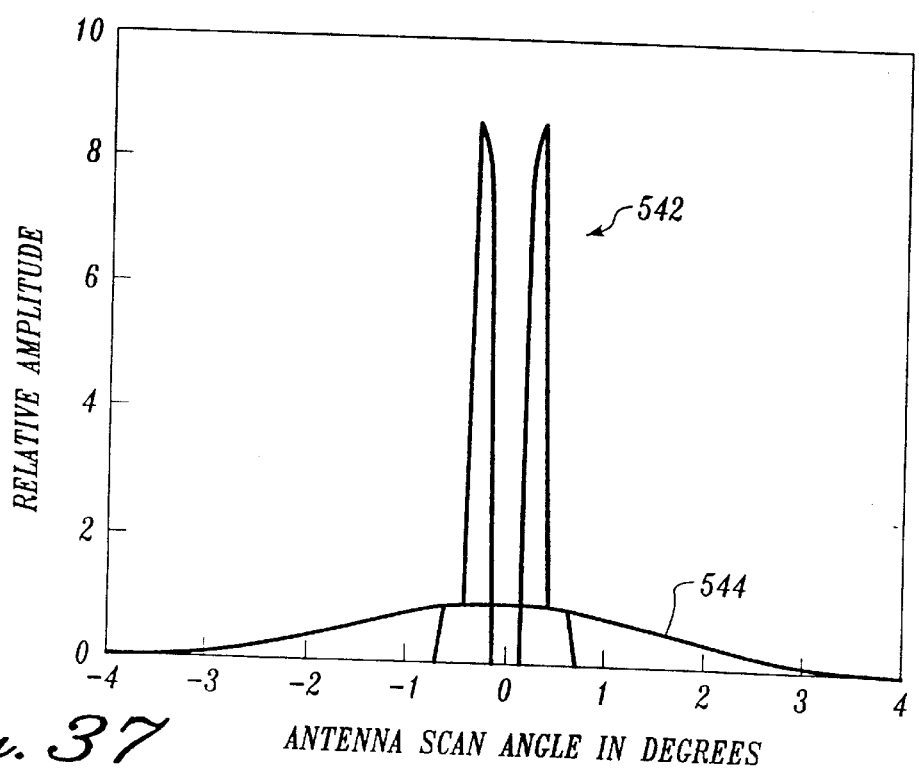
FIG. 37 illustrates a real-beam image compared with the image resulting from combining the traditional monopulse and the distributed monopulse according to the monopulse beam sharpening mode invention for two equal size in-phase targets spaced apart by 1 degree.

FIG. 37 illustrates the effect of combining the traditional monopulse and the distributed monopulse according to the monopulse beam sharpening mode invention 542 compared with a real-beam image 544. In the illustrative example of FIG. 37, two equal size in-phase targets spaced apart by 1 degree are clearly resolved using a 3.2 degree bandwidth. Simulation analysis has shown that the resolution capacity is proportional to the signal-to-interference ratio. A signal-to-interference ratio in the range of 10 dB to 13 dB resolves the two equal size in-phase targets spaced apart by 1 degree. Higher signal-to-interference allows resolution of targets spaced by less than 1 degree.

Figure 38:
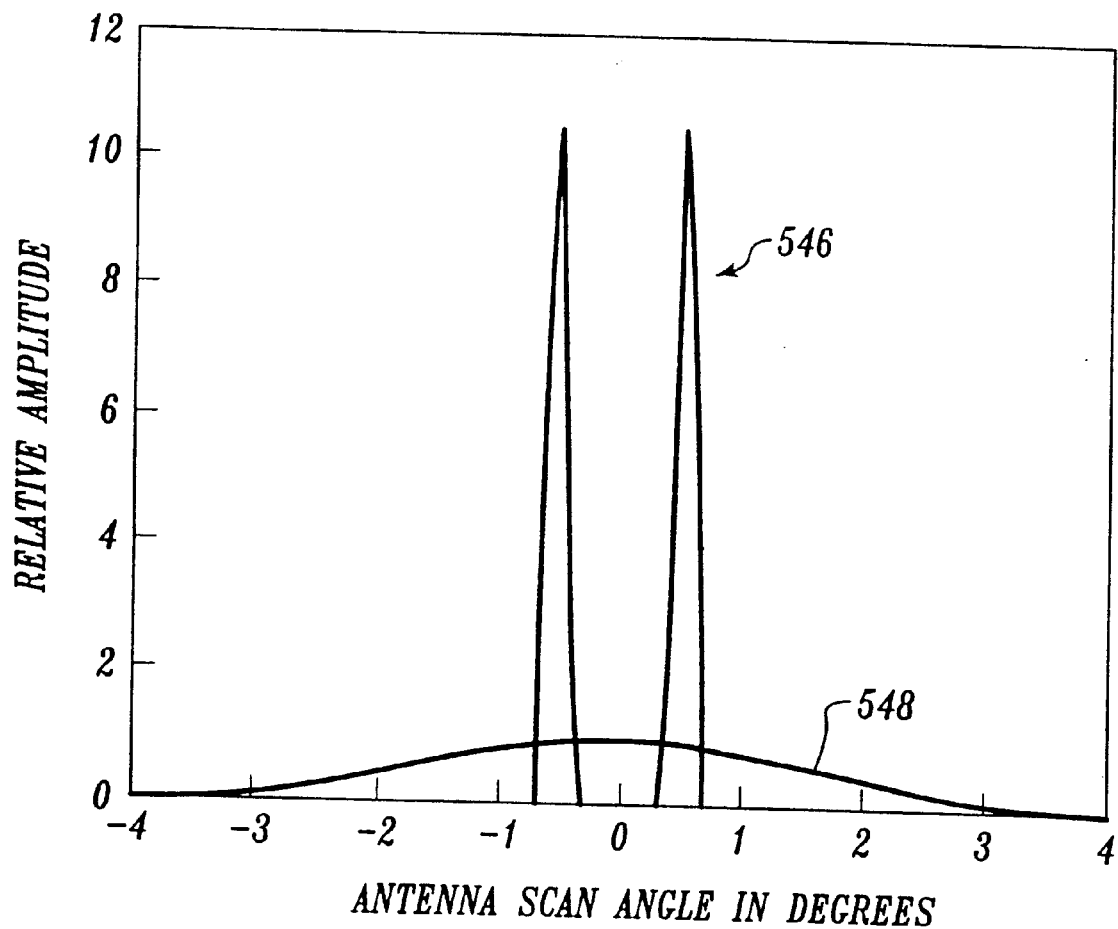
FIG. 38 illustrates a real-beam image compared with the image resulting from combining the traditional monopulse and the distributed monopulse according to the monopulse beam sharpening mode invention for two identical targets spaced apart by 1 degree and 90 degrees out-of-phase.

FIG. 38 illustrates the effect of combining the traditional monopulse and the distributed monopulse according to the monopulse beam sharpening mode invention for two identical targets spaced apart by 1 degree and 90 degrees out-of-phase. FIG. 34 compares the image 546 which results from combining the traditional monopulse and the distributed monopulse with a real-beam image 548. In an illustrative example, two identical targets spaced apart by 1 degree and 90 degrees out-of-phase are clearly resolved. In another illustrative example (not shown), two identical targets spaced apart by 1 degree and being 180 degrees out-of-phase are perfectly canceled. Therefore, no sharpening improvement through combining the traditional monopulse and the distributed monopulse is evident.

2.2 Terrain and Obstacle Detection Warning Mode

The terrain and obstacle detection capabilities of the present invention may additionally be used to reduce the incidence of controlled flight into terrain accidents and prevent other types of collisions. This alerting mode may be used separately or in conjunction with the other systems such as ground proximity warning devices. Existing ground proximity warning devices either differentiate radio altitude to detect abnormal closure sites with the ground and/or use a terrain data base and aircraft position to predict potentially hazardous situations. Unlike those ground proximity warning systems, the radar device of the present invention "sees" the terrain and/or obstacles actually present ahead of the aircraft. Thus, the terrain warning and alerting function of the present invention brings additional capabilities to the prevention of CFIT accidents. For example, the present invention can warn of potential collisions with moveable or temporary objects not likely to be detected in prior art ground proximity devices. The invention provides terrain and obstacle identification and detection by providing accurate terrain height measurements along a narrow flight corridor and coarse terrain and obstacle measurements within a wide azimuth sector centered on the aircraft's velocity vector. The terrain and obstacle detection warning mode according to the present invention is implemented using either a dedicated radar or an existing weather radar. The compatibility of the terrain and obstacle detection warning mode of the present invention, with current weather radar systems provides the function at reduced cost and weight over implementations using a separate dedicated terrain radar.

The terrain and obstacle detection warning mode uses the coherent monopulse waveform to measure top of terrain height and provide azimuth sharpened ground map images ahead of the aircraft. Frequency agility and local oscillator bi-phase modulation is used to improve measurement accuracy, reduce interference from multiple time around echoes, and reduce interference from other radars.

After resolving obstacles and terrain present within the radar beam, the present invention further processes the radar image data to determine whether a warning or alert of a hazardous condition should be asserted. To detect a potentially hazardous condition, the relationships of the radar detected targets to clearance planes, centered along the aircraft's velocity vector, are evaluated according to defined criteria.

The paragraphs below describe in greater detail: the construction of the clearance planes and associated alert logic; the radar beam signal processing for extraction of terrain data; and the hardware implementation of a radar according to the teachings of the present invention.

2.2.1 Terrain Hazard Detecting and Alerting

The terrain and obstacle detection warning mode provides early warning of obstacles in the aircraft's flight path which project above a preselected clearance plane. According to one embodiment of the present invention, the terrain and obstacle detection warning mode has maximum height measurement error on the order of +/−300 feet at a range of 5 nautical miles; a probability of detection, or making an angle measurement, on the order of 99.99% and probability of false alarm, angle measurement noise, on the order of 1 in 1 million.

Figure 39:
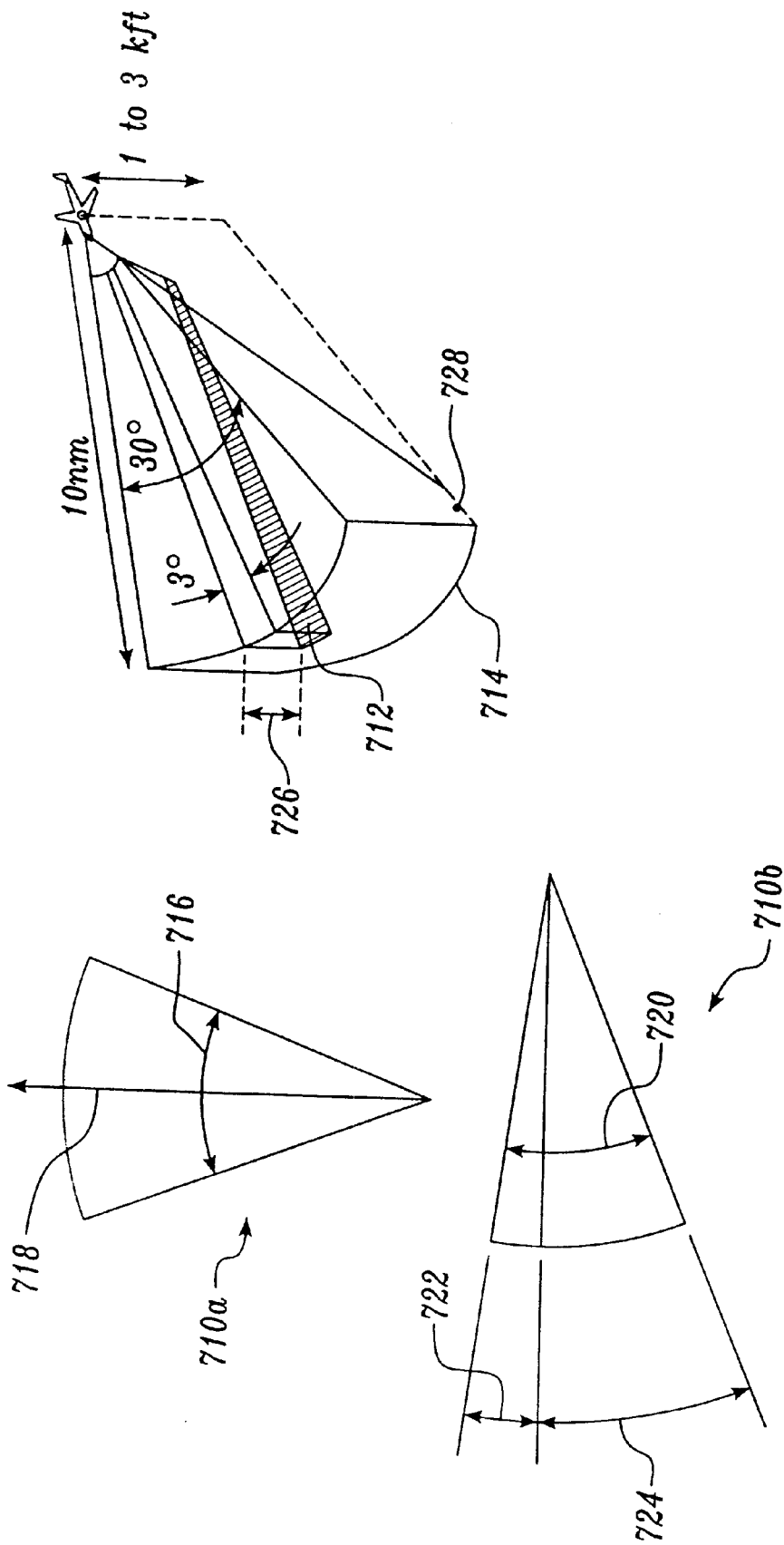
FIG. 39 illustrates antenna scan patterns according to an embodiment of the present invention.

FIG. 39 illustrates antenna scan patterns 710a, 710b, the construction of clearance plane 712, and buffer zone 714 according to the invention. Antenna scan pattern 710a is a 30 degree azimuth scan 716 along the aircraft's velocity vector 718. Antenna scan pattern 710b illustrates a 30 degree elevation scan 720 scanning, for example, between +5 degrees above horizontal 722 and −25 degrees below horizontal 724 along the aircraft's velocity vector. The combination of the azimuth and elevation scans form a three dimensional wedge of radar data.

According to the invention, a clearance plane of predefined dimensions is virtually located within the wedge of radar data. In a preferred embodiment, clearance plane 712, also centered along the aircraft's velocity vector 718, is on the order of 3 degrees wide and is selectable in the range 726 from about 0 feet below the aircraft's flight path to about 1,000 feet below the aircraft's flight path and has a default value on the order of 500 feet below the aircraft's flight path. Clearance plane 712 extends to a minimum range of 10 nautical miles ahead of the aircraft.

A buffer zone 714 operates within an azimuth arc on the order of 30 degrees centered along aircraft velocity vector 718 and having a second variable clearance plane 728. Clearance plane 728 is at least 3,000 feet below the aircraft flight path when the aircraft is operating at an altitude above 10,000 feet and is on the order of 1,000 feet below the aircraft's flight path when the aircraft is operating at or below an altitude of 10,000 feet. These later dimensions for clearance plane 728 assume the terrain and obstacle detection warning function is de-asserted at altitudes below about 1,200feet to prevent nuisance warnings. Buffer zone 714 extends to a minimum range of 10 nautical miles ahead of the aircraft.

Obstacles that are detected within the defined buffer zone are identified and displayed on a display in a plan position indicator format. Displayed obstacles may be merged on the display with weather data using different colors as is well known to those of skill in the art, for example, see U.S. Pat. No. 3,369,231.

When an obstacle is detected above the clearance plane, the invention issues a warning which may be an aural and/or visual alert. The range and height of the highest obstacle above the clearance plane within a radar range segment on the order of 1 mile is displayed in alphanumeric format. The invention may limit the maximum number of displayed targets above the clearance plane to prevent over crowding of the displayed data. For example, the invention may limit the maximum number of displayed targets above the clearance plane to 10.

Figure 40:
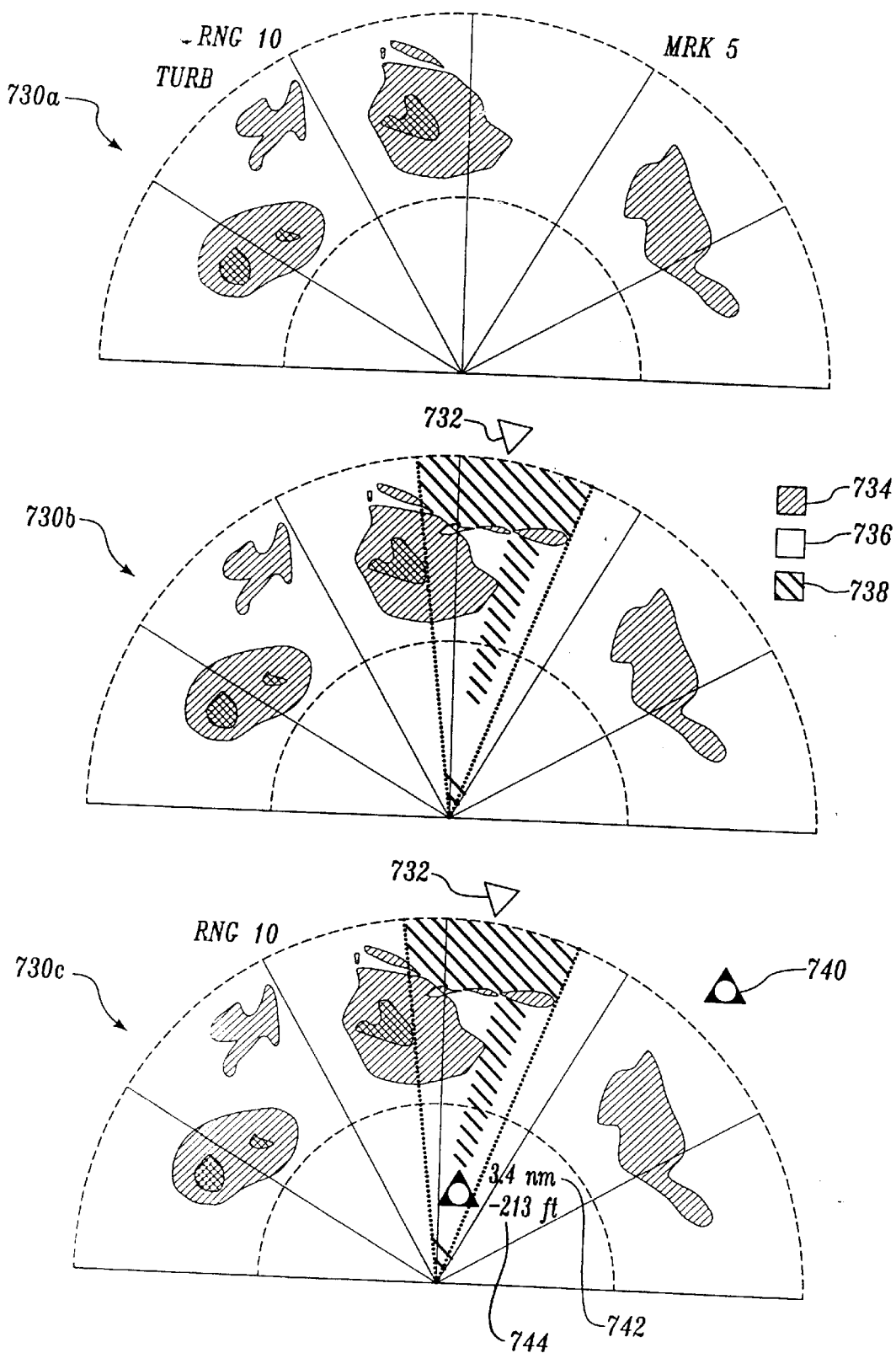
FIG. 40 illustrates terrain and display formats according to an embodiment of the present invention.

FIG. 40 illustrates the terrain and obstacle detection warning mode display format according to one embodiment of the present invention in greater detail. Those of skill in the art will recognize that other display formats may be used to display the terrain and obstacle detection warning mode information. When operating in a weather display mode, weather radar data is displayed in a standard weather display format 730a. When operating in a first weather and terrain display mode, display 730b displays horizontal or azimuth scan data and an aircraft velocity vector indicator 732. The azimuth scan data contains limited amounts of elevation data in wide view. Also displayed are indications of the terrain data relative to the buffer zone. As shown in FIG. 40, the display includes and an indication that detected terrain lies above a selected buffer zone using an "above buffer zone" indicator 734; an indication that detected terrain lies below a buffer zone using a "below buffer zone" indicator 736: and an indication that the terrain position relative to the buffer zone is unknown using an "unknown position" indicator 738.

When operating in a second weather and terrain display mode, a second weather and terrain display 730c includes vertical, or elevation, scan data in addition to the azimuth scan data. Display 730*c* provides an aircraft velocity vector indicator 732 and an indication that detected terrain lies above a selected buffer zone using an "above buffer zone" indicator 734; an indication that detected terrain lies below a buffer zone using a "below buffer zone" indicator 736; and an indication that the terrain position relative to the buffer zone is unknown using an "unknown position" indicator 738. Additionally, second weather and terrain display 730*c* provides an indication of the location of the detected terrain relative to the selected clearance plane. An "above clearance plane" indicator 740 indicates a potential hazard. In one embodiment of the invention, range from the aircraft 742 and distance below the aircraft 744 are displayed for terrain lying above clearance plane 728.

2.2.2 Interleaving of Weather and Terrain Detection Modes

The mode of operation for the radar of the present invention may be selected in various ways. For example, the pilot may select that the radar operate purely in the mode of collecting terrain data, or purely in the mode of collecting weather data, or an autonomous landing guidance mode. The mode may also be automatically controlled based on aircraft altitude, detection of a weather or terrain threat, or aircraft configuration. Preferably, however, the radar operates to interleave both weather and terrain data. This interleaved mode of operation permits the pilot to select a single mode for display if desired, yet retains the simultaneous weather avoidance and terrain hazard detection capabilities of the present invention.

Figure 41:
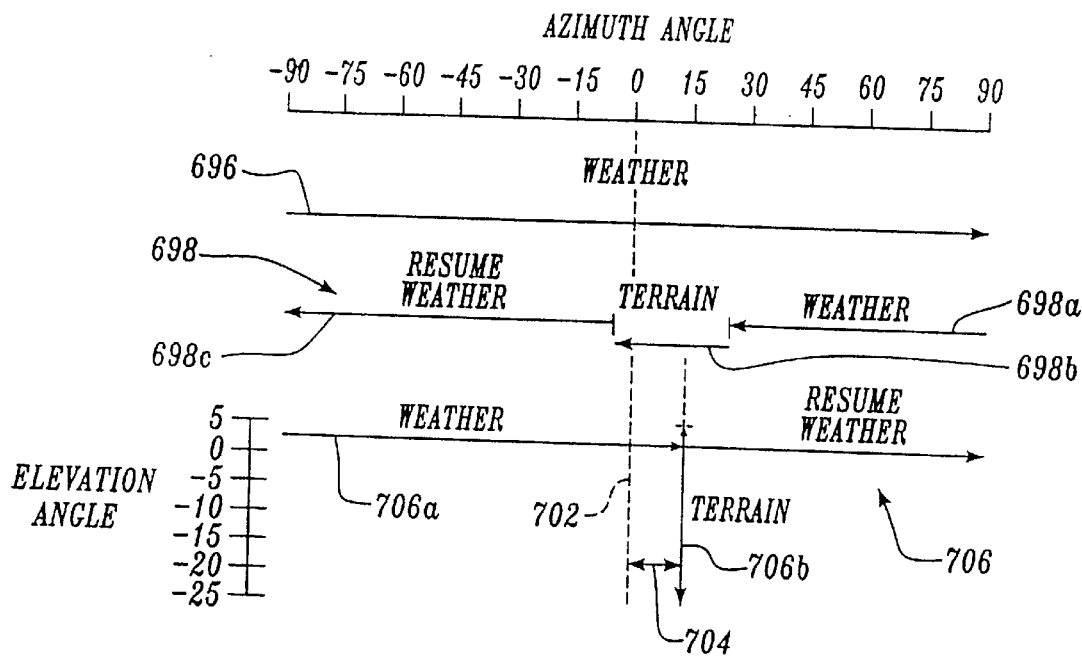
FIG. 41 illustrates the interleaving of terrain and weather data according to an embodiment of the present invention.

FIG. 41 illustrates one method of interleaving weather and terrain data collection according to the present invention. In the embodiment of FIG. 41, a first radar scan 696 sweeps through an azimuth angle of −90 to +90 degrees and collects only weather data. During a second return scan 698, weather data collection 698*a* is interrupted at a point 15 degrees in advance of the aircraft's velocity vector. At this point, the radar begins collecting terrain monopulse elevation data in wide view and azimuth data for the next 30 degrees of sweep 698*b* at the rate of approximately 30 degrees per second. During the azimuth scan, the antenna elevation angle is computed based on aircraft attitude. Note that terrain detection sweep 698*b* is not centered about an azimuth angle of zero degrees, but is offset to account for the aircraft crab angle. During a third scan 706, weather data collection 706*a* is interrupted at a point coincident with the direction of the aircraft velocity vector and the radar transitions to a vertical, or narrow view scan 706*b*. Scan 706*b* collects a elevation data through an arc of approximately 30 degrees, from +5 degrees to −25 degrees, at the rate of 30 degrees per second. If one or more targets are detected above +5 degrees, the positive elevation of the scan may be increased above +5 degrees until there is no further target detection. After vertical scan 706*b*, the invention repositions the antenna at the pre-interruption position and reasserts a weather data collection mode 706*c*. The entire terrain data collection and processing time is on the order of 1 second per frame.

When the invention is implemented using weather radar, compliance must also be maintained with current Federal Aviation Administration regulations requiring a windshear detection capability. The windshear detection function is typically enabled below 1,200 feet altitude, in the vicinity of an airport during take off and landing. The interleaving of windshear and terrain data has been previously described in connection with FIGS. 17*a*–*b*.

2.3 Radar Characteristics, Waveforms and Signal Processing

Radar requirements and characteristics for the ground proximity warning function are prescribed by a combination of the desired warning times, the capabilities and requirements of the weather radar function (when dual purpose use is intended), and the desired accuracy of terrain resolution. For example, according to a preferred embodiment of the invention, the terrain look ahead ability is designed to provide sufficient warning for an aircraft to clear a 10,000 foot obstacle with a maximum aircraft acceleration of 0.25 g.

Figure 42:
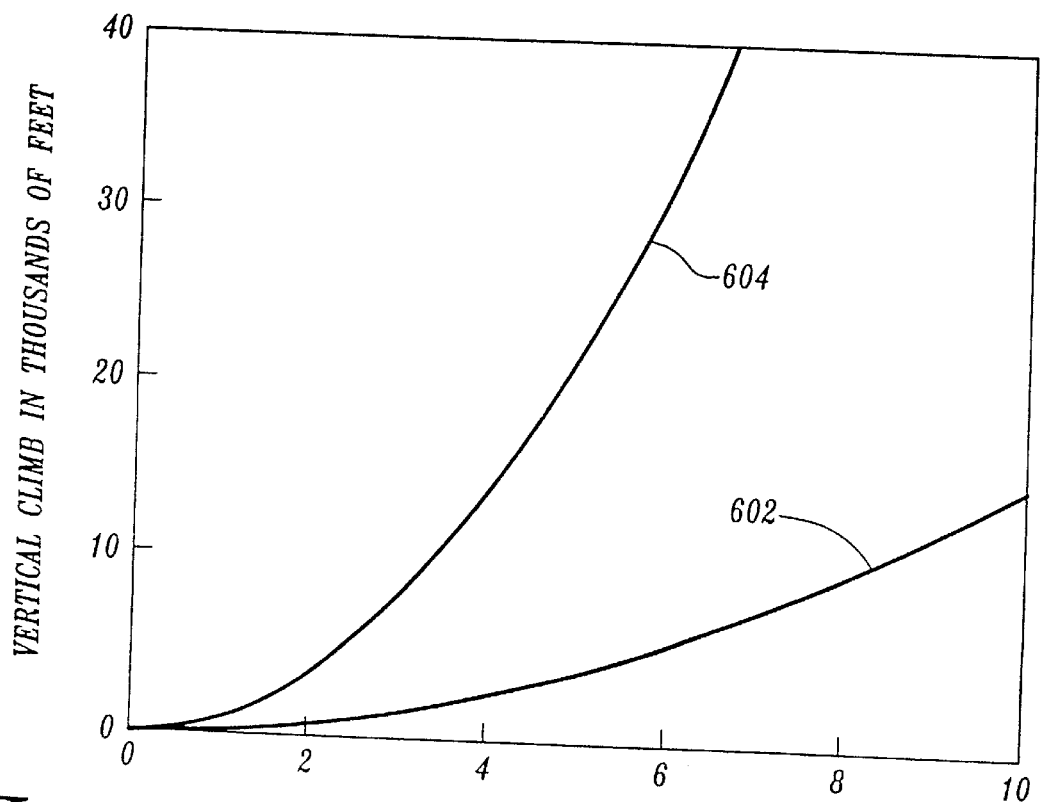
FIG. 42 illustrates the maximum vertical climb with 25g acceleration versus warning distance.

FIG. 42 contains a graph of maximum vertical climb vs. warning distance of the type useful for deriving the radar performance specifications according to the present invention. As shown by curve 602, for altitudes above 10,000 feet and a speed of 600 knots, the radar must have a 8.5 nautical mile look-ahead capability to clear the 10,000 foot obstacle. As shown by curve 604, for altitudes below 10,000 feet at a speed of 250 knots, the radar must have a 3.5 nautical mile look-ahead capability.

Table 13 compares the preferred radar parameters for a radar optimized for terrain detection and a dual purpose weather and terrain radar. For a radar optimized for the primary purpose of terrain detection, the preferred range bin size is 50 meters. However, larger range bin sizes are consistent with the capability of existing weather radars. Although adequate for terrain angle measurement, the larger bin size is too coarse for height measurement of narrowly extended targets. As described elsewhere in this document, measurement of narrow vertically extended targets, for example, radio towers, can be accomplished according to monopulse beam sharpening techniques generally known to those of skill in the art or as described in this document.

The optimum number of range bins for terrain detection is 384. The number of range bins for the radar of the present invention is selected to cover a minimum of 10 nautical miles as determined from the requirements of FIG. 42.

Minimum clutter backscatter coefficient and clutter to noise ratio are also significant in determining the performance and suitability of a radar to the terrain detection function. The terrain and obstacle detection warning mode, according to the present invention, operates when the grazing angle is very shallow, on the order of less than 3 degrees. Thus, the minimum clutter backscatter coefficient is on the order of −45 dB square meter per square meter for snow covered terrain. Weather radars also provide sufficient clutter-to-noise ratio to fully implement the terrain and obstacle detection warning mode of the invention; for example, resolving terrain in 12 millimeter per hour intervening rain.

The radar waveform of FIG. 4 described previously is also suitable for practicing the present invention. Other waveforms may be used. Signal processing of the radar signals to detect terrain in the ground proximity warning application occurs in the same manner as described for the detection of terrain and obstacles when in the autonomous landing guidance mode.

Preferred embodiments of the invention have been described. Variations and modifications will be obvious to those of skill in the art. Headings used herein are for the convenience of the reader and do not have legal meaning For example, the present invention may also be used to provide obstruction and obstacle clearance, as well as intrusion detection, during taxi and takeoff in addition to landing. The invention also has applications to marine navigation and uses for marine weather radar. Furthermore, terrain altering algorithms as disclosed in U.S. Pat. No. 4,646,244 and copending U.S. application Ser. No. 08/509,642 may be used to generate warnings of potential flight into the terrain detected by the present invention. For at least these reasons, the invention is to be interpreted in light of the claims and is not limited to the particular embodiments described herein.

TABLE 1

| Radar Parameter | Value |
| --- | --- |
| Pulse repetition frequency | 6 kHz |
| Number of range bins | 512 |
| Range bin size | 15 meters |
| Transmit pulse width | 1.6 microseconds |
| Digital pulse compression | 16:1 complementary codes |
| Radio frequency bandwidth | 160 MHz |
| Number of frequencies | 32 |
| Number of pulse repetition intervals | 128 |

TABLE 2

| Radar Parameter | Value |
| --- | --- |
| Peak power | 160 watts |
| Antenna gain (one way) | 35 dB |
| Beamwidth | 3.4 degrees |
| Radio frequency bandwidth | 160 MHz, minimum |
| Range bin size | 15 meter |
| Pulse compression ratio | 1:1, 16:1 |
| Coherent integration gain | 2:1 |
| Frequency step size | 5 MHz |
| Frequency sub-bands | 4 |
| Number of frequencies per sub-band | 8 |
| Transmit pulse width | 10 nanoseconds, 1.6 microseconds |
| Matched filter bandwidth | 10 MHz |
| Noise figure | 5 dB, maximum |
| Radio frequency losses | 4 dB |
| Rain attenuation for 12 mm/hour (one way) | 0.285 dB/kilometer |
| Number of range bins | 512 |

TABLE 3

| Antenna Positioner Parameter | Performance |
| --- | --- |
| Position accuracy | 0.1 degree |
| Pointing stability | 0.1 degree |
| Antenna phase center displacement relative to pedestal mounting surface | 0.15 millimeter, maximum |
| Azimuth to elevation coupling | 0.3%, maximum |
| Weight | 35 pounds, maximum |

TABLE 4

| Antenna Array Parameter | Performance |
| --- | --- |
| Center frequency | 9400 MHz |
| Radio frequency bandwidth | 160 MHz |
| Beam shapes | Selectable between pencil and fan |
| Radio frequency ports | Sum Delta elevation, and Delta azimuth |
| Gain over radio frequency bandwidth | 35 dB, nominal |
| Gain variation over radio frequency bandwidth | 0.5 dB, maximum |
| Beamwidth characteristics: | |
| Azimuth | 3.4 degrees, nominal; 3.6 degrees, max |
| Elevation (pencil) | |

TABLE 4-continued

| Antenna Array Parameter | Performance |
| --- | --- |
| Elevation (fan) | 3.2 degrees, nominal; 3.4 degrees, max Cosecant squared cosine |
| Sidelobe characteristics: | |
| Sum channel sidelobes: | |
| Peak | −30 dB |
| RMS | −38 dB |
| Delta channel sidelobes: | |
| Peak | −28 dB |
| Voltage standing wave ratio (VSWR) | 1.5:1 |
| Polarization | Horizontal |
| Delta channel null depth | −25 dB, minimum |
| Delta lobe imbalance | 0.5 dB, maximum |
| Port-to-port isolation | 25 dB, minimum |
| Mechanical-to-electrical boresight alignment error | 0.1 degree, maximum |
| Sum-to-Delta imbalance (over radio frequency bandwidth and temperature range): | |
| phase imbalance (0 to 180 degrees) | +/−10 degrees, maximum |
| gain imbalance | 0.5 dB, peak-to-peak |

TABLE 5

| Transmitter Parameter | Performance |
| --- | --- |
| Peak power | 160 watts |
| Duty cycle | 15%, minimum |
| Radio frequency bandwidth | 160 MHz |
| Radio frequency center frequency | 9400 MHz |
| Intra-pulse and phase stability: | |
| linear | 0.5 dB, 10 degrees peak-to-peak |
| sinusoidal | 0.3 dB, 3.6 degrees peak-to-peak |
| random | 0.58 dB, 4.0 degrees RMS |
| single frequency | 0.02 dB, 0.23 degrees peak-to-peak |
| over the radio frequency bandwidth | 0.3 dB, 3.6 degrees peak-to-peak |
| Pulse characteristics: | |
| width | 100 nanoseconds to 512 microseconds |
| rise and fall time | 10 nanoseconds |
| Voltage standing wave ratio (VSWR) | 1.6:1 |

TABLE 6

| Local Oscillator | Output signal | Destination |
| --- | --- | --- |
| LO1 | 8720 MHz +/−80 MHz | Radio frequency receiver 290 |
| LO2 | 520 MHz +/−80 MHz | Intermediate frequency receiver 300 |
| LO3 | 180 MHz +/−80 MHz | Intermediate frequency receiver 300 |
| LO4 | dual phase, reference/−90 degrees, 20 MHz at +10 dBm | Intermediate frequency receiver 300 |

TABLE 7

| Exciter Parameter | Performance |
|---|---|
| Transmit drive: | |
| Frequency | 9400 MHz +/− 80 MHz |
| Accuracy | 0.05% |
| Power out | +12 dB, nominal |
| Number of frequencies | 32 (5 MHz) discrete output frequencies, digitally programmable |
| Step size accuracy | 750 Hz periodic error; 500 Hz RMS random error |
| Settling time: | |
| single step jump | 30 microseconds, maximum |
| full band jump | 60 microseconds maximum |
| Rise/fall times for 10% to 90% detected radio frequency: | |
| at narrow gate output | 10 nanoseconds |
| at wide gate output | 300 nanoseconds |
| Switch ON/OFF ratio: | |
| narrow gate | 50 dB, minimum |
| wide gate | 50 dB, minimum |
| combination | 113 dB, minimum |
| Bi-phase modulation | Reference phase and 180 degrees with +/−2.5 degrees phase accuracy. Switching speed: 10 nanoseconds, maximum |
| Spurious: | |
| radio frequency +/−n (20 MHz) | −60 dBc, maximum, for n = 1,2, . . . 34 |
| all others | −50 dBc |
| Phase noise: | |
| 100 Hz | −107.5 dBc/Hz |
| 3 kHz | −122 dBc/Hz |
| 100 kHz | −140 dBc/Hz |
| Intra-pulse phase stability: | |
| short pulse (≦1 microsecond) | 0.115 degree, peak-to-peak |
| long pulse (>1 microsecond) | 3.6 degrees, peak-to-peak |
| Inter-pulse short term phase stability: | |
| single frequency | 0.115 degree, peak-to-peak |
| over radio frequency bandwidth | 3.6 degrees, peak-to-peak |
| Short term frequency stability | +/−2.6 Hz |
| First local oscillator: | |
| frequency | 9400 MHz +/− 80 MHz |
| accuracy | 0.05% |
| power out | +10 dBm +/− 2 dB |
| spurious: | |
| LO1 +/− 680 Mhz | −113 dBc |
| all others | '60 dBc |
| Second local oscillator: | |
| frequency | 520 MHz |
| accuracy | 0.05% |
| power out | +10 dBm +/− 2 dB |
| spurious: | |
| LO2 +/− 200 MHz | −83 dBc, maximum |
| all others | −60 dBc, maximum |
| short term frequency stability | +/−2.6 Hz |
| Third local oscillator: | |
| frequency | 180 MHz |
| accuracy | 0.05% |
| power out | +10 dBm +/− 2 dB |
| spurious: | |
| LO3 +/− 20 MHz | −51 dBc, maximum |
| all others | −50 dBc, maximum |
| short term frequency stability | +/−2.6 Hz |
| Fourth local oscillator: | |
| frequency | 20 MHz |
| accuracy | 0.05% |
| power out | +10 dBm +/− 2 dB |
| spurious: | −60 dBc, maximum |
| short term frequency stability | +/−2.6 Hz |
| 40 MHz clock: | |
| accuracy | 0.05% |
| duty cycle | 50%, nominal, TTL |
| frequency stability | +/−2.6 Hz |
| Phase lock indicator | ON/OFF |
| Voltage standing wave ratio (VSWR) | 1.5:1 |

TABLE 8

| Radio Frequency Receiver input Signal Source | Input Signal | Signal Parameters |
|---|---|---|
| Antenna 250 | Radio frequency signal: | |
| | center frequency | 9400 MHz |
| | tolerance band | +/−80 MHz |
| | range | −109 dBm to 10 dBm |
| Exciter 220 | Local oscillator, LO1, signal: | 8720 MHZ |
| | center frequency | +/−80 MHz |
| | tolerance band | −10 dBm, average |
| | range | |

TABLE 9

| Radio Frequency Receiver Parameter | Parameter |
|---|---|
| Noise figure at operational gain | 4.5 dB, maximum |
| Radio frequency limiting | 50 dB, minimum |
| Radio frequency switching speed | 500 nanoseconds, maximum |
| Maximum input power without damage | +30 dBm, maximum |
| Image rejection filter | 500 MHz, 6-pole, LC realization, Gaussian to 6 dB |
| Voltage standing wave ratio (VSWR) | 1.5:1 |

TABLE 10

| Intermediate Receiver Input Signal | Signal parameters | Input signal source |
|---|---|---|
| Intermediate frequency input | 680 MHz signal at −89 dBm to +30 dBm, average | Radio frequency receiver 290 |
| Local oscillator signal, LO2 | 520 MHz signal at +10 dBm, nominal | Exciter 220 |
| Local oscillator signal, LO3 | 180 MHz signal at +10 dBm, nominal | Exciter 220 |
| Local oscillator signal, LO4 | 20 MHz signal at +10 dBm, nominal | Exciter 220 |
| Blanking switch control | differential logic signal | Timing generator 210 |
| Matched filter select switch control | differential logic signal | Timing generator 210 |
| Attenuation control | 8-bit parallel differential control word | General purpose processor 280 |
| I/Q phase correction | 16-bit parallel differential I/Q phase correction word | General purpose processor 280 |
| I/Q amplitude correction | 16-bit parallel differential I/Q amplitude correction word | General purpose processor 280 |

TABLE 11

| Intermediate Receiver Parameter | Performance |
|---|---|
| Noise figure | 12 dB, maximum, at operation gain, where: operational gain is that gain setting which produces 2 q noise at the analog-to-digital converter with radio frequency receiver noise as a source. |
| Intermediate frequency blank: | |
| On/Off ratio | 40 dB, minimum; |
| switching speed | 500 nanoseconds, maximum |
| Maximum input power without damage | +50 dB |
| Transmit leakage recovery time: | |
| recovery time to 1 dB pre-saturation level | 200 nanoseconds, maximum |
| recovery time to full pre-saturation level for all pulse widths | 500 nanoseconds, maximum, |
| Intermediate frequency receiver gain control: | |
| minimum gain control | 95 dB, minimum |
| gain control step resolution | 1 dB |
| gain control accuracy | +/−1 dB |
| switching speed attenuation | 10 nanoseconds, maximum monotomic |
| Intermediate frequency receiver matched filters: | |
| quantity | 2 selectable matched filters minimum |
| type | 6-pole LC realization Gaussian to 6 dB |
| first bandwidth | 10 MHz |
| second bandwidth | 1 MHz |
| Operating temperature | −40 to +35 degrees Centigrade |
| Voltage standing wave ratio (VSWR) | 1.5:1 |

TABLE 12

| Analog to Digital Converter Parameter | Performance |
|---|---|
| Analog-to-digital dynamic rate | 12-bit offset binary |
| Number of channels | 4 (SUMI, SUMQ, DELTAI, DELTAQ) |
| Analog-to-digital sampling rate: | |
| minimum sampling rate | 1 MHz |
| maximum sampling rate | 10 MHz |
| Linearity | +/−0.5 q |
| Full scale Error | +/−1 q |
| Hysteresis | +/−0.25 q |
| Analog-to-digital aperture jitter | 60 picosecond, maximum |
| I/Q images | −60 dB |
| DC bias (after digital correlation) | ≤1/16 q |
| Analog-to-digital bias drift | 0.375 q per minute |

TABLE 13

| Parameter | Terrain Dedicated Radar | Weather radar |
|---|---|---|
| Pulse repetition frequency | 7 kHz | 7 kHz |
| Number of range bins | 384 | 128 |
| Range bin size | 50 meters | 150 meters |
| Transmit pulse width | 330 nanoseconds | 1 microsecond |
| Radio frequency bandwidth | 200 MHz | 24 MHz |
| Number of frequencies | 4 × 8-frequency sub-bands | 8 |
| Number of pulse repetition intervals per dwell | 256 | 256 |

What is claimed is:

1. A landing guidance device for aircraft comprising:
   a first input for receiving aircraft position data;
   a second input for receiving radar image data including image data from a radar sum channel, a radar delta channel and a radar delta_d channel;
   a feature map of a landing area;
   means, coupled to said first input and to said feature map for generating a reference image from said feature map based upon said aircraft position data; and
   means, coupled to said means for generating a reference image and to said second input, for comparing said reference image to said radar image data and outputting a guidance command.

2. The device of claim 1 wherein said radar image data is received from a weather radar.

3. The device of claim 1 wherein said radar image data comprises X band radar image data.

4. The device of claim 1 further comprising a display device for displaying said guidance command.

5. The device of claim 1 further comprising a means, coupled to said second input, for detecting a collision hazard positioned ahead of the aircraft.

6. The device of claim 1 wherein said means for comparing further includes a means for verifying said radar image data is image data for a predetermined landing area.

7. A landing guidance device for aircraft comprising:
   an input coupled to receive radar data including image data from a radar sum channel, a radar delta channel and a radar delta_d channel;
   an airport image data base;
   means, coupled to said input and to said airport image data base, for using said radar data to identify a given landing area image stored within said airport image data base; and
   a display for displaying a combination of given portions of said given landing area image and said radar data.

8. The device of claim 7 wherein said radar data comprises X band radar data.

9. The device of claim 7 wherein said input is coupled to receive said radar data from a weather radar.

10. The device of claim 7 wherein said display is a heads up display.

11. The device of claim 7 wherein said display displays a synthesized runway image.

12. The device of claim 7 further comprising a means, coupled to said input, for processing said radar data to detect a collision hazard to the aircraft.

13. A guidance device for aircraft comprising:
   a first input coupled to receive aircraft position data;
   a second input coupled to receive radar image data;
   an airport features data base;
   means, coupled to said first input, to said second input and to said airport features data base, for identifying a given airport and for comparing said radar image to image data for said given airport to output guidance information;
   an obstacle detection means, coupled to said second input for detecting a collision hazard to the aircraft;
   a ground proximity warning means, coupled to said first input and to said second input for providing a ground proximity warning, and;
   wherein said radar image data comprises data from a sum squared channel, a delta squared channel and a delta_d channel.

14. A method for aircraft navigation comprising the steps of:
   receiving an X band radar image data including image data from a radar sum channel, a radar delta channel and a radar delta_d channel;
   comparing said X band radar image data to a stored image data for a given airport; and
   using said step of comparing to output a navigation command.

15. A method for aircraft navigation comprising the steps of:
   receiving an X band radar image data including image data from a radar sum channel, a radar delta channel and a radar delta_d channel;
   comparing said X band radar image data to a stored image data base to identify stored image data for a given airport; and
   using said X band radar image data, and said stored image data for said given airport to display a synthesized runway image.

16. The method of claim 15 wherein said step of displaying a synthesized runway image further comprises the step of displaying said synthesized runway image on a heads up display.

17. A method for aircraft navigation comprising the steps of:
   receiving an aircraft position information;
   receiving a radar image data;
   comparing said radar image data to image data from a stored image data base;
   providing navigation information based on said step of comparing;
   processing said radar image data to detect a collision hazard to the aircraft; and wherein said step of receiving radar image data comprises the steps of receiving a delta squared channel, a sum squared channel and a delta_d channel.

* * * * *